US008951308B2

(12) United States Patent
Ellis et al.

(10) Patent No.: US 8,951,308 B2
(45) Date of Patent: Feb. 10, 2015

(54) PYROLYSIS OIL AND OTHER COMBUSTIBLE COMPOSITIONS FROM MICROBIAL BIOMASS

(75) Inventors: Graham Ellis, Belmont, CA (US); Robert Florence, San Mateo, CA (US); Adriano Galvez, Gilbert, AZ (US); Tyler Painter, Orinda, CA (US); Sonia Sousa, San Francisco, CA (US)

(73) Assignee: Solazyme, Inc., South San Francisco, CA (US)

(*) Notice: Subject to any disclaimer, the term of this patent is extended or adjusted under 35 U.S.C. 154(b) by 308 days.

(21) Appl. No.: 13/422,931

(22) Filed: Mar. 16, 2012

(65) Prior Publication Data

US 2012/0266530 A1 Oct. 25, 2012

Related U.S. Application Data

(60) Provisional application No. 61/453,915, filed on Mar. 17, 2011, provisional application No. 61/538,747, filed on Sep. 23, 2011.

(51) Int. Cl.
| | | |
|---|---|---|
| *C10L 5/44* | (2006.01) | |
| *C10G 1/00* | (2006.01) | |
| *C10B 53/00* | (2006.01) | |
| *C10L 5/36* | (2006.01) | |
| *C10L 9/08* | (2006.01) | |
| *C10B 47/14* | (2006.01) | |

(52) U.S. Cl.
CPC .............. *C10B 53/00* (2013.01); *C10L 5/363* (2013.01); *C10L 5/365* (2013.01); *C10L 5/44* (2013.01); *C10L 9/083* (2013.01); *C10B 47/14* (2013.01); *C10G 2300/1011* (2013.01); *Y02E 50/10* (2013.01); *Y02E 50/15* (2013.01); *Y02E 50/30* (2013.01); *C10G 2300/1014* (2013.01); *C10G 2300/4006* (2013.01)
USPC .................. 44/500; 585/240; 44/605; 44/535

(58) Field of Classification Search
USPC .............................. 44/500, 535, 605; 585/240
See application file for complete search history.

(56) References Cited

U.S. PATENT DOCUMENTS

| | | |
|---|---|---|
| 3,297,419 A | 1/1967 | Eyre, Jr. |
| 3,789,513 A | 2/1974 | Mark |
| 4,002,438 A | 1/1977 | Fleming et al. |
| 4,101,264 A | 7/1978 | Barr |
| 4,104,034 A | 8/1978 | Wu et al. |
| 4,105,502 A | 8/1978 | Choi et al. |
| 4,214,375 A | 7/1980 | Albus et al. |
| 4,326,854 A | 4/1982 | Tanner |
| 4,553,978 A | 11/1985 | Yvan |
| 4,787,917 A | 11/1988 | Leclerc de Bussy |
| 4,816,572 A | 3/1989 | Bourgeois |
| 4,954,620 A | 9/1990 | Bourgeois |
| 5,729,910 A | 3/1998 | Marschke |
| 5,868,804 A | 2/1999 | Williams et al. |
| 5,910,454 A | 6/1999 | Sprules |
| 6,017,373 A | 1/2000 | Frisch |
| 6,136,054 A | 10/2000 | Tutupalli et al. |
| 6,602,306 B2 | 8/2003 | Scott et al. |
| 6,719,816 B2 | 4/2004 | Barford |
| 6,719,896 B1 | 4/2004 | Clark |
| 7,540,890 B2 | 6/2009 | Schaefer |
| 7,914,667 B2 | 3/2011 | Keusenkothen et al. |
| 7,947,155 B1 | 5/2011 | Green et al. |
| 7,951,271 B2 | 5/2011 | Thompson et al. |
| 7,968,006 B2 | 6/2011 | Johnson et al. |
| 7,972,482 B2 | 7/2011 | Strack et al. |
| 8,278,090 B1 | 10/2012 | Im et al. |
| 2002/0132972 A1 | 9/2002 | Giroux et al. |
| 2006/0230673 A1 | 10/2006 | Barford et al. |
| 2008/0172930 A1 | 7/2008 | Breuer et al. |
| 2008/0236043 A1 | 10/2008 | Dinjus et al. |
| 2009/0007484 A1* | 1/2009 | Smith ............................ 44/606 |
| 2009/0047721 A1 | 2/2009 | Trimbur et al. |
| 2010/0151112 A1 | 6/2010 | Franklin et al. |
| 2010/0163395 A1 | 7/2010 | Henrich et al. |
| 2010/0251616 A1 | 10/2010 | Paoluccio et al. |
| 2010/0269514 A1 | 10/2010 | Fullton, III |
| 2010/0320070 A1 | 12/2010 | Dewhitt |
| 2010/0323413 A1 | 12/2010 | Trimbur et al. |
| 2011/0114467 A1 | 5/2011 | Grispin |
| 2011/0123407 A1 | 5/2011 | Freel |
| 2011/0139596 A1 | 6/2011 | Bartek et al. |
| 2011/0139597 A1 | 6/2011 | Lin |
| 2011/0154720 A1* | 6/2011 | Bartek et al. .................... 44/307 |

(Continued)

FOREIGN PATENT DOCUMENTS

| | | |
|---|---|---|
| WO | WO/2005/019437 | 3/2005 |
| WO | WO/2008/151149 | 12/2008 |

(Continued)

OTHER PUBLICATIONS

PCT International Search Report and Written Opinion dated Oct. 30, 2012 issued in PCT/US2012/029517.
PCT International Preliminary Report on Patentability dated Sep. 17, 2013 issued in PCT/US2012/029517.
EP Supplementary European Search Report dated Jul. 14, 2014 issued in EP12757370.7.
Appel et al. (2004) "A multicopy vector system for genetic studies in *Mucor circinelloides* and other zygomycetes." *Molecular Genetics and Genomics* 271(5):595-602.
Banerjee et al. (2002) "*Botryococcus braunii* : A renewable source of hydrocarbons and other chemicals." Critical Reviews in Biotechnology 22(3): 245-279.
Chen et al. (2001) "Highly efficient expression of rabbit neutrophil peptide-1 gene in *Chlorella ellipsoidea* cells" *Current Genetics* 39(5-6): 365-370.

(Continued)

*Primary Examiner* — Walter D Griffin
*Assistant Examiner* — Chantel Graham
(74) *Attorney, Agent, or Firm* — Weaver Austin Villeneuve & Sampson LLP

(57) ABSTRACT

Oleaginous microbial biomass is subjected to pyrolysis to make microbial pyrolysis oil for use as a fuel or is otherwise formed into combustible products for the generation of heat and/or light.

13 Claims, No Drawings

(56) References Cited

U.S. PATENT DOCUMENTS

| | | | |
|---|---|---|---|
| 2011/0252696 A1 | 10/2011 | Franklin et al. | |
| 2011/0293785 A1 | 12/2011 | Franklin et al. | |
| 2012/0203018 A1 | 8/2012 | Franklin et al. | |
| 2012/0266531 A1* | 10/2012 | Hitchingham et al. | 44/505 |
| 2013/0114864 A1 | 5/2013 | Garcia et al. | |

FOREIGN PATENT DOCUMENTS

| | | |
|---|---|---|
| WO | WO/2010/059808 | 5/2010 |
| WO | WO/2010/063031 | 6/2010 |
| WO | WO/2010/063032 | 6/2010 |
| WO | WO/2010/120939 | 10/2010 |
| WO | WO/2011/072283 | 6/2011 |
| WO | WO/2011/150391 | 12/2011 |
| WO | WO/2012/125959 | 9/2012 |

OTHER PUBLICATIONS

Chow et al. (1999) "Electrotransformation of *Chlorella vulgaris*" *Plant Cell Reports* 18(9): 778-780.

Dawson et al. (1997) "Stable Transformation of *Chlorella* : Rescue of Nitrate Reductase-Deficient Mutants with the Nitrate Reductase Gene" *Current Microbiology* 35(6): 356-362.

El-Sheekh (1999) "Stable Transformation of the Intact Cells of *Chlorella* Kessleri with High Velocity Microprojectiles" *Biologia Plantarium* 42(2): 209-216.

Geresh et al. (2002) "Characterization of the extracellular polysaccharide of *Porphyridium* sp.: molecular weight determination and rheological properties" *Carb. Polym.* 50; 183-189.

Hawkins et al. (1999) "Expression of Human Growth Hormone by the Eukaryotic Alga, *Chlorella*" *Current Microbiology* 38(6): 335-341.

Huang et al. (2006) "Expression of mercuric reductase from *Bacillus megaterium* MB1 in eukaryotic microalga *Chlorella* sp. DT: an approach for mercury phytoremediation" *Appl Microbiol Biotechnol* (2006) 72: 197-205.

Illman et al. (2000) "Increase in *Chlorella* strains calorific values when grown in low nitrogen medium." *Enzyme and Microbial Technology* 27(8):631-635.

Iturriaga et al. (1992) "Heterologous transformation of *Mucor circinelloides* with the *Phycomyces blakesleeanus* leu1 gene." *Curr Genet*. 21(3):215-23.

Kalscheuer et al. (1999) "Establishment of a gene transfer system for *Rhodococcus opacus* PD630 based on electroporation and its application for recombinant biosynthesis of poly(3-hydroxyalkanoic acids)" *Applied Microbiology and Biotechnology*, 52(4): 508-515.

Kang et al. (2000) "The regulation activity of *Chlorella* virus gene 5' upstream sequence in *Escherichia coli* and eucaryotic alage" *Sheng Wu Gong Cheng Xue Bao.* 16(4): 443-6 [English Abstract—One Page—Downloaded from URL http://www.ncbi.nlm.nih.gov/pubmed/11051815 on Oct. 3, 2013].

Kim et al. (2002) "Stable Integration and Functional Expression of Flounder Growth Hormone Gene in Transformed Microalga, *Chlorella ellipsoidea*" *Marine Biotechnology* 4: 63-73.

Liu et al. (2007) "Effect of iron on growth and lipid accumulation in *Chlorella vulgaris*." *Bioresource Technology* 99(11):4717-22 [6 pages, doi:10.1016/j.biortech.2007.09.073].

Metzger et al. (2005) "*Botryococcus braunii*: a rich source for hydrocarbons and related ether lipids." *Appl Microbiol Biotechnol* 66(5): 486-496.

Miao et al. (2004) "High yield bio-oil production from fast pyrolysis by metabolic controlling of *Chlorella protothecoides*" *Jornal of Biotochnology* 110: 85-93.

Miao et al. (2006) "Biodiesel production from heterotrophic microalgal oil." *Biosource Technology* 97:841-846.

Park et al. (2005) "The 7th Molecular Plant-Microbe Interactions" *Plant Pathol. J* 21(1): 13-20.

Rodolfi et al. (2008) "Microalgae for Oil: Strain Selection, Induction of Lipid Synthesis and Outdoor Mass Cultivation in a Low-Cost Photobioreactor" *Biotechnology & Bioengineering* 102(1): 100-112 [Jun. 18 Epub ahead of print]).

Saha et al. (1995) "Transformation in *Aspergillus ochraceus*" *Current Microbiology* 30(2):83-86.

Sakuradani (2004) "Studies of Metabolic Engineering of Useful Lipid-producing Microorganisms" *NISR Research Grant* pp. 92-93.

Sheehan et al. (1998) "A Look Back at the U.S. Department of Energy's Aquatic Species Program—Biodiesel from Algae" *National Renewable Energy Laboratory NREL/TP-580-24190* pp. 1-294 [326 pages].

Solovchenko et al. (2007) "Effects of light intensity and nitrogen starvation on growth, total fatty acids and arachidonic acid in the green microalga *Parietochloris incisa*" *Journal of Applied Phycology* 20:245-251; DOI 10.1007/s10811-007-9233-0 (7 pages).

Takagi et al. (2006) "Effect of Salt Concentration on Intracellular Accumulation of Lipids and Triacylglyceride in Marine Microalgae *Dunaliella* Cells" *Journal of Bioscience and Bioengineering* 101(3): 223-226.

Waltermann et al. (2000) "*Rhodococcus opacus* strain PD630 as a new source of high-value single-cell oil? Isolation and characterization of triacylglycerols and other storage lipids" *Microbiology* 146: 1143-1149.

Zhang et al. (2007) "Malic enzyme: the controlling activity for lipid production? Overexpression of malic enzyme in *Mucor circinelloides* leads to a 2.5-fold increase in lipid accumulation." *Microbiology* 153(Pt.7): 2013-25.

\* cited by examiner

SEQUENCE LISTING

<160> NUMBER OF SEQ ID NOS: 27

<210> SEQ ID NO 1
<211> LENGTH: 573
<212> TYPE: DNA
<213> ORGANISM: Prototheca moriformis

<400> SEQUENCE: 1
tgttgaagaa tgagccggcg acttaaaata aatggcaggc taagagaatt aataactcga    60
aacctaagcg aaagcaagtc ttaatagggc gctaatttaa caaaacatta aataaaatct   120

```
aaagtcattt attttagacc cgaacctgag tgatctaacc atggtcagga tgaaacttgg      180
gtgacaccaa gtggaagtcc gaaccgaccg atgttgaaaa atcggcggat gaactgtggt      240
tagtggtgaa ataccagtcg aactcagagc tagctggttc tccccgaaat gcgttgaggc      300
gcagcaatat atctcgtcta tctaggggta agcactgtt tcggtgcggg ctatgaaaat       360
ggtaccaaat cgtggcaaac tctgaatact agaaatgacg atatattagt gagactatgg      420
gggataagct ccatagtcga gagggaaaca gcccagacca ccagttaagg ccccaaaatg      480
ataatgaagt ggtaaaggag gtgaaaatgc aaatacaacc aggaggttgg cttagaagca      540
gccatccttt aaagagtgcg taatagctca ctg                                   573

<210> SEQ ID NO 2
<211> LENGTH: 50
<212> TYPE: DNA
<213> ORGANISM: Chlorella vulgaris

<400> SEQUENCE: 2
tgacctaggt gattaattaa ctcgaggcag cagcagctcg gatagtatcg                 50

<210> SEQ ID NO 3
<211> LENGTH: 45
<212> TYPE: DNA
<213> ORGANISM: Chlorella vulgaris

<400> SEQUENCE: 3
ctacgagctc aagctttcca tttgtgttcc catcccacta cttcc                      45

<210> SEQ ID NO 4
<211> LENGTH: 32
<212> TYPE: DNA
<213> ORGANISM: Chlorella sorokiniana

<400> SEQUENCE: 4
gatcagaatt ccgcctgcaa cgcaagggca gc                                    32

<210> SEQ ID NO 5
<211> LENGTH: 30
<212> TYPE: DNA
<213> ORGANISM: Chlorella sorokiniana

<400> SEQUENCE: 5
gcatactagt ggcgggacgg agagagggcg                                       30

<210> SEQ ID NO 6
<211> LENGTH: 1568
<212> TYPE: DNA
<213> ORGANISM: Artificial
<220> FEATURE:
<223> OTHER INFORMATION: beta-tubulin::neo::nit construct

<400> SEQUENCE: 6
gaattccttt cttgcgctat gacacttcca gcaaaaggta gggcgggctg cgagacggct      60
tcccggcgct gcatgcaaca ccgatgatgc ttcgaccccc cgaagctcct tcggggctgc     120
atgggcgctc cgatgccgct ccagggcgag cgctgtttaa atagccaggc cccgattgc      180 aaagacatta tagcgagcta ccaaagccat attcaaacac ctagatcact accacttcta     240
cacaggccac tcgagcttgt gatcgcactc cgctaagggg gcgcctcttc ctcttcgttt     300
cagtcacaac ccgcaaacgg cgcgccatat caatgattga acaagatgga ttgcacgcag     360
gttctccggc cgcttgggtg gagaggctat tcggctatga ctgggcacaa cagacaatcg     420
```

```
gctgctctga tgccgccgtg ttccggctgt cagcgcaggg gcgcccggtt cttttttgtca      480 agaccgacct gtccggtgcc ctgaatgaac tgcaggacga ggcagcgcgg ctatcgtggc      540
tggccacgac gggcgttcct tgcgcagctg tgctcgacgt tgtcactgaa gcgggaaggg      600
actggctgct attgggcgaa gtgccggggc aggatctcct gtcatctcac cttgctcctg      660
ccgagaaagt atccatcatg gctgatgcaa tgcggcggct gcatacgctt gatccggcta      720
cctgcccatt cgaccaccaa gcgaaacatc gcatcgagcg agcacgtact cggatggaag      780
ccggtcttgt cgatcaggat gatctggacg aagagcatca ggggctcgcg ccagccgaac      840
tgttcgccag gctcaaggcg cgcatgcccg acggcgagga tctcgtcgtg acccatggcg      900
atgcctgctt gccgaatatc atggtggaaa atggccgctt ttctggattc atcgactgtg      960
gccggctggg tgtggcggac cgctatcagg acatagcgtt ggctacccgt gatattgctg     1020
aagagcttgg cggcgaatgg gctgaccgct tcctcgtgct ttacggtatc gccgctcccg     1080
attcgcagcg catcgccttc tatcgccttc ttgacgagtt cttctaagat ctgtcgatcg     1140
acaagtgact cgaggcagca gcagctcgga tagtatcgac acactctgga cgctggtcgt     1200
gtgatggact gttgccgcca cacttgctgc cttgacctgt gaatatccct gccgctttta     1260
tcaaacagcc tcagtgtgtt tgatcttgtg tgtacgcgct tttgcgagtt gctagctgct     1320
tgtgctattt gcgaatacca cccccagcat ccccttccct cgtttcatat cgcttgcatc     1380
ccaaccgcaa cttatctacg ctgtcctgct atccctcagc gctgctcctg ctcctgctca     1440
ctgcccctcg cacagccttg gtttgggctc cgcctgtatt ctcctggtac tgcaacctgt     1500
aaaccagcac tgcaatgctg atgcacggga agtagtggga tgggaacaca aatggaaagc     1560
ttgagctc                                                              1568

<210> SEQ ID NO 7
<211> LENGTH: 2571
<212> TYPE: DNA
<213> ORGANISM: Artificial
<220> FEATURE:
<223> OTHER INFORMATION: glutamate dehydrogenase:neo:nit construct
<220> FEATURE:
<221> NAME/KEY: misc_feature
<222> LOCATION: (997)..(999)
<223> OTHER INFORMATION: n is a, c, g, or t

<400> SEQUENCE: 7
gaattccgcc tgcaacgcaa gggcagccac agccgctccc acccgccgct gaaccgacac       60
gtgcttgggc gcctgccgcc tgcctgccgc atgcttgtgc tggtgaggct gggcagtgct      120
gccatgctga ttgaggcttg gttcatcggg tggaagctta tgtgtgtgct gggcttgcat      180
gccgggcaat gcgcatggtg gcaagagggc ggcagcactt gctggacgtg ccgcggtgcc      240
tccaggtggt tcaatcgcgg cagccagagg gatttcagat gatcgcgcgt acaggttgag      300
cagcagtgtc agcaaaggta gcagtttgcc agaatgatcg gttcagctgt taatcaatgc      360
cagcaagaga aggggtcaag tgcaaacacg ggcatgccac agcacgggca ccggggagtg      420
gaatggcacc accaagtgtg tgcgagccag catcgccgcc tggctgtttc agctacaacg      480
gcaggagtca tccaactaac catagctgat caacactgca atcatcggcg gctgatgcaa      540
gcatcctgca agacacatgc tgtgcgatgc tgcgctgctg cctgctgcgc acgccgttga      600
gttggcagca gctcagccat gcactggatc aggctgggct gccactgcaa tgtggtggat      660
aggatgcaag tggagcgaat accaaaccct ctggctgctt gctgggttgc atggcatcgc      720
```

```
accatcagca ggagcgcatg cgaagggact ggccccatgc acgccatgcc aaaccggagc    780
gcaccgagtg tccacactgt caccaggccc gcaagctttg cagaaccatg ctcatggacg    840
catgtagcgc tgacgtccct tgacggcgct cctctcgggt gtgggaaacg caatgcagca    900
caggcagcag aggcggcggc agcagagcgg cggcagcagc ggcgggggcc acccttcttg    960
cggggtcgcg ccccagccag cggtgatgcg ctgatcnnnc aaacgagtt cacattcatt   1020
tgcagcctgg agaagcgagg ctggggcctt tgggctggtg cagcccgcaa tggaatgcgg   1080
gaccgccagg ctagcagcaa aggcgcctcc cctactccgc atcgatgttc catagtgcat   1140
tggactgcat ttgggtgggg cggccggctg tttctttcgt gttgcaaaac gcgccacgtc   1200
agcaacctgt cccgtgggtc ccccgtgccg atgaaatcgt gtgcacgccg atcagctgat   1260
tgcccggctc gcgaagtagg cgccctcttt ctgctcgccc tctctccgtc ccgccactag   1320
tggcgcgcca tatcaatgat tgaacaagat ggattgcacg caggttctcc ggccgcttgg   1380
gtggagaggc tattcggcta tgactgggca acagacaa tcggctgctc tgatgccgcc    1440
gtgttccggc tgtcagcgca ggggcgcccg gttcttttg tcaagaccga cctgtccggt    1500
gccctgaatg aactgcagga cgaggcagcg cggctatcgt ggctggccac gacgggcgtt   1560
ccttgcgcag ctgtgctcga cgttgtcact gaagcgggaa gggactggct gctattgggc   1620
gaagtgccgg gcaggatct cctgtcatct caccttgctc ctgccgagaa agtatccatc    1680
atggctgatg caatgcggcg gctgcatacg cttgatccgg ctacctgccc attcgaccac   1740
caagcgaaac atcgcatcga gcgagcacgt actcggatgg aagccggtct tgtcgatcag   1800
gatgatctgg acgaagagca tcaggggctc gcgccagccg aactgttcgc caggctcaag   1860
gcgcgcatgc ccgacggcga ggatctcgtc gtgacccatg gcgatgcctg cttgccgaat   1920
atcatggtgg aaaatggccg cttttctgga ttcatcgact gtggccggct gggtgtggcg   1980
gaccgctatc aggacatagc gttggctacc cgtgatattg ctgaagagct tggcggcgaa   2040
tgggctgacc gcttcctcgt gctttacggt atcgccgctc ccgattcgca gcgcatcgcc   2100
ttctatcgcc ttcttgacga gttcttctaa gatctgtcga tcgacaagtg actcgaggca   2160
gcagcagctc ggatagtatc gacacactct ggacgctggt cgtgtgatgg actgttgccg   2220
ccacacttgc tgccttgacc tgtgaatatc cctgccgctt ttatcaaaca gcctcagtgt   2280
gtttgatctt gtgtgtacgc gcttttgcga gttgctagct gcttgtgcta tttgcgaata   2340
ccaccccag catccccttc cctcgtttca tatcgcttgc atcccaaccg caacttatct   2400
acgctgtcct gctatccctc agcgctgctc ctgctcctgc tcactgcccc tcgcacagcc   2460
ttggtttggg ctccgcctgt attctcctgg tactgcaacc tgtaaaccag cactgcaatg   2520
ctgatgcacg ggaagtagtg ggatgggaac acaaatggaa agcttgagct c           2571
```

<210> SEQ ID NO 8
<211> LENGTH: 2550
<212> TYPE: DNA
<213> ORGANISM: Artificial
<220> FEATURE:
<223> OTHER INFORMATION: codon-optimized glutamate dehydrogenase:neo:nit
<220> FEATURE:
<221> NAME/KEY: misc_feature
<222> LOCATION: (997)..(999)
<223> OTHER INFORMATION: n is a, c, g, or t

<400> SEQUENCE: 8

```
gaattccgcc tgcaacgcaa gggcagccac agccgctccc accgccgct gaaccgacac     60
gtgcttgggc gcctgccgcc tgcctgccgc atgcttgtgc tggtgaggct gggcagtgct   120
```

```
gccatgctga ttgaggcttg gttcatcggg tggaagctta tgtgtgtgct gggcttgcat     180
gccgggcaat gcgcatggtg gcaagagggc ggcagcactt gctggacgtg ccgcggtgcc     240
tccaggtggt tcaatcgcgg cagccagagg gatttcagat gatcgcgcgt acaggttgag     300
cagcagtgtc agcaaaggta gcagtttgcc agaatgatcg gttcagctgt taatcaatgc     360
cagcaagaga agggtcaag tgcaaacacg ggcatgccac agcacgggca ccggggagtg     420
gaatggcacc accaagtgtg tgcgagccag catcgccgcc tggctgtttc agctacaacg     480
gcaggagtca tccaactaac catagctgat caacactgca atcatcggcg gctgatgcaa     540
gcatcctgca agacacatgc tgtgcgatgc tgcgctgctg cctgctgcgc acgccgttga     600
gttggcagca gctcagccat gcactggatc aggctgggct gccactgcaa tgtggtggat     660
aggatgcaag tggagcgaat accaaaccct ctggctgctt gctgggttgc atggcatcgc     720
accatcagca ggagcgcatg cgaagggact ggccccatgc acgccatgcc aaaccggagc     780
gcaccgagtg tccacactgt caccaggccc gcaagctttg cagaaccatg ctcatggacg     840
catgtagcgc tgacgtccct tgacggcgct cctctcgggt gtgggaaacg caatgcagca     900
caggcagcag aggcggcggc agcagagcgg cggcagcagc ggcgggggcc acccttcttg     960
cggggtcgcg ccccagccag cggtgatgcg ctgatcnnnc aaaacgagtt cacattcatt    1020
tgcagcctgg agaagcgagg ctggggcctt tgggctggtg cagcccgcaa tggaatgcgg    1080
gaccgccagg ctagcagcaa aggcgcctcc cctactccgc atcgatgttc catagtgcat    1140
tggactgcat ttgggtgggg cggccggctg tttctttcgt gttgcaaaac gcgccacgtc    1200
agcaacctgt cccgtgggtc ccccgtgccg atgaaatcgt gtgcacgccg atcagctgat    1260
tgcccggctc gcgaagtagg cgccctcttt ctgctcgccc tctctccgtc ccgccactag    1320
tggcgcgcca tatcaatgat cgagcaggac ggcctccacg ccggctcccc cgccgcctgg    1380
gtggagcgcc tgttcggcta cgactgggcc cagcagacca tcggctgctc cgacgccgcc    1440
gtgttccgcc tgtccgccca gggccgcccc gtgctgttcg tgaagaccga cctgtccggc    1500
gccctgaacg agctgcagga cgaggccgcc cgcctgtcct ggctggccac caccggcgtg    1560
ccctgcgccg ccgtgctgga cgtggtgacc gaggccggcc gcgactggct gctgctgggc    1620
gaggtgcccg ccaggacct gctgtcctcc cacctggccc ccgccgagaa ggtgtccatc    1680
atggccgacg ccatgcgccg cctgcacacc ctggaccccg ccacctgccc cttcgaccac    1740
caggccaagc accgcatcga gcgcgcccgc acccgcatgg aggccggcct ggtggaccag    1800
gacgacctgg acgaggagca ccaggggctg gcccccgccg agctgttcgc ccgcctgaag    1860
gcccgcatgc ccgacggcga ggacctggtg gtgacccacg gcgacgcctg cctgcccaac    1920
atcatggtgg agaacggccg cttctccggc ttcatcgact gcggccgcct gggcgtggcc    1980
gaccgctacc aggacatcgc cctggccacc cgcgacatcg ccgaggagct gggcggcgag    2040
tgggccgacc gcttcctggt gctgtacggc atcgccgccc ccgactccca gcgcatcgcc    2100
ttctaccgcc tgctggacga gttcttctga ctcgaggcag cagcagctcg gatagtatcg    2160
acacactctg gacgctggtc gtgtgatgga ctgttgccgc acacttgct gccttgacct    2220 gtgaatatcc ctgccgcttt tatcaaacag cctcagtgtg tttgatcttg tgtgtacgcg    2280
cttttgcgag ttgctagctg cttgtgctat ttgcgaatac caccccagc atccccttcc    2340 ctcgtttcat atcgcttgca tcccaaccgc aacttatcta cgctgtcctg ctatccctca    2400
gcgctgctcc tgctcctgct cactgcccct cgcacagcct tggtttgggc tccgcctgta    2460
```

| | |
|---|---|
| ttctcctggt actgcaacct gtaaaccagc actgcaatgc tgatgcacgg gaagtagtgg | 2520 |
| gatgggaaca caaatggaaa gcttgagctc | 2550 |

<210> SEQ ID NO 9
<211> LENGTH: 1547
<212> TYPE: DNA
<213> ORGANISM: Artificial
<220> FEATURE:
<223> OTHER INFORMATION: codon-optimized beta-tubulin::neo::nit construct

<400> SEQUENCE: 9

| | |
|---|---|
| gaattcctttt cttgcgctat gacacttcca gcaaaaggta gggcgggctg cgagacggct | 60 |
| tcccggcgct gcatgcaaca ccgatgatgc ttcgaccccc cgaagctcct tcggggctgc | 120 |
| atgggcgctc cgatgccgct ccagggcgag cgctgtttaa atagccaggc ccccgattgc | 180 |
| aaagacatta tagcgagcta ccaaagccat attcaaacac ctagatcact accacttcta | 240 |
| cacaggccac tcgagcttgt gatcgcactc cgctaagggg cgcctcttc ctcttcgttt | 300 |
| cagtcacaac ccgcaaacgg cgcgccatat caatgatcga gcaggacggc ctccacgccg | 360 |
| gctcccccgc cgcctgggtg gagcgcctgt tcggctacga ctgggcccag cagaccatcg | 420 |
| gctgctccga cgccgccgtg ttccgcctgt ccgcccaggg ccgccccgtg ctgttcgtga | 480 |
| agaccgacct gtccggcgcc ctgaacgagc tgcaggacga ggccgcccgc ctgtcctggc | 540 |
| tggccaccac cggcgtgccc tgcgccgccg tgctggacgt ggtgaccgag gccggccgcg | 600 |
| actggctgct gctgggcgag gtgcccggcc aggacctgct gtcctcccac ctggcccccg | 660 |
| ccgagaaggt gtccatcatg gccgacgcca tgcgccgcct gcacaccctg gaccccgcca | 720 |
| cctgcccctt cgaccaccag gccaagcacc gcatcgagcg cgcccgcacc cgcatggagg | 780 |
| ccggcctggt ggaccaggac gacctggacg aggagcacca gggcctggcc ccgccgagc | 840 |
| tgttcgcccg cctgaaggcc cgcatgcccg acggcgagga cctggtggtg acccacggcg | 900 |
| acgcctgcct gcccaacatc atggtggaga acggccgctt ctccggcttc atcgactgcg | 960 |
| gccgcctggg cgtggccgac cgctaccagg acatcgccct ggccaccgc gacatcgccg | 1020 |
| aggagctggg cggcgagtgg gccgaccgct tcctggtgct gtacggcatc gccgcccccg | 1080 |
| actcccagcg catcgccttc taccgcctgc tggacgagtt cttctgactc gaggcagcag | 1140 |
| cagctcggat agtatcgaca cactctggac gctggtcgtg tgatggactg ttgccgccac | 1200 |
| acttgctgcc ttgacctgtg aatatccctg ccgcttttat caaacagcct cagtgtgttt | 1260 |
| gatcttgtgt gtacgcgctt ttgcgagttg ctagctgctt gtgctatttg cgaataccac | 1320 |
| ccccagcatc cccttccctc gtttcatatc gcttgcatcc caaccgcaac ttatctacgc | 1380 |
| tgtcctgcta tccctcagcg ctgctcctgc tcctgctcac tgcccctcgc acagccttgg | 1440 |
| tttgggctcc gcctgtattc tcctggtact gcaacctgta aaccagcact gcaatgctga | 1500 |
| tgcacgggaa gtagtgggat gggaacacaa atggaaagct tgagctc | 1547 |

<210> SEQ ID NO 10
<211> LENGTH: 21
<212> TYPE: DNA
<213> ORGANISM: Artificial
<220> FEATURE:
<223> OTHER INFORMATION: NeoR forward primer

<400> SEQUENCE: 10

| | |
|---|---|
| gccgcgactg gctgctgctg g | 21 |

<210> SEQ ID NO 11
<211> LENGTH: 22
<212> TYPE: DNA
<213> ORGANISM: Artificial
<220> FEATURE:
<223> OTHER INFORMATION: NeoR reverse primer

<400> SEQUENCE: 11
aggtcctcgc cgtcgggcat gc                                           22

<210> SEQ ID NO 12
<211> LENGTH: 2357
<212> TYPE: DNA
<213> ORGANISM: Artificial
<220> FEATURE:
<223> OTHER INFORMATION: Cr-beta-tub::NCO-suc2::CvNitRed construct

<400> SEQUENCE: 12
ctttcttgcg ctatgacact tccagcaaaa ggtagggcgg gctgcgagac ggcttcccgg      60
cgctgcatgc aacaccgatg atgcttcgac cccccgaagc tccttcgggg ctgcatgggc     120
gctccgatgc cgctccaggg cgagcgctgt ttaaatagcc aggcccccga ttgcaaagac     180
attatagcga gctaccaaag ccatattcaa acacctagat cactaccact tctacacagg     240
ccactcgagc ttgtgatcgc actccgctaa gggggcgcct cttcctcttc gtttcagtca     300
caacccgcaa acggcgcgcc atatcaatgc ttcttcaggc cttctttttt cttcttgctg     360
gttttgctgc caagatcagc gcctctatga cgaacgaaac ctcggataga ccacttgtgc     420 acttacacc aaacaagggc tggatgaatg accccaatgg actgtggtac gacgaaaaag     480
atgccaagtg gcatctgtac tttcaataca acccgaacga tactgtctgg gggacgccat     540
tgttttgggg ccacgccacg tccgacgacc tgaccaattg ggaggaccaa ccaatagcta     600
tcgctccgaa gaggaacgac tccggagcat ctcgggttc catggtggtt gactacaaca     660
atacttccgg cttttcaac gataccattg cccgagaca acgctgcgtg ccatatgga     720 cttacaacac accggagtcc gaggagcagt acatctcgta tagcctggac ggtggataca     780
cttttacaga gtatcagaag aaccctgtgc ttgctgcaaa ttcgactcag ttccgagatc     840
cgaaggtctt ttggtacgag ccctcgcaga gtggatcat acagcggca agtcacagg     900 actacaagat cgaaatttac tcgtctgacg accttaaatc ctggaagctc gaatccgcgt     960
tcgcaaacga gggctttctc ggctaccaat acgaatgccc aggcctgata gaggtcccaa    1020
cagagcaaga tcccagcaag tcctactggg tgatgtttat ttccattaat ccaggagcac    1080
cggcaggagg ttcttttaat cagtacttcg tcggaagctt taacggaact catttcgagg    1140
catttgataa ccaatcaaga gtagttgatt ttggaaagga ctactatgcc ctgcagactt    1200
tcttcaatac tgacccgacc tatgggagcg ctcttggcat tgcgtgggct tctaactggg    1260
agtattccgc attcgttcct acaaacctt ggaggtcctc catgtcgctc gtgaggaaat    1320
tctctctcaa cactgagtac caggccaacc cggaaaccga actcataaac ctgaaagccg    1380
aaccgatcct gaacattagc aacgctggcc cctggagccg gtttgcaacc aacaccacgt    1440
tgacgaaagc caacagctac aacgtcgatc tttcgaatag caccggtaca cttgaatttg    1500
aactggtgta tgccgtcaat accacccaaa cgatctcgaa gtcggtgttc gcggacctct    1560
ccctctggtt taaggcctg gaagaccccg aggagtacct cagaatgggt ttcgaggttt    1620
ctgcgtcctc cttcttcctt gatcgcggga acagcaaagt aaaatttgtt aaggagaacc    1680 catatttac caacaggatg agcgttaaca accaaccatt caagagcgaa aacgacctgt    1740

```
cgtactacaa agtgtatggt ttgcttgatc aaaatatcct ggaactctac ttcaacgatg    1800
gtgatgtcgt gtccaccaac acatacttca tgacaaccgg gaacgcactg ggctccgtga    1860
acatgacgac gggtgtggat aacctgttct acatcgacaa attccaggtg agggaagtca    1920
agtgagatct gtcgatcgac aagctcgagg cagcagcagc tcggatagta tcgacacact    1980
ctggacgctg tcgtgtgat ggactgttgc cgccacactt gctgccttga cctgtgaata    2040
tccctgccgc ttttatcaaa cagcctcagt gtgtttgatc ttgtgtgtac gcgcttttgc    2100
gagttgctag ctgcttgtgc tatttgcgaa taccaccccc agcatcccct tccctcgttt    2160
catatcgctt gcatcccaac cgcaacttat ctacgctgtc ctgctatccc tcagcgctgc    2220
tcctgctcct gctcactgcc cctcgcacag ccttggtttg ggctccgcct gtattctcct    2280
ggtactgcaa cctgtaaacc agcactgcaa tgctgatgca cgggaagtag tgggatggga    2340
acacaaatgg aaagctt                                                   2357

<210> SEQ ID NO 13
<211> LENGTH: 2335
<212> TYPE: DNA
<213> ORGANISM: Artificial
<220> FEATURE:
<223> OTHER INFORMATION: codon-optimized Cr-beta-tub::NCO-suc2::CvNitRed
      construct

<400> SEQUENCE: 13
ctttcttgcg ctatgacact tccagcaaaa ggtagggcgg gctgcgagac ggcttcccgg      60
cgctgcatgc aacaccgatg atgcttcgac cccccgaagc tccttcgggg ctgcatgggc     120
gctccgatgc cgctccaggg cgagcgctgt ttaaatagcc aggccccga ttgcaaagac     180 attatagcga gctaccaaag ccatattcaa acacctagat cactaccact tctacacagg     240
ccactcgagc ttgtgatcgc actccgctaa gggggcgcct cttcctcttc gtttcagtca     300
caacccgcaa acggcgcgcc atgctgctgc aggccttcct gttcctgctg ccggcttcg     360 ccgccaagat cagcgcctcc atgacgaacg agacgtccga ccgcccctg gtgcacttca     420 cccccaacaa gggctggatg aacgaccccca acggcctgtg gtacgacgag aaggacgcca     480
agtggcacct gtacttccag tacaacccga cgacaccgt ctgggggacg cccttgttct     540
ggggccacgc cacgtccgac gacctgacca actgggagga ccagcccatc gccatcgccc     600
cgaagcgcaa cgactccggc gccttctccg gctccatggt ggtggactac aacaacacct     660
ccggcttctt caacgacacc atcgaccgc gccagcgctg cgtggccatc tggacctaca     720
acaccccgga gtccgaggag cagtacatct cctacagcct ggacggcggc tacaccttca     780
ccgagtacca gaagaacccc gtgctggccc ccaactccac ccagttccgc gacccgaagg     840
tcttctggta cgagccctcc cagaagtgga tcatgaccgc ggccaagtcc caggactaca     900
agatcgagat ctactcctcc gacgacctga agtcctggaa gctggagtcc gcgttcgcca     960
acgagggctt cctcggctac cagtacgagt gccccgccct gatcgaggtc cccaccgagc    1020 aggacccccag caagtcctac tgggtgatgt tcatctccat caacccggc gccccggccg    1080 gcggctcctt caaccagtac ttcgtcggca gcttcaacgg cacccacttc gaggccttcg    1140
acaaccagtc ccgcgtggtg gacttcggca aggactacta cgccctgcag accttcttca    1200
acaccgaccc gacctacggg agcccctgg gcatcgcgtg ggcctccaac tgggagtact    1260
ccgccttcgt gcccaccaac cctggcgct cctccatgtc cctcgtgcgc aagttctccc    1320
tcaacaccga gtaccaggcc aacccggaga cggagctgat caacctgaag gccgagccga    1380
```

```
tcctgaacat cagcaacgcc ggccctgga gccggttcgc caccaacacc acgttgacga      1440
aggccaacag ctacaacgtc gacctgtcca acagcaccgg caccctggag ttcgagctgg      1500
tgtacgccgt caacaccacc cagacgatct ccaagtccgt gttcgcggac ctctccctct      1560
ggttcaaggg cctggaggac cccgaggagt acctccgcat gggcttcgag gtgtccgcgt      1620
cctccttctt cctggaccgc gggaacagca aggtgaagtt cgtgaaggag aaccccctact     1680 tcaccaaccg catgagcgtg aacaaccagc ccttcaagag cgagaacgac ctgtcctact      1740
acaaggtgta cggcttgctg gaccagaaca tcctggagct gtacttcaac gacggcgacg      1800
tcgtgtccac caacacctac ttcatgacca ccgggaacgc cctgggctcc gtgaacatga      1860 cgacggggt ggacaacctg ttctacatcg acaagttcca ggtgcgcgag gtcaagtgat       1920
taattaactc gaggcagcag cagctcggat agtatcgaca cactctggac gctggtcgtg      1980
tgatggactg ttgccgccac acttgctgcc ttgacctgtg aatatccctg ccgcttttat      2040
caaacagcct cagtgtgttt gatcttgtgt gtacgcgctt ttgcgagttg ctagctgctt      2100
gtgctatttg cgaataccac ccccagcatc cccttccctc gtttcatatc gcttgcatcc      2160
caaccgcaac ttatctacgc tgtcctgcta ccctcagcg ctgctcctgc tcctgctcac       2220
tgcccctcgc acagccttgg tttgggctcc gcctgtattc tcctggtact gcaacctgta      2280
aaccagcact gcaatgctga tgcacgggaa gtagtgggat gggaacacaa atgga          2335

<210> SEQ ID NO 14
<211> LENGTH: 20
<212> TYPE: DNA
<213> ORGANISM: Artificial
<220> FEATURE:
<223> OTHER INFORMATION: neomycin resistance gene forward primer

<400> SEQUENCE: 14
ccgccgtgct ggacgtggtg                                                    20

<210> SEQ ID NO 15
<211> LENGTH: 20
<212> TYPE: DNA
<213> ORGANISM: Artificial
<220> FEATURE:
<223> OTHER INFORMATION: neomycin resistance gene reverse primer

<400> SEQUENCE: 15
ggtggcgggg tccagggtgt                                                    20

<210> SEQ ID NO 16
<211> LENGTH: 20
<212> TYPE: DNA
<213> ORGANISM: Saccharomyces cerevisiae

<400> SEQUENCE: 16
cggccggcgg ctccttcaac                                                    20

<210> SEQ ID NO 17
<211> LENGTH: 20
<212> TYPE: DNA
<213> ORGANISM: Saccharomyces cerevisiae

<400> SEQUENCE: 17
ggcgctcccg taggtcgggt                                                    20

<210> SEQ ID NO 18
```

```
<211> LENGTH: 1335
<212> TYPE: DNA
<213> ORGANISM: Chlorella sorokiniana

<400> SEQUENCE: 18
cgcctgcaac gcaagggcag ccacagccgc tcccacccgc cgctgaaccg acacgtgctt      60
gggcgcctgc cgcctgcctg ccgcatgctt gtgctggtga ggctgggcag tgctgccatg     120
ctgattgagg cttggttcat cgggtggaag cttatgtgtg tgctgggctt gcatgccggg     180
caatgcgcat ggtggcaaga gggcggcagc acttgctgga gctgccgcgg tgcctccagg     240
tggttcaatc gcggcagcca gagggatttc agatgatcgc gcgtacaggt tgagcagcag     300
tgtcagcaaa ggtagcagtt tgccagaatg atcggttcag ctgttaatca atgccagcaa     360 gagaagggt caagtgcaaa cacgggcatg ccacagcacg ggcaccgggg agtggaatgg      420
caccaccaag tgtgtgcgag ccagcatcgc cgcctggctg tttcagctac aacggcagga     480
gtcatccaac gtaaccatga gctgatcaac actgcaatca tcgggcgggc gtgatgcaag     540
catgcctggc gaagacacat ggtgtgcgga tgctgccggc tgctgcctgc tgcgcacgcc     600
gttgagttgg cagcaggctc agccatgcac tggatggcag ctgggctgcc actgcaatgt     660
ggtggatagg atgcaagtgg agcgaatacc aaaccctctg gctgcttgct gggttgcatg     720
gcatcgcacc atcagcagga gcgcatgcga agggactggc cccatgcacg ccatgccaaa     780
ccggagcgca ccgagtgtcc acactgtcac caggcccgca agctttgcag aaccatgctc     840
atggacgcat gtagcgctga cgtcccttga cggcgctcct ctcgggtgtg ggaaacgcaa     900
tgcagcacag gcagcagagg cggcggcagc agagcggcgg cagcagcggc ggggggccacc    960 cttcttgcgg ggtcgcgccc cagccagcgg tgatgcgctg atcccaaacg agttcacatt    1020
catttgcatg cctggagaag cgaggctggg gcctttgggc tggtgcagcc cgcaatggaa    1080
tgcgggaccg ccaggctagc agcaaaggcg cctcccctac tccgcatcga tgttccatag    1140
tgcattggac tgcatttggg tggggcgcc ggctgtttct ttcgtgttgc aaaacgcgcc     1200
agctcagcaa cctgtcccgt gggtcccccg tgccgatgaa atcgtgtgca cgccgatcag    1260
ctgattgccc ggctcgcgaa gtaggcgccc tcctttctgc tcgccctctc tccgtcccgc    1320
cactagtggc gcgcc                                                     1335

<210> SEQ ID NO 19
<211> LENGTH: 1146
<212> TYPE: DNA
<213> ORGANISM: Umbellularia californica

<400> SEQUENCE: 19
atggccacca ccagcctggc ctccgccttc tgctccatga aggccgtgat gctggcccgc      60
gacggccgcg gcatgaagcc ccgcagctcc gacctgcagc tgcgcgccgg caacgccccc    120
acctccctga gatgatcaa cggcaccaag ttcagctaca ccgagagcct gaagcgcctg    180
cccgactggt ccatgctgtt cgccgtgatc accaccatct tcagcgccgc cgagaagcag    240
tggaccaacc tggagtggaa gcccaagccc aagctgcccc agctgctgga cgaccacttc    300
ggcctgcacg gcctggtgtt ccgccgcacc ttcgccatcc gctcctacga ggtgggcccc    360
gaccgcagca cctccatcct ggccgtgatg aaccacatgc aggaggccac cctgaaccac    420
gccaagagcg tgggcatcct gggcgacggc ttcggcacca ccctggagat gtccaagcgc    480
gacctgatgt gggtggtgcg ccgcacccac gtggccgtgg agcgctaccc cacctggggc    540
gacaccgtgg aggtggagtg ctggatcggc gccagcggca acaacggcat gcgccgcgac    600
```

```
ttcctggtgc gcgactgcaa gaccggcgag atcctgaccc gctgcacctc cctgagcgtg      660
ctgatgaaca cccgcacccg ccgcctgagc accatccccg acgaggtgcg cggcgagatc      720
ggccccgcct tcatcgacaa cgtggccgtg aaggacgacg agatcaagaa gctgcagaag      780
ctgaacgact ccaccgccga ctacatccag ggcggcctga ccccccgctg gaacgacctg      840
gacgtgaacc agcacgtgaa caacctgaag tacgtggcct gggtgttcga ccgtgccc      900 gacagcatct tcgagtccca ccacatcagc tccttcaccc tggagtaccg ccgcgagtgc      960
acccgcgact ccgtgctgcg cagcctgacc accgtgagcg gcggcagctc cgaggccggc     1020
ctggtgtgcg accacctgct gcagctggag ggcggcagcg aggtgctgcg cgcccgcacc     1080
gagtggcgcc ccaagctgac cgactccttc gcggcatca gcgtgatccc cgccgagccc     1140
cgcgtg                                                                1146

<210> SEQ ID NO 20
<211> LENGTH: 1146
<212> TYPE: DNA
<213> ORGANISM: Cinnamomum camphora

<400> SEQUENCE: 20
atggccacca cctccctggc ctccgccttc tgcagcatga aggccgtgat gctggcccgc       60
gacggccgcg gcatgaagcc ccgctccagc gacctgcagc tgcgcgccgg caacgcccag      120
acctccctga agatgatcaa cggcaccaag ttctcctaca ccgagagcct gaagaagctg      180
cccgactggt ccatgctgtt cgccgtgatc accaccatct tctccgccgc cgagaagcag      240
tggaccaacc tggagtggaa gcccaagccc aaccccccc agctgctgga cgaccacttc      300
ggcccccacg gctggtgtt ccgccgcacc ttcgccatcc gcagctacga ggtgggcccc      360
gaccgctcca ccagcatcgt ggccgtgatg aaccacctgc aggaggccgc cctgaaccac      420
gccaagtccg tgggcatcct gggcgacggc ttcggcacca ccctggagat gtccaagcgc      480
gacctgatct gggtggtgaa gcgcacccac gtggccgtgg agcgctaccc cgcctggggc      540
gacaccgtgg aggtggagtg ctgggtgggc gcctccggca acaacggccg ccgccacgac      600
ttcctggtgc gcgactgcaa gaccggcgag atcctgaccc gctgcacctc cctgagcgtg      660
atgatgaaca cccgcacccg ccgcctgagc aagatccccg aggaggtgcg cggcgagatc      720
ggccccgcct tcatcgacaa cgtggccgtg aaggacgagg agatcaagaa gccccagaag      780
ctgaacgact ccaccgccga ctacatccag ggcggcctga ccccccgctg gaacgacctg      840
gacatcaacc agcacgtgaa caacatcaag tacgtggact ggatcctgga ccgtgccc      900 gacagcatct tcgagagcca ccacatctcc tccttcacca tcgagtaccg ccgcgagtgc      960
accatggaca gcgtgctgca gtccctgacc accgtgagcg gcggtcctc cgaggccggc     1020 ctggtgtgcg agcacctgct gcagctggag ggcggcagcg aggtgctgcg cgccaagacc     1080
gagtggcgcc ccaagctgac cgactccttc gcggcatca gcgtgatccc cgccgagtcc     1140
agcgtg                                                                1146

<210> SEQ ID NO 21
<211> LENGTH: 72
<212> TYPE: DNA
<213> ORGANISM: Artificial
<220> FEATURE:
<223> OTHER INFORMATION: coding sequence for a C-terminal 3x-FLAG tag

<400> SEQUENCE: 21
```

```
atggactaca aggaccacga cggcgactac aaggaccacg acatcgacta caaggacgac    60
gacgacaagt ga                                                        72

<210> SEQ ID NO 22
<211> LENGTH: 408
<212> TYPE: DNA
<213> ORGANISM: Chlorella vulgaris

<400> SEQUENCE: 22
ctcgaggcag cagcagctcg gatagtatcg acacactctg gacgctggtc gtgtgatgga    60
ctgttgccgc cacacttgct gccttgacct gtgaatatcc ctgccgcttt tatcaaacag   120
cctcagtgtg tttgatcttg tgtgtacgcg cttttgcgag ttgctagctg cttgtgctat   180
ttgcgaatac caccccccagc atccccttcc ctcgtttcat atcgcttgca tcccaaccgc   240
aacttatcta cgctgtcctg ctatccctca gcgctgctcc tgctcctgct cactgcccct   300
cgcacagcct tggtttgggc tccgcctgta ttctcctggt actgcaacct gtaaaccagc   360
actgcaatgc tgatgcacgg gaagtagtgg gatgggaaca caaatgga               408

<210> SEQ ID NO 23
<211> LENGTH: 20
<212> TYPE: DNA
<213> ORGANISM: Umbellularia californica

<400> SEQUENCE: 23
ctgggcgacg gcttcggcac                                                20

<210> SEQ ID NO 24
<211> LENGTH: 20
<212> TYPE: DNA
<213> ORGANISM: Umbellularia californica

<400> SEQUENCE: 24
aagtcgcggc gcatgccgtt                                                20

<210> SEQ ID NO 25
<211> LENGTH: 20
<212> TYPE: DNA
<213> ORGANISM: Cinnamomum camphora

<400> SEQUENCE: 25
taccccgcct ggggcgacac                                                20

<210> SEQ ID NO 26
<211> LENGTH: 20
<212> TYPE: DNA
<213> ORGANISM: Cinnamomum camphora

<400> SEQUENCE: 26
cttgctcagg cggcgggtgc                                                20

<210> SEQ ID NO 27
<211> LENGTH: 1317
<212> TYPE: DNA
<213> ORGANISM: Cuphea hookeriana

<400> SEQUENCE: 27
atggtggccg ccgccgcctc cagcgccttc ttcccgtgc cgcccccgg cgcctccccc    60 aagcccggca agttcggcaa ctggccctcc agctgagcc cctccttcaa gcccaagtcc   120
atccccaacg gcggcttcca ggtgaaggcc aacgacagcg cccacccaa ggccaacggc   180
```

```
tccgccgtga gcctgaagag cggcagcctg aacacccagg aggacacctc ctccagcccc    240 ccccccgca ccttcctgca ccagctgccc gactggagcc gcctgctgac cgccatcacc    300
accgtgttcg tgaagtccaa gcgccccgac atgcacgacc gcaagtccaa gcgccccgac    360
atgctggtgg acagcttcgg cctggagtcc accgtgcagg acggcctggt gttccgccag    420
tccttctcca tccgctccta cgagatcggc accgaccgca ccgccagcat cgagaccctg    480
atgaaccacc tgcaggagac ctccctgaac cactgcaaga gcaccggcat cctgctggac    540
ggcttcggcc gcaccctgga gatgtgcaag cgcgacctga tctgggtggt gatcaagatg    600
cagatcaagg tgaaccgcta ccccgcctgg ggcgacaccg tggagatcaa cacccgcttc    660
agccgcctgg gcaagatcgg catgggccgc gactggctga tctccgactg caacaccggc    720
gagatcctgg tgcgcgccac cagcgcctac gccatgatga accagaagac ccgccgcctg    780
tccaagctgc cctacgaggt gcaccaggag atcgtgcccc tgttcgtgga cagccccgtg    840
atcgaggact ccgacctgaa ggtgcacaag ttcaaggtga agaccggcga cagcatccag    900
aagggcctga ccccggctg gaacgacctg gacgtgaacc agcacgtgtc caacgtgaag    960
tacatcggct ggatcctgga gagcatgccc accgaggtgc tggagaccca ggagctgtgc   1020
tccctggccc tggagtaccg ccgcgagtgc ggccgcgact ccgtgctgga gagcgtgacc   1080
gccatggacc ccagcaaggt gggcgtgcgc tcccagtacc agcacctgct gcgcctggag   1140
gacggcaccg ccatcgtgaa cggcgccacc gagtggcgcc ccaagaacgc cggcgccaac   1200
ggcgccatct ccaccggcaa gaccagcaac ggcaactccg tgtccatgga ctacaaggac   1260
cacgacggcg actacaagga ccacgacatc gactacaagg acgacgacga caagtga      1317
```

PYROLYSIS OIL AND OTHER COMBUSTIBLE COMPOSITIONS FROM MICROBIAL BIOMASS

CROSS-REFERENCE TO RELATED APPLICATIONS

This application claims the benefit of U.S. provisional application No. 61/453,915, filed Mar. 17, 2011, and U.S. provisional application No. 61/538,747, filed Sep. 23, 2011, both of which are hereby incorporated by reference in their entirety.

FIELD OF THE INVENTION

The present invention provides methods and materials for making pyrolysis oil and other combustible compositions from microbial biomass and microbial oil and microbial biomass products, such as artificial firelogs, compressed burnable pellets, torrefied compositions, and other solid burnable products, resulting therefrom. The present invention therefore relates to the fields of microbiology, molecular biology, and energy production.

BACKGROUND OF THE INVENTION

Fossil fuel is a general term for buried combustible geologic deposits of organic materials formed from decayed plants and animals that have been converted to crude oil, coal, natural gas, or heavy oils by exposure to heat and pressure in the earth's crust over hundreds of millions of years. Fossil fuels are a finite and non-renewable resource.

Increased demand for energy by the global economy has also placed increasing pressure on the cost of hydrocarbons. Aside from energy, many industries, including plastics and chemical manufacturers, rely heavily on the availability of hydrocarbons as a feedstock for their manufacturing processes.

Plant biomass (e.g., wood, wood chips, cuttings, grasses, crop residues, etc.) is a renewable energy source (see, e.g., U.S. Pat. App. Pub. Nos. 20110123407 and 20020132972, incorporated herein by reference) but has drawbacks as a feedstock for fuel and chemical manufacturing. One such drawback is the natural moisture level of the plant biomass. For plant biomass to be useful as a fuel, the moisture level needs to be reduced, requiring energy input, usually in the form of heat for drying. Another drawback of plant biomass is that plant biomass typically contains upwards of 70% in air and void space, which makes it inefficient to collect, store, ship and use plant biomass for fuel and other applications.

One example of how plant biomass has been used as a renewable energy source is the artificial (or synthetic) firelog industry, which produces fuel logs and pellets for fireplaces and stoves. Such products have been made from wax and sawdust and/or other cellulosic materials, such as rice hulls or shredded paper, with a combustible material to facilitate ignition (see U.S. Pat. Nos. 3,297,419; 4,104,034; and 6,136,054). Because the wax is often derived from crude mineral oil, a non-renewable and ever more costly source of material, fireplace logs containing cellulosic materials, such as liquid combustible by-products derived from treatment of vegetable and animal materials, have been described but require special processing (see U.S. Pat. No. 4,326,854). Efforts to avoid the costs and problems associated with the use of sawdust, paper products, and wax in such products have included attempts to use materials such as spent coffee grounds to replace all or part of these components (see U.S. Pat. No. 5,910,454). The difficulties of acquiring such products in the amounts needed for large scale production, however, have limited the adoption of such materials and methods.

Another example of a renewable energy source is the generation of microbial oil ("bio-oil") from fast pyrolysis of *Chlorella protothecoides* (see Miao and Wu, 2004, J. Biotechnology 110: 85-93, incorporated herein by reference) in which these microbes were cultivated and then subjected to fast pyrolysis to yield microbial oil. This process has drawbacks, however, in that it was performed only at laboratory scale, and microbial lipid has higher value applications, including isolation and direct conversion to biodiesel or processing to renewable diesel or jet fuel (see PCT Pat. Pub. No. 2008/151149, incorporated herein by reference).

SUMMARY OF THE INVENTION

The present invention arises in part from the discovery that microbial biomass that has been subjected to lipid extraction and waste microbial biomass arising from such processing is an excellent feedstock for conversion to microbial pyrolysis oil and other combustible compositions.

In one aspect, the present invention provides a feedstock consisting of oleaginous microbial biomass. In one embodiment, the feedstock contains less than about 40, 20, 10, or 5% w/w lipid (i.e., weight of lipid per dry cell weight). In various embodiments, the microbial biomass contains at least about 1, 5, 10, 20, or 30% w/w lipid. The lipid content of the microbial biomass can, in certain embodiments, fall within any range bounded by any of these values, e.g., about 1-20%, about 1-10%, or about 1-5% w/w. In one embodiment, the feedstock is obtained from high-lipid content biomass (50% w/w lipid) by a process in which the high-lipid content biomass is dewatered and optionally dried and conditioned and then subjected to lipid extraction to produce spent biomass, the feedstock of the invention. In one embodiment, the feedstock is derived from an organism that has been genetically engineered to alter its fatty acid profile relative to the wild-type strain from which it is derived. In all embodiments, the microbial biomass can be obtained from culturing an oleaginous microbe under heterotrophic conditions. In some embodiments, the microbial biomass is processed by one or more dewatering, drying, heating, flaking, grinding, or milling prior to the lipid extraction process that provides the spent microbial biomass used in the methods of the invention. In various embodiments, the oleaginous microbe is an oleaginous bacterium, yeast, microalgae or non-yeast fungus. In some embodiments, the microbial biomass of the invention is a microalgae from the genus *Chlorella*, *Parachlorella*, or *Prototheca*. In various embodiments, the feedstock can be employed in a pyrolysis reaction to form a pyrolysis oil or in a gasification reaction to produce a gas containing a mixture of hydrocarbons.

In another aspect, the present invention provides a method for obtaining oil from an oleaginous microbe. In this method, the microbial biomass feedstock of the invention, obtained as described above, is rapidly heated such that the majority of the solid organic material is very quickly transformed into a vapor phase containing non-condensable gases and condensable gases, which are then rapidly cooled (sometimes referred to as "quenched") to yield the "pyrolysis oil" of the invention. The pyrolysis oil of the invention is suitable as a fuel for clean, controlled combustion in boilers, for use in diesel and stationary turbines, and for many other applications.

In yet another aspect, the present invention provides pyrolysis oil produced in accordance with the methods of the invention. In various embodiments, the pyrolysis oil differs from that obtained from other bio-oils due to one or more of the following: (i) the use of a different culture medium, including but not limited to a medium containing a carbon source derived from cellulose, a medium containing sucrose, a medium containing limiting amounts of nitrogen, and/or a medium containing glycerol; (ii) the microbe has been genetically engineered; (iii) the microbe has a unique fatty acid profile; (iv) the microbe has a lipid content of 20% or less (e.g. about 1-20% w/w), including but not limited to 15% or less (e.g., about 1-15% w/w), 10% or less (e.g. about 1-10% w/w), or 5% or less (e.g., about 1-5% w/w) lipid; and (v) the microbe has a protein content of 20% w/w or less, including but not limited to 15% w/w or less and 10% w/w or less protein.

In another aspect, the present invention provides a gasification method employing biomass from an oleaginous microbe as the organic feedstock. In an illustrative embodiment of this method, the microbial biomass feedstock of the invention, obtained as described above, is heated at a temperature of from about 200 to 1400 degrees C. for a period of less than 10 seconds in an atmosphere containing less than 3% V/V oxygen to produce a gas containing a mixture of hydrocarbons.

In a fifth aspect, the present invention provides a method of producing a lipid and a pyrolysis oil. In certain embodiments, the method entails: (a) extracting lipid from an oleaginous microbe to produce spent microbial biomass, wherein the spent microbial biomass includes less than about 20% protein by dry cell weight, and about 1-20% lipid by dry cell weight; and (b) employing the spent microbial biomass in a pyrolysis reaction to form a pyrolysis oil. The method can, optionally, include culturing the oleaginous microbe prior to extracting lipid from the oleaginous microbe. In particular embodiments, the pyrolysis reaction includes: (a) heating said biomass at a temperature of from about 200 to 1400 degrees C. for a period of less than 10 seconds in an atmosphere containing less than 3% V/V oxygen to produce a gas containing a mixture of hydrocarbons; and (b) cooling the gas to form the pyrolysis oil. The method can, optionally, include using the pyrolysis oil as an energy source in the pyrolysis of additional biomass. This additional biomass can, in certain embodiments, include additional spent microbial biomass that includes less than about 20% protein by dry cell weight, and about 1-20% lipid by dry cell weight.

Yet another aspect of the invention provides a method of producing a lipid and a gas containing a mixture of hydrocarbons. In certain embodiments, the method entails: (a) extracting lipid from an oleaginous microbe to produce spent microbial biomass, wherein the spent microbial biomass includes less than about 20% protein by dry cell weight, and about 1-20% lipid by dry cell weight; and (b) employing the spent microbial biomass in a gasification reaction to produce a gas containing a mixture of hydrocarbons. The method can, optionally, include culturing the oleaginous microbe prior to extracting lipid from the oleaginous microbe. In particular embodiments, the gasification reaction comprises heating said biomass at a temperature of from about 200 to 1400 degrees C. for a period of less than 10 seconds in an atmosphere containing less than 3% V/V oxygen to produce a gas containing a mixture of hydrocarbons. The method can, optionally, include using the gas as an energy source in the gasification of additional biomass. This additional biomass can, in certain embodiments, include additional spent microbial biomass that includes less than about 20% protein by dry cell weight, and about 1-20% lipid by dry cell weight.

In another aspect, the present invention provides a solid, non-torrefied burnable fuel composition comprising combustible biomass from an oleaginous microbe. In one embodiment, the composition includes a combustible binder. In one embodiment, the composition is formed into an artificial fireplace log or a pellet suitable for burning, for example, in a fireplace, stove, oven, or furnace. In one embodiment, the biomass is obtained by culturing said microbe under heterotrophic conditions. In one embodiment, the biomass is spent microbial biomass. In one embodiment, the biomass from the oleaginous microbe comprises between 1 and 10% lipid by dry weight. In one embodiment, the lipid is at least 50% C10-C14. In one embodiment, the lipid is at least 50% saturated. In one embodiment, the microbe is a microalgae. In one embodiment, the biomass is from about 5% to about 75% by weight of said solid burnable fuel composition. In one embodiment, the composition further comprises non-microbial cellulosic material. In one embodiment, the composition further comprises wax. In one embodiment, the wax is paraffin. In another embodiment, the wax is non-paraffin. In one embodiment, the composition further comprises a crackling additive.

In another aspect, the invention includes a solid burnable, non-torrefied fuel composition consisting essentially of biomass from an oleaginous microbe and has a density of at least about 500 kg/m$^3$, 1000 kg/m$^3$, 1250 kg/m$^3$, 1500 kg/m$^3$, 7500 kg/m$^3$, or higher. The solid burnable, non-torrefied fuel composition consisting essentially of biomass from an oleaginous microbe is useful for burning in a pellet stove. In one embodiment, the biomass is spent microbial biomass.

In another embodiment, the spent microbial biomass has a Btu/lb value of between 5,000 and 12,000, between 6,000 and 11,000, between 7,000 and 10,000, between 7,000 and 9,000, or between 8,000 and 9,000. In one embodiment, the biomass is obtained from said microbe after culturing said microbe under heterotrophic conditions. In one embodiment, the microbe is a microalgae.

In a further aspect, the invention provides a burnable torrefied composition comprising biomass from an oleaginous microbe. In one embodiment, the microbe has been cultured under heterotrophic conditions. In one embodiment, the product further comprises non-microbial cellulosic material, lignocellulosic material, or a combination thereof. In one embodiment, the biomass makes up from about 10% to about 100% by weight, 25% to about 100% by weight, 50% to about 100% by weight, 75% to about 100% by weight, 80% to about 100% by weight, 90% to about 100% by weight, or about 100% by weight of said solid burnable torrefied composition. In one embodiment, the biomass is spent microbial biomass. In one embodiment, the spent microbial biomass is spent microalgal biomass. In one embodiment, the spent microalgal biomass makes up from about 20% to about 100% by weight of said burnable torrefied composition.

Another aspect of the present invention provides a process of converting biomass from an oleaginous microbe to a burnable torrefied composition comprising the steps of: (1) heating said biomass under substantially oxygen free conditions at a temperature of from about 200° C. to about 280° C.; (2) maintaining said heating step for a period of from about 0.25 hours to about 10 hours, about 0.5 hours to about 10 hours, about 1 hour to about 9 hours, about 2 hours to about 8 hours, about 3 hours to about 7 hours, or about 4 hours to about 6 hours; (3) cooling the heated product; and (5) recovering the burnable torrefied composition.

In any of the above-described aspects, the oleaginous microbe can, in some embodiments, be genetically engineered to express one or more exogenous genes. Suitable exogenous genes include, for example, those encoding a fatty acyl-ACP thioesterase and/or a sucrose invertase. In such embodiments, the oleaginous microbe produces lipid wherein the proportions of fatty acids of the lipid are altered relative to that in the lipid produced by an oleaginous microbe lacking a gene encoding the exogenous gene(s) (e.g., fatty acyl-ACP thioesterase and/or sucrose invertase.).

In an eleventh aspect, the invention provides a blended fuel and methods for making blended fuels. For example a blended fuel of the invention can be prepared in accordance with the invention by blending the pyrolysis oil described above with a fuel to yield a blended fuel includes from about 1% to about 50% aromatic compounds. In various embodiments, the blended fuel can include from about 1% to about 50%, from about 5% to about 45%, from about 10% to about 40%, from about 15% to about 35%, or from about 20% to about 30% aromatic compounds. The fuel with which the pyrolysis oil is blended can, for example, be gasoline, diesel, biodiesel, or jet fuel, or any combination of any of these fuels.

In various embodiments of these aspects of the invention, the microbial oil in the microbial biomass or the microbial biomass feedstock subjected to the pyrolysis process or contained in the burnable composition is characterized by having one or more of the following properties: (i) less than 0.4 micrograms/ml total carotenoids; (ii) less than 0.001 micrograms/ml lycopene; (iii) less than 0.02 micrograms/ml beta carotene; (iv) less than 0.02 milligrams of chlorophyll per kilogram of oil; (v) 0.40-0.60 milligrams of gamma tocopherol per 100 grams of oil; (vi) 3-9 mg campesterol per 100 grams of oil; or (vii) less than 0.5 milligrams of total tocotrienols per gram of oil. In some embodiments, the microbial oil in the microbial biomass or the microbial biomass feedstock subjected to the pyrolysis process or contained in the burnable composition is characterized by having one or more of the following properties: (i) 0.05-0.244 mcg/g total carotenoids; (ii) less than 0.003 mcg/g lycopene; (iii) less than 0.003 mcg/g beta carotene; (iv) 0.045-0.268 mcg/g chlorophyll A; (v) 38.3-164 mcg/g gamma tocopherol; (vi) less than 0.25% brassicasterol, campesterol, stignasterol, or beta-sitosterol; (vii) 249.6-325.3 mcg/g total tocotrienols; (viii) 0.003-0.039 mcg/g lutein; and (ix) 60.8-261.7 mcg/g tocopherols. In some embodiments, the microbial oil in the microbial biomass or the microbial biomass feedstock subjected to the pyrolysis process or contained in the burnable composition is characterized by having one or more of the following properties: carotenoids present at less than 0.4 micrograms/ml; lycopene present at less than 0.001 micrograms/ml; beta carotene present at less than 0.02 micrograms/ml; chlorophyll present at less than 0.02 milligrams per kilogram of oil; gamma tocopherol present from 0.40 to 0.60 milligrams per 100 grams of oil; campesterol present from 3 to 9 milligrams per 100 grams of oil; and tocotrienols, present at less than 0.5 milligrams per gram of oil.

These and other aspects and embodiments of the invention are described in additional detail below.

DETAILED DESCRIPTION OF THE INVENTION

The present invention provides methods and compositions for producing microbial oil, also referred to herein as "pyrolysis oil" as well as pyrolysis oils produced in accordance with the methods of the invention. The present invention also provides combustible compositions suitable for generating heat and light derived from a renewable resource and methods for making those compositions. To aid in understanding the invention, and how the invention is made and practiced, as well as the benefits thereof, this detailed description is divided into sections. Section I provides definitions. Section II provides oleaginous microbes useful in the methods of the invention and methods to culture such microbes under heterotrophic conditions. Section III provides methods for preparing spent microbial biomass suitable for use in the methods of the invention. Section IV provides a description of the methods of the invention for producing the pyrolysis oils of the invention. Section V provides a description of illustrative combustible compositions provided by the invention and methods for making them. Following Section IV, illustrative examples of making and using various aspects and embodiments of the invention are provided.

I. Definitions

Unless otherwise defined, all technical and scientific terms used herein have the meaning commonly understood by a person skilled in the art to which this invention belongs. The following references provide one of skill with a general definition of many of the terms used in this invention: Singleton et al., *Dictionary of Microbiology and Molecular Biology* (2nd ed. 1994); *The Cambridge Dictionary of Science and Technology* (Walker ed., 1988); *The Glossary of Genetics*, 5th Ed., R. Rieger et al. (eds.), Springer Verlag (1991); and Hale & Marham, *The Harper Collins Dictionary of Biology* (1991). As used herein, the following terms have the meanings ascribed to them unless specified otherwise.

When the term "about" is used before a list of values or a range of values, this term is modifies all values in the list or both values in the range, respectively.

"Aromatic compound" refers to a chemical compound that contains delocalized pi electrons. Aromatic compounds can contain carbon atoms and heteroatoms. Typical aromatic compounds include anthracene, benzene, naphthylene, pyridine, pyrimidine, benzofuran, pyrrole, indole, thiphene, purine, oxzole, cyclopropenyl, and the like. Typical heteroatoms include nitrogen, oxygen, and sulfur.

"Axenic" refers to a culture of an organism free from contamination by other living organisms.

"Biodiesel" is a biologically produced fatty acid alkyl ester suitable for use as a fuel in a diesel engine.

"Biomass" refers to material produced by growth and/or propagation of cells. Biomass may contain cells and/or intracellular contents as well as extracellular material, and includes, but is not limited to, compounds secreted by a cell.

"Bioreactor" and "fermentor" refer to an enclosure or partial enclosure, such as a fermentation tank or vessel, in which cells are cultured, typically in suspension.

"Cellulosic material" refers to products derived from cellulose, including products derived from digestion of cellulose, including glucose and xylose, and optionally additional compounds such as disaccharides, oligosaccharides, lignin, furfurals and other compounds. Nonlimiting examples of sources of cellulosic material include sugar cane bagasses, sugar beet pulp, corn stover, wood chips, sawdust and switchgrass.

"Cultivated" and variants thereof such as "cultured" and "fermented", refer to the intentional fostering of growth (increases in cell size, cellular contents, and/or cellular activity) and/or propagation (increases in cell numbers via mitosis) of one or more cells by use of selected and/or controlled conditions. The combination of growth and propagation may be termed proliferation. Examples of selected and/or controlled conditions include the use of a defined medium (with known characteristics such as pH, ionic strength, and carbon source), specified temperature, oxygen tension, carbon dioxide levels, and growth in a bioreactor. Cultivate does not refer to the growth or propagation of microorganisms in nature or otherwise without human intervention; for example, natural growth of an organism that ultimate becomes fossilized to produce geological crude oil is not cultivation.

"Cytolysis" is the lysis of cells in a hypotonic environment. Cytolysis is caused by excessive osmosis, or movement of water, towards the inside of a cell (hyperhydration). If the cell cannot withstand the osmotic pressure of the water inside, it bursts.

"Dry weight" and "dry cell weight" refer to weight determined in the relative or substantial absence of water. For example, reference to oleaginous yeast biomass as comprising a specified percentage of a particular component by dry weight means that the percentage is actually calculated based on the weight of the biomass after substantially all water has been removed.

"Exogenous gene" refers to a nucleic acid that codes for the expression of an RNA and/or protein that has been introduced ("transformed") into a cell. A transformed cell may be referred to as a recombinant cell, into which additional exogenous gene(s) may be introduced. The exogenous gene may be from a different species (and so heterologous) or from the same species (and so homologous), relative to the cell being transformed. Thus, an exogenous gene can include a homologous gene that occupies a different location in the genome of the cell or is under different control, relative to the endogenous copy of the gene. An exogenous gene may be present in more than one copy in the cell. An exogenous gene may be maintained in a cell as an insertion into the genome or as an episomal molecule.

"Exogenously provided" refers to a molecule provided to a cell or to the culture media of a cell culture.

"Expeller pressing" refers to a mechanical method for extracting oil from raw materials such as soybeans and rapeseed. An expeller press is a screw type machine, which presses material through a caged barrel-like cavity. Raw materials enter one side of the press and spent cake exits the other side while oil seeps out between the bars in the cage and is collected. The machine uses friction and continuous pressure from the screw drives to move and compress the raw material. The oil seeps through small opening that do not allow large solids to pass through. As the raw material is pressed, friction typically causes it to heat up.

"Fatty acid profile" refers to a characterization of the fatty acids in a microbe that characterizes the amount of each different fatty acid (or a subset thereof) in the microbe, typically as a percentage of the free fatty acids in the microbe or a sample of the microbial biomass or lipid derived therefrom, with particular reference to carbon chain length and degree of saturation/unsaturation.

"Fixed carbon source" refers to a molecule(s) containing carbon, typically an organic molecule that is present at ambient temperature and pressure in solid or liquid form in a culture media that can be utilized by a microorganism cultured therein.

"Growth" refers to an increase in cell size, total cellular contents, and/or cell mass or weight of an individual cell, including increases in cell weight due to conversion of a fixed carbon source into intracellular oil.

"Homogenate" refers to biomass that has been physically disrupted.

"Hydrocarbon" refers to a molecule containing only hydrogen and carbon atoms wherein the carbon atoms are covalently linked to form a linear, branched, cyclic, or partially cyclic backbone to which the hydrogen atoms are attached. The molecular structure of hydrocarbon compounds varies from the simplest, in the form of methane ($CH_4$), which is a constituent of natural gas, to the very heavy and very complex, such as some molecules, such as asphaltenes, found in crude oil, petroleum, and bitumens. Hydrocarbons may in gaseous, liquid or solid form or any combination of these forms, and may have one or more double or triple bonds between adjacent carbon atoms in the backbone. Accordingly, the term includes linear, branched, cyclic or partially cyclic alkanes, alkenes, lipids, and paraffin. Examples include propane, butane, pentane, hexane, octane, and squalene.

"Lignocellulosic material" or "cellulosic material" refers to biomass comprising cellulose, hemicellulose, and lignin. Lignocellulose is the major structural component of woody and non-woody plants.

"Limiting concentration of a nutrient" refers to a concentration of a compound in a culture that limits the propagation of a cultured organism. A "non-limiting concentration of a nutrient" refers to a concentration that supports maximal propagation during a given culture period. Thus, the number of cells produced during a given culture period is lower in the presence of a limiting concentration of a nutrient than when the nutrient is non-limiting. A nutrient is said to be "in excess" in a culture, when the nutrient is present at a concentration greater than that necessary to support maximal propagation.

"Lipid" refers to a class of molecules that are soluble in nonpolar solvents (such as ether and chloroform) and are relatively or completely insoluble in water. Lipid molecules have these properties, because they consist largely of long hydrocarbon chains which are hydrophobic in nature. Examples of lipids include fatty acids (saturated and unsaturated); glycerides or glycerolipids (such as monoglycerides, diglycerides, triglycerides or neutral fats, and phosphoglycerides or glycerophospholipids); nonglycerides (sphingolipids, sterol lipids including cholesterol and steroid hormones, prenol lipids including terpenoids, fatty alcohols, waxes, and polyketides); and complex lipid derivatives (sugar-linked lipids, or glycolipids, and protein-linked lipids). "Fats" are a subgroup of lipids called "triglycerides" or "triacylglycerides."

"Lysate" refers to a solution containing the contents of lysed cells.

"Lysing" refers to disrupting the cellular membrane and optionally the cell wall of a biological organism or cell sufficient to release at least some intracellular content.

"Lysis" refers to the breakage of the plasma membrane and optionally the cell wall of a biological organism sufficient to release at least some intracellular content, often by mechanical, viral or osmotic mechanisms, that compromise its integrity.

"Microorganism" and "microbe" refer to microscopic unicellular organisms.

"Oil" refers to any triacylglyceride oil, produced by organisms, including oleaginous yeast, plants, and/or animals. "Oil," as distinguished from "fat", refers, unless otherwise indicated, to lipids that are generally, but not always, liquid at ordinary room temperatures and pressures. For example, "oil" includes vegetable or seed oils derived from plants, including without limitation, an oil derived from avocado, Brazil nuts, calendula, camelina, camelina sativa, canola, cashew nut, castor beans, cocoa butter (also known as cacao, which is a triacylglyceride oil derived from the cacao bean that is solid at typical room temperatures and pressures), coconut, coffee, copra, coriander, corn, cotton seed, *cuphea, euphorbia*, hazelnut, hemp, jatropha, jojoba, kenaf, linseed, lupine, *macadamia*, mustard seed, oats, olive, opium poppy, palm, palm kernel, peanut, pecan, pumpkin seed, rapeseed, rice, safflower, sesame, soy, sunflower, and tung oil tree, as well as combinations thereof.

"Oleaginous microbes" are microscopic unicellular organisms that can naturally accumulate more than 20% of their dry cell weight as lipid.

"Oleaginous yeast" refers to yeast that can naturally accumulate more than 20% of their dry cell weight as lipid and are of the Dikarya subkingdom of fungi. Oleaginous yeast includes organisms such as *Yarrowia lipolytica, Rhodotorula glutinis, Cryptococcus curvatus* and *Lipomyces starkeyi.*

"Osmotic shock" refers to the rupture of cells in a solution following a sudden reduction in osmotic pressure. Osmotic shock is sometimes induced to release cellular components of such cells into a solution.

"Polysaccharides" or "glycans" refer to carbohydrates made up of monosaccharides joined together by glycosidic linkages. Cellulose is a polysaccharide that makes up certain plant cell walls. Cellulose can be depolymerized by enzymes to yield monosaccharides such as xylose and glucose, as well as larger disaccharides and oligosaccharides.

"Port" refers to an opening in a bioreactor that allows influx or efflux of materials such as gases, liquids, and cells; a port is usually connected to tubing.

"Predominantly encapsulated" refers to more than 50% and typically more than 75% to 90% of a referenced component, e.g., algal oil, being sequestered in a referenced container, which can include, e.g., an oleaginous yeast cell.

"Predominantly intact cells" and "predominantly intact biomass" refer to a population of cells that comprise more than 50, and often more than 75, 90, and 98% intact cells. "Intact", in this context, refers to the physical continuity of the cellular membrane and/or cell wall enclosing the intracellular components of the cell not being disrupted in any manner that would release the intracellular components of the cell to an extent that exceeds the permeability of the cellular membrane in culture.

"Predominantly lysed" refers to a population of cells in which more than 50%, and typically more than 75 to 90%, of the cells have been disrupted such that the intracellular components of the cell are no longer completely enclosed within the cell membrane.

"Proliferation" refers to a combination of both growth and propagation.

"Propagation" refers to an increase in cell number via mitosis or other cell division.

"Pyrolysis oil" refers to oil produced from an oleaginous microbial biomass by a process in which the biomass is converted to a liquid and gas (some char may be produced) by the action of heat, typically above 400 degrees C., normally without using direct combustion, in the absence or near absence of oxygen, in a conversion unit, that provides an intense amount of heat that converts the biomass largely to vapor in a very short time period, typically less than 5 seconds, which vapor contains both non-condensable gases (including methane, hydrogen, carbon monoxide, carbon dioxide and olefins) and condensable vapors, which condensable vapors are quickly cooled or "quenched" in a downstream process (before they can deteriorate into lower value liquid and gaseous products) to yield pyrolysis oil. The homogeneous liquid product from this fast pyrolysis is also known as bio-oil and is suitable as a fuel for combustion in boilers, and for use in diesel and stationary turbines.

"Renewable diesel" refers to a mixture of normal and or branched chain alkanes (such as C10:0, C12:0, C14:0, C16:0 and C18:0) produced through hydrogenation, deoxygenation, and further isomerization or cracking of lipids.

"Spent biomass" and variants thereof such as "defatted biomass", "defatted meal", "delipidated biomass", "delipidated meal" and "spent meal" refers to microbial biomass after oil (including lipids) and/or other components have been extracted or isolated from it, either through the use of mechanical force (i.e., exerted by an expeller press) or solvent extraction or both. Spent biomass has a reduced amount of oil/lipids as compared to before the extraction or isolation of oil/lipids from the microbial biomass but typically contains some residual oil/lipid as well as all or substantially all of the other components (polysaccharides, protein, nucleic acids, for example) of the microbe from which it is obtained.

"Sonication" refers to a process of disrupting biological materials, such as a cell, by use of sound wave energy.

"Stover" refers to the dried stalks and leaves of a crop that remain after a grain has been harvested.

"V/V" or "v/v", in reference to proportions by volume, refers to the ratio of the volume of one substance in a composition to the volume of the composition. For example, reference to a composition that comprises 5% v/v yeast oil means that 5% of the composition's volume is composed of oil (e.g., such a composition having a volume of 100 mm$^3$ would contain 5 mm$^3$ of oil), and the remainder of the volume of the composition (e.g., 95 mm$^3$ in the example) is composed of other ingredients.

"W/W" or "w/w", in reference to proportions by weight, refers to the ratio of the weight of one substance in a composition to the weight of the composition. For example, reference to a composition that comprises 5% w/w oleaginous yeast biomass means that 5% of the composition's weight is composed of oleaginous yeast biomass (e.g., such a composition having a weight of 100 mg would contain 5 mg of oleaginous yeast biomass) and the remainder of the weight of the composition (e.g., 95 mg in the example) is composed of other ingredients.

II. Oleaginous Microbes And Heterotrophic Culture Conditions

The present invention arose in part from the discovery that biomass prepared from certain oleaginous microbes or microorganisms that produce oil can be used as feedstock in a pyrolysis process to make pyrolysis oil and as a solid combustible material. Suitable oleaginous microbes include microalgae, oleaginous bacteria, oleaginous yeast, and fungi. Oleaginous microorganisms useful in the invention produce oil (lipids or hydrocarbons) and include those currently used for biodiesel production or to produce lipid used as feedstock for industrial applications. For example, biodiesel production from oleaginous microbes utilizes the triacylglycerides (TAGs) containing long-chain fatty acid molecules produced by them, and hydrocarbon production for industrial applications utilizes the fatty acids, aldehydes, alcohols, and alkanes produced by or derived from the TAGs of oleaginous microbes.

Any microbial organism that produces lipid or hydrocarbon can be used in accordance with the invention, although microorganisms that naturally produce high levels of suitable lipid or hydrocarbon are preferred. Production of hydrocarbons by microorganisms is reviewed by Metzger et al., *Appl Microbiol Biotechnol* (2005) 66: 486-496 and A Look Back at the U.S. Department of Energy's Aquatic Species Program: Biodiesel from Algae, NREL/TP-580-24190, John Sheehan, Terri Dunahay, John Benemann and Paul Roessler (1998), incorporated herein by reference.

Considerations affecting the selection of a microorganism for use in generating microbial biomass for purposes of the invention include: (1) high lipid content as a percentage of cell weight; (2) ease of growth; and (3) ease of processing. In particular embodiments, the microorganism yields cells that are at least about 40% to 60% or more (including more than 70%) lipid when harvested for oil extraction. For many applications, organisms that grow heterotrophically (as used herein, "heterotrophically" refers to growth on a fixed carbon course, e.g., sugar other than carbon dioxide) or can be engineered to do so, are useful in the practice of the invention. See PCT Publication Nos. 2010/063031; 2010/063032; and 2008/151149, each of which is incorporated herein by reference in their entireties.

Naturally occurring and genetically engineered microalgae are suitable microorganisms for use in preparing microbial biomass suitable for use in the products of the invention. Thus, in various embodiments of the present invention, the microorganism from which microbial biomass is obtained is a microalgae. Examples of genera and species of microalgae that can be used to generate microbial biomass for purposes of the present invention include, but are not limited to, the following genera and species microalgae.

TABLE 1

Microalgae.

*Achnanthes orientalis, Agmenellum, Amphiprora hyaline, Amphora coffeiformis, Amphora coffeiformis linea, Amphora coffeiformis punctata, Amphora coffeiformis taylori, Amphora coffeiformis tenuis, Amphora delicatissima, Amphora delicatissima capitata, Amphora sp., Anabaena, Ankistrodesmus, Ankistrodesmus falcatus, Boekelovia hooglandii, Borodinella sp., Botryococcus braunii, Botryococcus sudeticus, Bracteococcus aerius, Bracteococcus sp., Bracteacoccus grandis, Bracteacoccus cinnabarinas, Bracteococcus minor, Bracteococcus medionucleatus, Carteria, Chaetoceros gracilis, Chaetoceros muelleri, Chaetoceros muelleri subsalsum, Chaetoceros sp., Chlorella anitrata, Chlorella Antarctica, Chlorella aureoviridis, Chlorella candida, Chlorella capsulate, Chlorella desiccate, Chlorella ellipsoidea, Chlorella emersonii, Chlorella fusca, Chlorella fusca var. vacuolata, Chlorella glucotropha, Chlorella infusionum, Chlorella infusionum var. actophila, Chlorella infusionum var. auxenophila, Chlorella kessleri, Chlorella lobophora (strain SAG 37.88), Chlorella luteoviridis, Chlorella luteoviridis var. aureoviridis, Chlorella luteoviridis var. lutescens, Chlorella miniata, Chlorella cf. minutissima, Chlorella minutissima, Chlorella mutabilis, Chlorella nocturna, Chlorella ovalis, Chlorella parva, Chlorella photophila, Chlorella pringsheimii, Chlorella protothecoides (including any of UTEX strains 1806, 411, 264, 256, 255, 250, 249, 31, 29, 25), Chlorella protothecoides var. acidicola, Chlorella regularis, Chlorella regularis var. minima, Chlorella regularis var. umbricata, Chlorella reisiglii, Chlorella saccharophila, Chlorella saccharophila var. ellipsoidea, Chlorella salina, Chlorella simplex, Chlorella sorokiniana, Chlorella sp., Chlorella sphaerica, Chlorella stigmatophora, Chlorella vanniellii, Chlorella vulgaris, Chlorella vulgaris f. tertia, Chlorella vulgaris var. autotrophica, Chlorella vulgaris var. viridis, Chlorella vulgaris var. vulgaris, Chlorella vulgaris var. vulgaris f. tertia, Chlorella vulgaris var. vulgaris f. viridis, Chlorella xanthella, Chlorella zofingiensis, Chlorella trebouxioides, Chlorella vulgaris, Chlorococcum infusionum, Chlorococcum sp., Chlorogonium, Chroomonas sp., Chrysosphaera sp., Cricosphaera sp., Crypthecodinium cohnii, Cryptomonas sp., Cyclotella cryptica, Cyclotella meneghiniana, Cyclotella sp., Dunaliella sp., Dunaliella bardawil, Dunaliella bioculata, Dunaliella granulate, Dunaliella maritime, Dunaliella minuta, Dunaliella parva, Dunaliella peircei, Dunaliella primolecta, Dunaliella salina, Dunaliella terricola, Dunaliella tertiolecta, Dunaliella viridis, Dunaliella tertiolecta, Eremosphaera viridis, Eremosphaera sp., Ellipsoidon sp., Euglena, Franceia sp., Fragilaria crotonensis, Fragilaria sp., Gleocapsa sp., Gloeothamnion sp., Hymenomonas sp., Isochrysis aff. galbana, Isochrysis galbana, Lepocinclis, Micractinium, Micractinium (UTEX LB 2614), Monoraphidium minutum, Monoraphidium sp., Nannochloris sp., Nannochloropsis salina, Nannochloropsis sp., Navicula acceptata, Navicula biskanterae, Navicula pseudotenelloides, Navicula pelliculosa, Navicula saprophila, Navicula sp., Neochloris oleabundans, Nephrochloris sp., Nephroselmis sp., Nitschia communis, Nitzschia alexandrina, Nitzschia communis, Nitzschia dissipata, Nitzschia frustulum, Nitzschia hantzschiana, Nitzschia inconspicua, Nitzschia intermedia, Nitzschia microcephala, Nitzschia pusilla, Nitzschia pusilla elliptica, Nitzschia pusilla monoensis, Nitzschia quadrangular, Nitzschia sp., Ochromonas sp., Oocystis parva, Oocystis pusilla, Oocystis sp., Oscillatoria limnetica, Oscillatoria sp., Oscillatoria subbrevis, Parachlorella beijerinckii, Parachlorella kessleri, Pascheria acidophila, Pavlova sp., Phagus, Phormidium, Platymonas sp., Pleurochrysis carterae, Pleurochrysis dentate, Pleurochrysis sp., Prototheca stagnora, Prototheca portoricensis, Prototheca moriformis, Prototheca wickerhamii, Prototheca zopfii, Pseudochlorella aquatica, Pyramimonas sp., Pyrobotrys, Sarcinoid chrysophyte, Scenedesmus armatus, Scenedesmus rubescens, Schizochytrium, Spirogyra, Spirulina platensis, Stichococcus sp., Synechococcus sp., Tetraedron, Tetraselmis sp., Tetraselmis suecica, Thalassiosira weissflogii,* and *Viridiella fridericiana.*

In various embodiments of the present invention, the microorganism from which biomass is obtained is an organism of a species of the genus *Chlorella* or *Prototheca*. In various preferred embodiments, the microalgae is *Chlorella protothecoides, Chlorella ellipsoidea, Chlorella minutissima, Chlorella zofinienesi, Chlorella luteoviridis, Chlorella kessleri, Chlorella sorokiniana, Chlorella fusca* var. *vacuolata Chlorella* sp., *Chlorella* cf. *minutissima* or *Chlorella emersonii*. *Chlorella* is a genus of single-celled green algae, belonging to the phylum Chlorophyta. It is spherical in shape, about 2 to 10 μm in diameter, and is without flagella. Some species of *Chlorella* are naturally heterotrophic. *Chlorella*, particularly *Chlorella protothecoides*, is a preferred microorganism for use in generating biomass for purposes of the invention because of its high composition of lipid and its ability to grow heterotrophically.

*Chlorella*, for example, *Chlorella protothecoides, Chlorella minutissima*, or *Chlorella emersonii*, can be genetically engineered to express one or more heterologous genes ("transgenes"). Examples of expression of transgenes in, e.g., *Chlorella*, can be found in the literature (see for example PCT Patent Publication Nos. 2010/063031, 2010/063032, and 2008/151149; PCT Application No. PCT/US11/038436; Current Microbiology Vol. 35 (1997), pp. 356-362; Sheng Wu Gong Cheng Xue Bao. 2000 July; 16(4):443-6; Current Microbiology Vol. 38 (1999), pp. 335-341; Appl Microbiol Biotechnol (2006) 72: 197-205; Marine Biotechnology 4, 63-73, 2002; Current Genetics 39:5, 365-370 (2001); Plant Cell Reports 18:9, 778-780, (1999); Biologia Plantarium 42(2): 209-216, (1999); Plant Pathol. J 21(1): 13-20, (2005)), and such references are incorporated herein by reference as teaching various methods and materials for introducing and expressing genes of interest in such organisms. Other lipid-producing microalgae can be engineered as well, including prokaryotic Microalgae (see Kalscheuer et al., Applied Microbiology and Biotechnology, Volume 52, Number 4/October, 1999), which are suitable for use to generate biomass for purposes of the invention. Thus, in various embodiments, the products will contain biomass from a genetically engineered organism.

Prototheca is a genus of single-cell microalgae believed to be a non-photosynthetic mutant of Chlorella. While Chlorella can obtain its energy through photosynthesis, species of the genus Prototheca are obligate heterotrophs. Prototheca are spherical in shape, about 2 to 15 micrometers in diameter, and lack flagella. In various embodiments, the microalgae used to generate biomass for use in the methods and products of the invention is selected from the following species of Prototheca: Prototheca stagnora, Prototheca portoricensis, Prototheca moriformis, Prototheca wickerhamii and Prototheca zopfii. Methods for genetically engineering Chlorella are generally useful in genetically engineering Prototheca.

In addition to Prototheca and Chlorella, other microalgae can be used to generate biomass for purposes of the present invention. In various preferred embodiments, the microalgae is selected from a genus or species from any of the following genera and species: Parachlorella kessleri, Parachlorella beijerinckii, Neochloris oleabundans, Bracteacoccus grandis, Bracteacoccus cinnabarinas, Bracteacoccus aerius, Bracteococcus sp. and Scenedesmus rebescens. Other non-limiting examples of microalgae suitable for use in the methods of the invention (including Chlorella) are listed in Table 1, above.

In addition to microalgae, oleaginous yeast can accumulate more than 20% of their dry cell weight as lipid and so are useful to generate biomass for incorporation into the products of the invention. In one preferred embodiment of the present invention, the microorganism from which microbial biomass is obtained is an oleaginous yeast. Examples of oleaginous yeast that can be used in the methods of the present invention to generate biomass suitable for incorporation into the products of the invention include, but are not limited to, the oleaginous yeast listed in Table 2. and include numerous species from the Dikarya subkingdom of fungi such as Rhodosporidium toruloides (Eukaryota; Fungi/Metazoa group; Fungi; Dikarya; Basidiomycota; Pucciniomycotina; Microbotryomycetes; Sporidiobolales; Rhodosporidium); Rhodotorula glutinis (Eukaryota; Fungi/Metazoa group; Fungi; Dikarya; Basidiomycota; Pucciniomycotina; Microbotryomycetes; Sporidiobolales; mitosporic Sporidiobolales; Rhodotorula); Lipomyces tetrasporus (Eukaryota; Fungi/Metazoa group; Fungi; Dikarya; Ascomycota; Saccharomyceta; Saccharomycotina; Saccharomycetes; Saccharomycetales; Lipomycetaceae; Lipomyces); Cryptococcus curvatus (Eukaryota; Fungi/Metazoa group; Fungi; Dikarya; Basidiomycota; Agaricomycotina; Tremellomycetes; Tremellales; mitosporic Tremellales; Cryptococcus); Trichosporon domesticum (Eukaryota; Fungi/Metazoa group; Fungi; Dikarya; Basidiomycota; Agaricomycotina; Tremellomycetes; Tremellales; mitosporic Tremellales; Trichosporon); Yarrowia lipolytica (Eukaryota; Fungi/Metazoa group; Fungi; Dikarya; Ascomycota; Saccharomyceta; Saccharomycotina; Saccharomycetes; Saccharomycetales; Dipodascaceae; Yarrowia); Sporobolomyces alborubescens (Eukaryota; Fungi/Metazoa group; Fungi; Dikarya; Basidiomycota; Pucciniomycotina; Microbotryomycetes; Sporidiobolales; mitosporic Sporidiobolales; Sporobolomyces); Geotrichum vulgare (Eukaryota; Fungi/Metazoa group; Fungi; Dikarya; Ascomycota; Saccharomyceta; Saccharomycotina; Saccharomycetes; Saccharomycetales; Dipodascaceae; mitosporic Dipodascaceae; Geotrichum): and Torulaspora delbrueckii (Eukaryota; Fungi/Metazoa group; Fungi; Dikarya; Ascomycota; Saccharomyceta; Saccharomycotina; Saccharomycetes; Saccharomycetales; Saccharomycetaceae; Torulaspora), and the like. Within Dikarya, the various embodiments of the invention include use of organisms from all sub-domains of Dikarya (Ascomycota and Basidiomycota) and taxonomic sub-classifications within Ascomycota and Basidiomycota. Illustrative methods for the cultivation of oleaginous yeast (Yarrowia lipolytica and Rhodotorula graminis) to achieve high oil content and produce biomass for incorporation into the products of the invention are provided in the examples below.

TABLE 2

Oleaginous Yeast.

Candida apicola, Candida sp., Cryptococcus curvatus, Cryptococcus terricolus, Debaromyces hansenii, Endomycopsis vernalis, Geotrichum carabidarum, Geotrichum cucujoidarum, Geotrichum histeridarum, Geotrichum silvicola, Geotrichum vulgare, Hyphopichia burtonii, Lipomyces lipofer, Lypomyces orentalis, Lipomyces starkeyi, Lipomyces tetrasporous, Pichia mexicana, Rodosporidium sphaerocarpum, Rhodosporidium toruloides Rhodotorula aurantiaca, Rhodotorula dairenensis, Rhodotorula diffluens, Rhodotorula glutinus, Rhodotorula glutinis var. glutinis, Rhodotorula gracilis, Rhodotorula graminis Rhodotorula minuta, Rhodotorula mucilaginosa, Rhodotorula mucilaginosa var. mucilaginosa, Rhodotorula terpenoidalis, Rhodotorula toruloides, Sporobolomyces alborubescens, Starmerella bombicola, Torulaspora delbruekii, Torulaspora pretoriensis, Trichosporon behrend, Trichosporon brassicae, Trichosporon domesticum, Trichosporon laibachii, Trichosporon loubieri, Trichosporon loubieri var. loubieri, Trichosporon montevideense, Trichosporon pullulans, Trichosporon sp., Wickerhamomyces Canadensis, Yarrowia lipolytica, and Zygoascus meyerae.

In one embodiment of the present invention, the microorganism from which biomass suitable for incorporation into the products of the invention is obtained is a fungus. Examples of fungi that can be used in the methods of the present invention to generate biomass suitable for incorporation into the products of the invention include, but are not limited to, the fungi listed in Table 3.

TABLE 3

Oleaginous Fungi.

*Mortierella, Mortierrla vinacea, Mortierella alpine, Pythium debaryanum, Mucor circinelloides, Aspergillus ochraceus, Aspergillus terreus, Pennicillium iilacinum, Hensenulo, Chaetomium, Cladosporium, Malbranchea, Rhizopus,* and *Pythium*

Thus, in one embodiment of the present invention, the microorganism used for the production of microbial biomass for incorporation into the products of the invention is a fungus. Examples of suitable fungi (e.g., *Mortierella alpine, Mucor circinelloides,* and *Aspergillus ochraceus*) include those that have been shown to be amenable to genetic manipulation, as described in the literature (see, for example, *Microbiology*, July; 153(Pt. 7): 2013-25 (2007); *Mol Genet Genomics*, June; 271(5): 595-602 (2004); *Curr Genet*, March; 21(3): 215-23 (1992); *Current Microbiology*, 30(2):83-86 (1995); Sakuradani, NISR Research Grant, "Studies of Metabolic Engineering of Useful Lipid-producing Microorganisms" (2004); and PCT/JP2004/012021).

In other embodiments of the present invention, a microorganism producing a lipid or a microorganism from which biomass suitable for use in the products of the invention can be obtained is an oleaginous bacterium. Oleaginous bacteria are bacteria that can accumulate more than 20% of their dry cell weight as lipid. Species of oleaginous bacteria for use in the methods of the present invention, include species of the genus *Rhodococcus*, such as *Rhodococcus opacus* and *Rhodococcus* sp. Methods of cultivating oleaginous bacteria, such as *Rhodococcus opacus*, are known in the art (see Waltermann, et al., (2000) *Microbiology*, 146: 1143-1149). Illustrative methods for cultivating *Rhodococcus opacus* to achieve high oil content and generate biomass suitable for use in the methods and products of the invention are provided in the examples below.

To produce oil-containing microbial biomass suitable for use in the methods, products, and compositions of the invention, microorganisms are cultured for production of oil (e.g., hydrocarbons, lipids, fatty acids, aldehydes, alcohols and alkanes). This type of culture is typically first conducted on a small scale and, initially, at least, under conditions in which the starting microorganism can grow. Culture for purposes of hydrocarbon (oil) production is preferentially conducted on a large scale and under heterotrophic conditions. Preferably, a fixed carbon source such as glucose or sucrose, for example, is present in excess. In some embodiments, the culture can also be exposed to light some or all of the time, if desired or beneficial.

Microalgae and most other oleaginous microbes can be cultured in liquid media. The culture can be contained within a bioreactor. Culture condition parameters can be manipulated to optimize total oil production, the combination of hydrocarbon species produced, and/or production of a particular hydrocarbon species. In most instances, practice of the methods of the invention on an industrial scale will utilize extremely large (40,000 liter and higher) fermentors.

Culture medium typically contains components such as a fixed nitrogen source, trace elements, optionally a buffer for pH maintenance, and phosphate. Components in addition to a fixed carbon source, such as acetate or glucose, may include salts such as sodium chloride, particularly for seawater microalgae. Examples of trace elements include zinc, boron, cobalt, copper, manganese, and molybdenum in, for example, the respective forms of $ZnCl_2$, $H_3BO_3$, $CoCl_2.6H_2O$, $CuCl_2.2H_2O$, $MnCl_2.4H_2O$ and $(NH_4)_6Mo_7O_{24}.4H_2O$. Other culture parameters can also be manipulated, such as the pH of the culture media, the identity and concentration of trace elements and other media constituents.

For organisms able to grow on a fixed carbon source, the fixed carbon source can be, for example, glucose, fructose, sucrose, galactose, xylose, mannose, rhamnose, N-acetylglucosamine, glycerol, floridoside, glucuronic acid, and/or acetate. The one or more exogenously provided fixed carbon source(s) can be supplied to the culture medium at a concentration of from at least about 50 μM to at least 500 mM, and at any concentration in that range (i.e., 100 μM, 500 μM, 5 mM, 50 mM, 500 mM, 1 M, 2 M, 3 M and higher for each of the carbon sources above and for various combinations of two or more of them). In the heterotrophic growth methods used in accordance with the present invention, the carbon source is often provided at or near the limit of its solubility at the temperature (at which it is fed to the culture and/or in the culture itself). As it is often desirable to grow cultures to as high a concentration as possible, and given the constraint of bioreactor size for any given culture, very high concentrations of carbon source feeds are often used in accordance with the invention.

For example and without limitation, if the solubility limit (which may be expressed in any convenient unit, i.e., g/L or molarity) of a particular carbon source (such as those listed in the paragraph above, including but not limited to glucose, sucrose, and glycerol) is X, then the concentration of the carbon source in the feed line to the bioreactor may be as high as X, or may be 99% X, 95% X, 90% X, 75% X, or 50% X.

Some microalgae species can grow by utilizing a fixed carbon source, such as glucose or acetate, in the absence of light. Such growth is known as heterotrophic growth. For *Chlorella protothecoides*, for example, heterotrophic growth results in high production of biomass and accumulation of high lipid content. Thus, an alternative to photosynthetic growth and propagation of microorganisms is the use of heterotrophic growth and propagation of microorganisms, under conditions in which a fixed carbon source provides energy for growth and lipid accumulation.

In contrast to heterotrophic growth, mixotrophic growth involves the use of both light and fixed carbon source(s) as energy sources for cultivating cells. Mixotrophic growth can be conducted in a photobioreactor to which a carbon source is supplied. Microalgae can be grown and maintained in closed photobioreactors made of different types of transparent or semitransparent material. Such material can include Plexiglass® enclosures, glass enclosures, bags made from substances such as polyethylene, transparent or semi-transparent pipes and other material. Alternatively, the light energy can be supplied to a photobioreactor by the use of conventional lighting powered by electricity or other energy sources. Microalgae can be grown and maintained in open photobioreactors such as raceway ponds, settling ponds and other non-enclosed containers.

Another variation is photoautotrophic growth, in which only light energy and carbon dioxide are provided as an energy/carbon source to the culture. While the methods of the invention for generating pyrolysis oil from microbial biomass can be applied to any oleaginous biomass, including that generated by photoautotrophic, mixotrophic, or heterotrophic culture conditions, the most efficient method for generating such biomass is heterotrophic culture conditions.

In some embodiments, as described in more detail below, the fixed carbon energy source comprises cellulosic material, including depolymerized cellulosic material, a 5-carbon sugar, or a 6-carbon sugar.

Methods for the growth and propagation of *Chlorella protothecoides* to high oil levels as a percentage of dry weight have been reported (see for example Miao and Wu, *J. Biotechnology*, 2004, 11:85-93 and Miao and Wu, *Biosource Technology* (2006) 97:841-846, reporting methods for obtaining 55% oil dry cell weight).

PCT Publication WO2008/151149, incorporated herein by reference, describes preferred growth conditions for microalgae such as *Chlorella*. Multiple species of *Chlorella* and multiple strains within a species can be grown in a variety of media, including media containing waste glycerol from biodiesel manufacturing. Other feedstocks for culturing microalgae under heterotrophic growth conditions for purposes of the present invention include mixtures of glycerol and glucose, mixtures of glucose and xylose, mixtures of fructose and glucose, sucrose, glucose, fructose, xylose, arabinose, mannose, galactose, acetate, and molasses. Other suitable feedstocks include corn stover, sugar beet pulp, and switchgrass either after processing or in combination with depolymerization enzymes.

In various embodiments of the invention, an oleaginous microbe that can utilize sucrose as a carbon source is cultured under heterotrophic culture conditions is used to generate the microbial biomass. PCT Publication Nos. 2010/063032, 2010/063032, and 2008/151149 describe recombinant organisms, including but not limited to *Prototheca* and *Chlorella* microalgae, that have been genetically engineered to utilize sucrose as a carbon source. In various embodiments, these or other organisms capable of utilizing sucrose as a carbon source under heterotrophic conditions are cultured in media in which the sucrose is provided in the form of a crude, sucrose-containing material, including but not limited to, sugar cane juice (e.g., thick cane juice) and sugar beet juice.

For lipid and oil production, cells, including recombinant cells, are typically fermented in large quantities. The culturing may be in large liquid volumes, such as in suspension cultures as an example. Other examples include starting with a small culture of cells which expand into a large biomass in combination with cell growth and propagation as well as lipid (oil) production. Bioreactors or steel fermentors can be used to accommodate large culture volumes. For these fermentations, use of photosynthetic growth conditions may be impossible or at least impractical and inefficient, so heterotrophic growth conditions are preferred.

Appropriate nutrient sources for culture in a fermentor for heterotrophic growth conditions include raw materials such as one or more of the following: a fixed carbon source such as glucose, corn starch, depolymerized cellulosic material, sucrose, sugar cane, sugar beet, lactose, milk whey, molasses, or the like; a nitrogen source, such as protein, soybean meal, cornsteep liquor, ammonia (pure or in salt form), nitrate or nitrate salt; and a phosphorus source, such as phosphate salts. Additionally, a fermentor for heterotrophic growth conditions allows for the control of culture conditions such as temperature, pH, oxygen tension, and carbon dioxide levels. Optionally, gaseous components, like oxygen or nitrogen, can be bubbled through a liquid culture. Other starch (glucose) sources include wheat, potato, rice, and sorghum. Other carbon sources include process streams such as technical grade glycerol, black liquor, and organic acids such as acetate, and molasses. Carbon sources can also be provided as a mixture, such as a mixture of sucrose and depolymerized sugar beet pulp.

A fermentor for heterotrophic growth conditions can be used to allow cells to undergo the various phases of their physiological cycle. As an example, an inoculum of lipid-producing cells can be introduced into a medium followed by a lag period (lag phase) before the cells begin to propagate. Following the lag period, the propagation rate increases steadily and enters the log, or exponential, phase. The exponential phase is in turn followed by a slowing of propagation due to decreases in nutrients such as nitrogen, increases in toxic substances, and quorum sensing mechanisms. After this slowing, propagation stops, and the cells enter a stationary phase or steady growth state, depending on the particular environment provided to the cells.

In one heterotrophic culture method useful for purposes of the present invention, microorganisms are cultured using depolymerized cellulosic biomass as a feedstock. As opposed to other feedstocks that can be used to culture microorganisms, such as corn starch or sucrose from sugar cane or sugar beets, cellulosic biomass (depolymerized or otherwise) is not suitable for human consumption. Cellulosic biomass (e.g., stover, such as corn stover) is inexpensive and readily available.

Suitable cellulosic materials include residues from herbaceous and woody energy crops, as well as agricultural crops, i.e., the plant parts, primarily stalks and leaves typically not removed from the fields with the primary food or fiber product. Examples include agricultural wastes such as sugarcane bagasse, rice hulls, corn fiber (including stalks, leaves, husks, and cobs), wheat straw, rice straw, sugar beet pulp, citrus pulp, citrus peels; forestry wastes such as hardwood and softwood thinnings, and hardwood and softwood residues from timber operations; wood wastes such as saw mill wastes (wood chips, sawdust) and pulp mill waste; urban wastes such as paper fractions of municipal solid waste, urban wood waste and urban green waste such as municipal grass clippings; and wood construction waste. Additional cellulosic materials include dedicated cellulosic crops such as switchgrass, hybrid poplar wood, and miscanthus, fiber cane, and fiber sorghum. Five-carbon sugars that are produced from such materials include xylose.

Some microbes are able to process cellulosic material and directly utilize cellulosic materials as a carbon source. However, cellulosic material may need to be treated to increase the accessible surface area or for the cellulose to be first broken down as a preparation for microbial utilization as a carbon source. PCT Patent Publication Nos. 2010/120939, 2010/063032, 2010/063031, and PCT 2008/151149, incorporated herein by reference, describe various methods for treating cellulose to render it suitable for use as a carbon source in microbial fermentations.

Bioreactors can be employed for heterotrophic growth and propagation methods. As will be appreciated, provisions to make light available to the cells in photosynthetic growth methods are unnecessary when using a fixed-carbon source in the heterotrophic growth and propagation methods described herein.

The specific examples of process conditions and heterotrophic growth and propagation methods described herein can be combined in any suitable manner to improve efficiencies of microbial growth and lipid production. For example, microbes having a greater ability to utilize any of the above-described feedstocks for increased proliferation and/or lipid production may be used in the methods of the invention.

Microorganisms useful in accordance with the methods of the present invention are found in various locations and environments throughout the world. As a consequence of their isolation from other species and their resulting evolutionary divergence, the particular growth medium for optimal growth and generation of oil and/or lipid from any particular species of microbe may need to be experimentally determined. In some cases, certain strains of microorganisms may be unable to grow on a particular growth medium because of the presence of some inhibitory component or the absence of some essential nutritional requirement required by the particular strain of microorganism. There are a variety of methods known in the art for culturing a wide variety of species of microalgae to accumulate high levels of lipid as a percentage of dry cell weight, and methods for determining optimal growth conditions for any species of interest are also known in the art.

Solid and liquid growth media are generally available from a wide variety of sources, and instructions for the preparation of a particular medium that is suitable for a wide variety of strains of microorganisms can be found, for example, online at www.utex.org/, a site maintained by the University of Texas at Austin for its culture collection of algae (UTEX). For example, various fresh water and salt water media include those shown in Table 4.

TABLE 4

| Algal Media | |
|---|---|
| Fresh Water Media | Salt Water Media |
| ½ CHEV Diatom Medium | 1% F/2 |
| ⅓ CHEV Diatom Medium | ½ Enriched Seawater Medium |
| ⅕ CHEV Diatom Medium | ½ Erdschreiber Medium |
| 1:1 DYIII/PEA + Gr+ | ½ Soil + Seawater Medium |
| ⅔ CHEV Diatom Medium | ⅓ Soil + Seawater Medium |
| 2X CHEV Diatom Medium | ¼ ERD |
| Ag Diatom Medium | ¼ Soil + Seawater Medium |
| Allen Medium | ⅕ Soil + Seawater Medium |
| BG11-1 Medium | ⅔ Enriched Seawater Medium |
| Bold 1NV Medium | 20% Allen + 80% ERD |
| Bold 3N Medium | 2X Erdschreiber's Medium |
| *Botryococcus* Medium | 2X Soil + Seawater Medium |
| Bristol Medium | 5% F/2 Medium |
| CHEV Diatom Medium | ⅗ Soil + Seawater Agar Medium |
| Chu's Medium | Artificial Seawater Medium |
| CR1 Diatom Medium | BG11-1 + .36% NaCl Medium |
| CR1+ Diatom Medium | BG11-1 + 1% NaCl Medium |
| CR1– S Diatom Medium | Bold 1NV:Erdshreiber (1:1) |
| *Cyanidium* Medium | Bold 1NV:Erdshreiber (4:1) |
| Cyanophycean Medium | Bristol-NaCl Medium |
| Desmid Medium | Dasycladales Seawater Medium |
| DYIII Medium | Enriched Seawater Medium |
| *Euglena* Medium | Erdschreiber's Medium |
| HEPES Medium | ES/10 Enriched Seawater Medium |
| J Medium | ES/2 Enriched Seawater Medium |
| Malt Medium | ES/4 Enriched Seawater Medium |
| MES Medium | F/2 Medium |
| Modified Bold 3N Medium | F/2 + NH4 |
| Modified COMBO Medium | LDM Medium |
| N/20 Medium | Modified 2 X CHEV |
| *Ochromonas* Medium | Modified 2 X CHEV + Soil |
| P49 Medium | Modified Artificial Seawater Medium |
| *Polytomella* Medium | Modified CHEV |
| Proteose Medium | *Porphridium* Medium |
| Snow Algae Media | Soil + Seawater Medium |
| Soil Extract Medium | SS Diatom Medium |
| Soilwater: BAR Medium | |
| Soilwater: GR– Medium | |
| Soilwater: GR–/NH4 Medium | |
| Soilwater: GR+ Medium | |
| Soilwater: GR+/NH4 Medium | |

TABLE 4-continued

| Algal Media | |
|---|---|
| Fresh Water Media | Salt Water Media |
| Soilwater: PEA Medium | |
| Soilwater: Peat Medium | |
| Soilwater: VT Medium | |
| *Spirulina* Medium | |
| Tap Medium | |
| *Trebouxia* Medium | |
| Volvocacean Medium | |
| Volvocacean-3N Medium | |
| Volvox Medium | |
| Volvox-Dextrose Medium | |
| Waris Medium | |
| Waris + Soil Extract Medium | |

A medium suitable for culturing *Chlorella protothecoides* is Proteose Medium. This medium is suitable for axenic cultures, and a 1 L volume of the medium (pH ~6.8) can be prepared by addition of 1 g of proteose peptone to 1 liter of Bristol Medium. Bristol medium comprises 2.94 mM $NaNO_3$, 0.17 mM $CaCl_2.2H_2O$, 0.3 mM $MgSO_4.7H_2O$, 0.43 mM, 1.29 mM $KH_2PO_4$, and 1.43 mM NaCl in an aqueous solution. For 1.5% agar medium, 15 g of agar can be added to 1 L of the solution. The solution is covered and autoclaved, and then stored at a refrigerated temperature prior to use.

Other suitable media for use in culturing oleaginous microbes can be readily identified by consulting the URL identified above, or by consulting other organizations that maintain cultures of microorganisms, SAG the Culture Collection of Algae at the University of Göttingen (Göttingen, Germany), CCAP the culture collection of algae and protozoa managed by the Scottish Association for Marine Science (Scotland, United Kingdom), and CCALA the culture collection of algal laboratory at the Institute of Botany (Třeboň, Czech Republic).

The microbial biomass used in the methods of the invention will typically have a high lipid content (e.g., at least 20% lipid by dry weight and often more than 50% lipid by dry weight) at some point during processing (for example, prior to the generation of spent biomass) or when incorporated into the products of the invention. Culture conditions can be adjusted to increase the percentage weight of cells that is lipid. For example, in certain embodiments, a microbe (e.g., a microalgae) is cultured in the presence of a limiting concentration of one or more nutrients, such as, for example, nitrogen and/or phosphorous and/or sulfur, while providing an excess of fixed carbon energy such as glucose. Nitrogen limitation tends to increase microbial lipid yield over microbial lipid yield in a culture in which nitrogen is provided in excess. In particular embodiments, the increase in lipid yield is from at least about 10% to 100% to as much as 500% or more. The microbe can be cultured in the presence of a limiting amount of a nutrient for a portion of the total culture period or for the entire period. Preferably, the nutrient that is provided in limiting concentrations is nitrogen. In particular embodiments, the nutrient concentration is cycled between a limiting concentration and a non-limiting concentration at least twice during the total culture period.

To increase lipid as a percentage of dry cell weight, acetate can be employed in the feedstock for a lipid-producing microbe (e.g., a microalgae). Acetate feeds directly into the point of metabolism that initiates fatty acid synthesis (i.e., acetyl-CoA); thus providing acetate in the culture can increase fatty acid production. Generally, the microbe is cultured in the presence of a sufficient amount of acetate to increase microbial lipid yield, and/or microbial fatty acid yield, specifically, over microbial lipid (e.g., fatty acid) yield in the absence of acetate. Acetate feeding is a useful component of the methods provided herein for generating microalgal biomass that has a high percentage of dry cell weight as lipid.

In a steady growth state, the cells accumulate oil (lipid) but do not undergo cell division. In one embodiment of the invention, the growth state is maintained by continuing to provide all components of the original growth media to the cells with the exception of a fixed nitrogen source. Cultivating microalgae cells by feeding all nutrients originally provided to the cells except a fixed nitrogen source, such as through feeding the cells in this manner for an extended period of time, can result in a high percentage of dry cell weight being lipid. In some embodiments, the nutrients, such as trace metals, phosphates, and other components, other than a fixed carbon source, can be provided at a much lower concentration than originally provided in the starting fermentation to avoid "overfeeding" the cells with nutrients that will not be used by the cells, thus reducing costs.

In other embodiments, high lipid (oil) biomass can be generated by feeding, after all fixed nitrogen has been consumed, a fixed carbon source to the cells for extended periods of time, such as from at least 8 to 16 or more days. In some embodiments, cells are allowed to accumulate oil in the presence of a fixed carbon source and in the absence of a fixed nitrogen source for over 30 days. Preferably, microorganisms grown using conditions described herein and known in the art comprise lipid in a range of from at least about 20% lipid by dry cell weight to about 75% lipid (or more) by dry cell weight. Such oil rich biomass can be used directly in the products of the invention, but often, the spent biomass remaining after lipid has been extracted from the microbes will be incorporated into the products of the invention.

Another tool for accumulating a high percentage of dry cell weight as lipid involves feedstock selection. Multiple species of *Chlorella* and multiple strains within a species of *Chlorella* accumulate a higher percentage of dry cell weight as lipid when cultured in the presence of biodiesel glycerol byproduct than when cultured in the presence of equivalent concentrations of pure reagent grade glycerol. Similarly, *Chlorella* can accumulate a higher percentage of dry cell weight as lipid when cultured in the presence of an equal concentration (weight percent) mixture of glycerol and glucose than when cultured in the presence of only glucose. Feedstock selection in combination with timing the addition of certain feedstocks can also be used to increase lipid content. For example, *Chlorella* can accumulate a higher percentage of dry cell weight as lipid when glycerol is added to a culture for a first period of time, followed by addition of glucose and continued culturing for a second period of time, than when the same quantities of glycerol and glucose are added together at the beginning of the fermentation. See PCT Publication No. 2008/151149, incorporated herein by reference.

The lipid (oil) percentage of dry cell weight in microbial lipid production can therefore be improved (increased) by the use of certain feedstocks and temporal separation of carbon sources, as well as by holding cells in a heterotrophic growth state in which they accumulate oil but do not undergo cell division. The examples below show growing various microbes, including several strains of microalgae, to accumulate higher levels of lipids as dry cell weight (DCW).

Process conditions can be adjusted to increase the yields of lipids. Process conditions can also be adjusted to reduce production cost. For example, in certain embodiments, a microbe (e.g., a microalgae) is cultured in the presence of a limiting concentration of one or more nutrients, such as, for example, nitrogen, phosphorus, and/or sulfur. This condition tends to increase microbial lipid yield over microbial lipid yield in a culture in which the nutrient is provided in excess. In particular embodiments, the increase in lipid yield is at least about 10% or 20% to 100% or 500% or more.

Limiting a nutrient may also tend to reduce the amount of biomass produced. Therefore, the limiting concentration is typically one that increases the percentage yield of lipid for a given biomass but does not unduly reduce total biomass. In exemplary embodiments, biomass is reduced by no more than about 5% to 25%. The microbe can be cultured in the presence of a limiting amount of nutrient for a portion of the total culture period or for the entire period. In particular embodiments, the nutrient concentration is cycled between a limiting concentration and a non-limiting concentration at least twice during the total culture period.

The microbial biomass generated by the culture methods described herein comprises microalgal oil (lipid) as well as other constituents generated by the microorganisms or incorporated by the microorganisms from the culture medium during fermentation. Thus, as used herein, microbial biomass typically includes at least some amount of each of the various macromolecules, such as nucleic acid, protein, polysaccharide, and lipid, produced by the oleaginous microbe from which the microbial biomass is derived.

Microalgal biomass with a high percentage of oil/lipid accumulation by dry weight has been generated using different methods of culture known in the art. Microalgal biomass with a higher percentage of oil/lipid accumulation is useful in with the methods of the present invention. Li et al. describe *Chlorella vulgaris* cultures with up to 56.6% lipid by dry cell weight (DCW) in stationary cultures grown under autotrophic conditions using high iron (Fe) concentrations (Li et al., *Bioresource Technology* 99(11):4717-22 (2008). Rodolfi et al. describe *Nanochloropsis* sp. and *Chaetoceros calcitrans* cultures with 60% lipid DCW and 39.8% lipid DCW, respectively, grown in a photobioreactor under nitrogen starvation conditions (Rodolfi et al., *Biotechnology & Bioengineering* (2008) [June 18 Epub ahead of print]). Solovchenko et al. describe *Parietochloris incise* cultures with approximately 30% lipid accumulation (DCW) when grown phototropically and under low nitrogen condtions (Solovchenko et al., *Journal of Applied Phycology* 20:245-251 (2008). *Chlorella protothecoides* can produce up to 55% lipid (DCW) grown under certain heterotrophic conditions with nitrogen starvation (Miao and Wu, *Bioresource Technology* 97:841-846 (2006)). Other *Chlorella* species including *Chlorella emersonii*, *Chlorella sorokiniana* and *Chlorella minutissima* have been described to have accumulated up to 63% oil (DCW) when grown in stirred tank bioreactors under low-nitrogen media conditions (Illman et al., *Enzyme and Microbial Technology* 27:631-635 (2000)). Still higher percent lipid accumulation by dry cell weight have been reported, including 70% lipid (DCW) accumulation in *Dumaliella tertiolecta* cultures grown in increased NaCl conditions (Takagi et al., *Journal of Bioscience and Bioengineering* 101(3): 223-226 (2006)) and 75% lipid accumulation in *Botryococcus braunii* cultures (Banerjee et al., *Critical Reviews in Biotechnology* 22(3): 245-279 (2002)).

After the desired amount of oleaginous microbial biomass has been accumulated by fermentation, the biomass is collected and treated, usually but optionally including treatment involving a lipid extraction step, to prepare the biomass for incorporation into the products of the invention, as described in the following section.

III. Preparation of Microbial Biomass and Spent Biomass

After fermentation to accumulate the biomass, one or more steps of removing water (or other liquids) from the microbial biomass are typically conducted in accordance with the methods of the invention to generate the biomass incorporated into the products of the invention. These steps of removing water can include the distinct steps referred to herein as dewatering and drying.

Dewatering, as used herein, refers to the separation of the oil-containing microbe from the fermentation broth (liquids) in which it was cultured. Dewatering, if performed, should be performed by a method that does not result in, or results only in minimal loss in, oil content of the biomass. Accordingly, care is generally taken to avoid cell lysis during any dewatering step. Dewatering is a solid-liquid separation and involves the removal of liquids from solid material. Common processes for dewatering include centrifugation, filtration, and/or the use of mechanical pressure.

Centrifugation is a process that involves the use of centrifugal force for the separation of mixtures. The more dense components of the mixture migrate away from the axis of the centrifuge, while the less dense components of the mixture migrate towards the axis. By increasing the effective gravitational force (i.e., by increasing the centrifugation speed), more dense material, usually solids, separate from the less dense material, usually liquids, according to density.

Microbial biomass useful in the methods and compositions of the present invention can be dewatered from the fermentation broth through the use of centrifugation, to form a concentrated paste. After centrifugation, there is still a substantial amount of surface or free moisture in the microbial biomass (e.g., upwards of 70%) and thus, centrifugation is not considered to be, for purposes of the present invention, a drying step. Optionally, after centrifugation, the biomass can be washed with a washing solution (e.g., deionized water) to remove remaining fermentation broth and debris.

In some embodiments, dewatering involves the use of filtration. One example of filtration that is suitable for the present invention is tangential flow filtration (TFF), also known as cross-flow filtration. Tangential flow filtration is a separation technique that uses membrane systems and flow force to purify solids from liquids. For a preferred filtration method see Geresh, Carb. Polym. 50; 183-189 (2002), which discusses use of a MaxCell A/G technologies 0.45 uM hollow fiber filter. Also see for example Millipore Pellicon® devices, used with 100 kD, 300 kD, 1000 kD (catalog number P2C01MC01), 0.1 uM (catalog number P2VVPPV01), 0.22 uM (catalog number P2GVPPV01), and 0.45 uM membranes (catalog number P2HVMPV01). The retentate should not pass through the filter at a significant level. The retentate also should not adhere significantly to the filter material. TFF can also be performed using hollow fiber filtration systems.

Non-limiting examples of tangential flow filtration include those involving the use of a filter with a pore size of at least about 0.1 micrometer, at least about 0.12 micrometer, at least about 0.14 micrometer, at least about 0.16 micrometer, at least about 0.18 micrometer, at least about 0.2 micrometer, at least about 0.22 micrometer, at least about 0.45 micrometer, or at least about 0.65 micrometer. Preferred pore sizes of TFF allow solutes and debris in the fermentation broth to flow through, but not microbial cells.

In other embodiments, dewatering involves the use of mechanical pressure directly applied to the biomass to separate the liquid fermentation broth from the microbial biomass. The amount of mechanical pressure applied should not cause a significant percentage of the microbial cells to rupture, if that would result in loss of oil, but should instead simply be enough to dewater the biomass to the level desired for subsequent processing.

One non-limiting example of using mechanical pressure to dewater microbial biomass employs the belt filter press. A belt filter press is a dewatering device that applies mechanical pressure to a slurry (e.g., microbial biomass that is directly from the fermentor or bioreactor) that is passed between the two tensioned belts through a serpentine of decreasing diameter rolls. The belt filter press can actually be divided into three zones: gravity zone, where free draining water/liquid is drained by gravity through a porous belt; a wedge zone, where the solids are prepared for pressure application; and a pressure zone, where adjustable pressure is applied to the gravity drained solids.

One or more of the above dewatering techniques can be used alone or in combination to dewater the microbial biomass for use in the present invention. The moisture content of the microbial biomass (conditioned feedstock) can affect the yield of oil obtained in the pressing step (if oil is to be extracted therefrom, as described below, prior to incorporation of the spent biomass resulting therefrom into a product of the invention), and the optimal moisture level, which for some strains of microalgae is below 6% and often below 2%, can vary from organism to organism (see PCT Publication No. 2010/120939, incorporated herein by reference).

Drying, as referred to herein, refers to the removal of some or all of the free moisture or surface moisture of the microbial biomass. Like dewatering, the drying process typically does not result in significant loss of oil from the microbial biomass. Thus, the drying step should typically not cause lysis of a significant number of the microbial cells, because in most cases, the lipids are located in intracellular compartments of the microbial biomass. Several methods of drying microbial biomass known in the art for other purposes are suitable for use in the methods of the present invention. Microbial biomass after the free moisture or surface moisture has been removed is referred to as dried microbial biomass. If no further moisture removal occurs in the conditioning or moisture reduction occurs via the addition of a dry bulking agent prior to the pressing step, then the dried microbial biomass may contain, for example and without limitation, less than 6% moisture by weight. Non-limiting examples of drying methods suitable for use in preparing dry microbial biomass in accordance with the methods of the invention include lyophilization and the use of dryers such as a drum dryer, spray dryer, and a tray dryer, each of which is described below.

Lyophilization, also known as freeze drying or cryodessication, is a dehydration process that is typically used to preserve a perishable material. The lyophilization process involves the freezing of the material and then reducing the surrounding pressure and adding enough heat to allow the frozen water in the material to sublime from the solid phase to gas. In the case of lyophilizing microbial biomass, such as microalgae derived biomass, the cell wall of the microalgae acts as a cryoprotectant that prevents degradation of the intracellular lipids during the freeze dry process.

Drum dryers are one of the most economical methods for drying large amounts of microbial biomass. Drum dryers, or roller dryers, consist of two large steel cylinders that turn toward each other and are heated from the inside by steam. In some embodiments, the microbial biomass is applied to the outside of the large cylinders in thin sheets. Through the heat from the steam, the microbial biomass is then dried, typically in less than one revolution of the large cylinders, and the resulting dry microbial biomass is scraped off of the cylinders by a steel blade. The resulting dry microbial biomass has a flaky consistency. In various embodiments, the microbial biomass is first dewatered and then dried using a drum dryer. More detailed description of a drum dryer can be found in U.S. Pat. No. 5,729,910, which discloses a rotary drying drum.

Spray drying is a commonly used method of drying a liquid feed using a hot gas. A spray dryer takes a liquid stream (e.g., containing the microbial biomass) and separates the solute as a solid and the liquid into a vapor. The liquid input stream is sprayed through a nozzle into a hot vapor stream and vaporized. Solids form as moisture quickly leaves the droplets. The nozzle of the spray dryer is adjustable, and typically is adjusted to make the droplets as small as possible to maximize heat transfer and the rate of water vaporization. The resulting dry solids may have a fine, powdery consistency, depending on the size of the nozzle used. In other embodiments, spray dryers can use a lyophilization process instead of steam heating to dry the material.

Tray dryers are typically used for laboratory work and small pilot scale drying operations. Tray dryers work on the basis of convection heating and evaporation. Fermentation broth containing the microbial biomass can be dried effectively from a wide range of cell concentrations using heat and an air vent to remove evaporated water.

Flash dryers are typically used for drying solids that have been de-watered or inherently have low moisture content. Also known as "pneumatic dryers", these dryers typically disperse wet material into a stream of heated air (or gas) which conveys it through a drying duct. The heat from the airstream (or gas stream) dries the material as it is conveyed through the drying duct. The dried product is then separated using cyclones and/or bag filters. Elevated drying temperatures can be used with many products, because the flashing off of surface moisture instantly cools the drying gas/air without appreciably increasing the product temperature. More detailed descriptions of flash dryers and pneumatic dryers can be found in U.S. Pat. No. 4,214,375, which describes a flash dryer, and U.S. Pat. Nos. 3,789,513 and 4,101,264, which describe pneumatic dryers.

Dewatered and/or dried microbial biomass may be conditioned prior to a pressing step, as described below, if one is obtaining spent biomass for use in accordance with the invention. Conditioning of the microbial biomass refers to heating the biomass to a temperature in the range of 70° C. to 150° C. (160° F. to 300° F.) and changing the physical or physiochemical nature of the microbial biomass and can be used to improve oil yields in a subsequent oil extraction (pressing) step. Conditioning microbial biomass results in the production of "conditioned feedstock." In addition to heating or "cooking" the biomass, non-limiting examples of conditioning the biomass include adjusting the moisture content within the dry microbial biomass, subjecting the dry microbial biomass to a low pressure "pre-press", subjecting the dry microbial biomass to cycles of heating and cooling, subjecting the dry microbial biomass to an expander, and/or adjusting the particle size of the dry microbial biomass.

The conditioning step can include techniques (e.g., heating or application or pressure) that overlap in part with techniques used in the drying or pressing steps. However, the primary goals of these steps are different: the primary goal of the drying step is the removal of some or all of the free moisture or surface moisture from the microbial biomass. The primary goal of the conditioning step is to heat the biomass, which can optionally result in the removal of intracellular water from, i.e., adjusting the intracellular moisture content of, the microbial biomass and/or altering the physical or physiochemical nature of the microbial biomass without substantial release of lipids to facilitate release of oil during the pressing step. The primary goal of the pressing step is to release oil from the microbial biomass or conditioned feedstock, i.e., the extraction of the oil.

In various embodiments, conditioning involves altering, or adjusting, the moisture content of the microbial biomass by the application of heat, i.e., heat conditioning. Heat conditioning, as used herein, refers to heat treatment (either direct or indirect) of microbial biomass. The moisture content of the microbial biomass can be adjusted by conditioning using heat (either direct or indirect), which is typically done, if at all, after a drying step. Even though the biomass may be dried by any of the above described methods, the moisture content of the microbial biomass after drying can range, for example, from 3% to 15% moisture by weight, or 5-10% moisture by weight. Such a moisture range may not be optimal for maximal oil recovery in the pressing step. Therefore, there may be benefit in heat-conditioning dewatered and/or dry microbial biomass to adjust the moisture level to a level (typically below 6%) optimal for maximal oil recovery.

Heat conditioners used in oil seed processing are suitable for use in conditioning microbial biomass in accordance with the methods of the present invention, such as vertical stacked conditioners. These consist of a series of three to seven or more closed, superimposed cylindrical steel pans. Each pan is independently jacketed for steam heating on both sides and bottom and is equipped with a sweep-type stirrer mounted close to the bottom, and operated by a common shaft extending through the entire series of pans. The temperature of the heat conditioner is also adjustable through regulation of the steam heating. There is an automatically operated gate in the bottom of each pan, except the last, for discharging the contents to the pan below. The top pan is provided with spray jets for the addition of moisture if desired. While moisture is sprayed onto seeds in many agricultural oil extraction processes during conditioning, this common process is not desirable for conditioning microbial biomass. Cookers also typically have an exhaust pipe and fan for removal of moisture. Thus, it is possible to control the moisture of the microbial biomass, not only with respect to final moisture content but also at each stage of the operation. In this respect, a conditioning step of heating microbial biomass for an extended period of time (10-60 minutes for example) provides the effect of not only reducing moisture and increasing the temperature of the biomass, but also altering the biophysical nature of the microbial biomass beyond any heating effects that might occur in a subsequent pressing step, i.e., simply from friction of the material as it is forced through, e.g., a press.

A steam jacketed horizontal cooker is another type of heat conditioner that is suitable for use in accordance with the methods of the invention. In this design, the biomass is mixed, heated and conveyed in a horizontal plane in deeper beds as compared to conventional vertical stacked cookers. In the horizontal cooker, the action of a specially designed auger mixes conveys the biomass, while the biomass is simultaneously heated with indirect steam from the steam jacket. Water and vapor and air are vented out from the cooker through an upper duct, which may or may not have an exhaust fan depending on the cooker's capacity. For cooking biomass at a high flow rate, several horizontal cookers can be stacked together. In this configuration, the biomass is fed into the top level cooker and heated and conveyed through by the auger and then thrown by gravity into a lower level cooker where the process is repeated. Several levels of horizontal cookers can be stacked together depending on the needed flow rate and the time/temperature of conditioning required. Moisture and temperature can be monitored and adjusted independently for each horizontal cooker level.

For the heat conditioning of microbial biomass, especially microalgal biomass, the optimal time and temperature that the biomass spends in a vertical stacked conditioner can vary depending on the moisture level of the biomass after drying. Heat conditioning (sometimes referred to as "cooking") should not result in burning or scorching significant amounts of the microbial biomass during cooking Depending on the moisture content of the microbial biomass prior to heat conditioning, i.e., for very low levels of moisture, it may be beneficial or even necessary to moisten the biomass before heat conditioning to avoid burning or scorching. Depending on the type of microbial biomass that is going to be fed through an expeller press, the optimal temperature for heat conditioning will vary. For some species of microalgae, the optimal temperature for heat conditioning is between 200-270° F. In some embodiments, the microalgal biomass is heat conditioned at 210-230° F. In other embodiments, the microalgal biomass is heat conditioned at 220-270° F. In still other embodiments, the microalgal biomass is heat conditioned at 240-260° F.

Heating the oil-bearing microbial biomass before pressing can aid in the liberation of oil from and/or accessing the oil-laden compartments of the cells. Oil-bearing microbial biomass contains the oil in compartments made of cellular components such as proteins and phospholipids. Repetitive cycles of heating and cooling can denature the proteins and alter the chemical structure of the cellular components of these oil compartments and thereby provide better access to the oil during the subsequent extraction process. Thus, in various embodiments of the invention, the microbial biomass is conditioned to prepare conditioned feedstock that is used in the pressing step, and the conditioning step involves heating and, optionally, one or more cycles of heating and cooling.

If no further heat conditioning or other conditioning that alters moisture content is to be performed, and if no bulking agent that will alter moisture content is to be added, then the conditioned feedstock resulting from heat conditioning may be adjusted to contain less than a certain percentage of moisture by weight. For example, it may be useful to employ microalgal biomass having less than 6% moisture by weight in the products of the invention. In various embodiments, the microbial biomass has a moisture content in the range of 0.1% to 5% by weight. In various embodiments, the microbial biomass has a moisture content of less than 4% by weight. In various embodiments, the microbial biomass has a moisture content in the range of 0.5% to 3.5% by weight. In various embodiments, the microbial biomass has a moisture content in the range of 0.1% to 3% by weight.

In addition to heating the biomass, conditioning can, in some embodiments, involve the application of pressure to the microbial biomass. To distinguish this type of conditioning from the pressure applied during oil extraction (the pressing step, if employed), this type of conditioning is referred to as a "pre-press." The pre-press is conducted at low pressure, a pressure lower than that used for oil extraction in the pressing step. Ordinary high-pressure expeller (screw) presses may be operated at low pressure for this pre-press conditioning step. Pre-pressing the biomass at low pressure may aid in breaking open the cells to allow for better flow of oil during the subsequent high pressure pressing; however, pre-pressing does not cause a significant amount (e.g. more than 5%) of the oil to separate from the microbial biomass. Also, the friction and heat generated during the pre-press may also help break open the oil compartments in the cells. Pre-pressing the biomass at low pressure also changes the texture and particle size of the biomass, because the biomass will extrude out of the press in a pellet-like form. In some embodiments, an extruder (see discussion below) is used to achieve the same or similar results as a low pressure pre-press conditioning step. In some embodiments, the pellets of conditioned biomass are further processed to achieve an optimal particle size for the subsequent full pressure pressing.

Thus, another parameter relevant to optimal extraction of oil from microbial biomass is the particle size. Typically, the optimum particle size for an oil expeller press (screw press) is approximately $1/16^{th}$ of an inch thick. Factors that may affect the range of particle size include, but are not limited to, the method used to dry the microbial biomass and/or the addition of a bulking agent or press aid to the biomass. If the biomass is tray dried, e.g., spread wet onto a tray and then dried in an oven, the resulting dried microbial biomass may need to be broken up into uniform pieces of the optimal particle size to make it optimal for pressing in an expeller press. The same is true if a bulking agent is added to the microbial biomass before the drying process. Thus, conditioning may involve a step that results in altering the particle size or average particle size of the microbial biomass. Machines such as hammer mills or flakers may be employed in accordance with the methods of the invention to adjust the thickness and particle size of the oil-bearing microbial biomass.

In similar fashion, improved oil extraction can result from altering other physical properties of the dried microbial biomass. In particular, the porosity and/or the density of the microbial biomass can affect oil extraction yields. In various embodiments of the methods of the invention, conditioning of the biomass to alter its porosity and/or density is performed. Expanders and extruders increase the porosity and the bulk density of the biomass. Expanders and extruders can be employed to condition the microbial biomass. Both expanders and extruders are low-shear machines that heat, homogenize, and shape oil-bearing material into collets or pellets. Expanders and extruders work similarly; both have a worm/collar setup inside a shaft such that, as it moves the material inside the shaft, mechanical pressure and shearing break open the cells. The biggest difference between expanders and extruders is that the expander uses water and/or steam to puff the material at the end of the shaft. The sudden high pressure (and change in pressure) causes the moisture in the material to vaporize, thus "puffing" or expanding the material using the internal moisture. Extruders change the shape of the material, forming collets or pellets. Extruders also lyse some of the cells and vaporize water from the biomass (reduction of moisture) while increasing the temperature of the biomass (heating the biomass) through mechanical friction that the extruder exerts on the biomass. Thus, extruders and expanders can be used in accordance with the methods of the invention to condition the microbial biomass. The extruder/expanders can break open the cells, freeing the intracellular lipids, and can also change the porosity and the bulk density of the material. These changes in the physical properties of the feedstock may be advantageous in subsequent oil extraction or for the particular application for which a product of the invention may be employed.

The above-described conditioning methods can be used singly or in combination in accordance with the methods of the invention to achieve the optimal conditioned microbial biomass feedstock for subsequent oil extraction and/or for direct incorporation into a product of the invention. As used herein, then, in certain embodiments, conditioning involves the application of heat and optionally pressure to the biomass. In various embodiments, the conditioning step comprises heating the biomass at a temperature in the range of 70° C. to 150° C. (160° F. to 300° F.). In various embodiments, the heating is performed using a vertical stacked shaker. In various embodiments, the conditioning step further comprises treating the dry biomass with an expander or extruder to shape and/or homogenize the biomass.

In various embodiments of the invention, particularly those in which spent biomass is incorporated into a process, product or composition of the invention, a bulking agent or press aid is added to the microbial biomass, which may be either dry or hydrated (i.e., biomass that has not been dried or that contains significant, i.e., more than 6% by weight, moisture, including biomass in fermentation broth that has not been subjected to any process to remove or separate water) microbial biomass or conditioned feedstock. If spent biomass is to be employed, then the bulking agent is typically added prior to the pressing step. In various embodiments, the bulking agent has an average particle size of less than 1.5 mm. In some embodiments, the bulking agent or press aid has a particle size of between 50 microns and 1.5 mm. In other embodiments, the press aid has a particle size of between 150 microns and 350 microns. In some embodiments, the bulking agent is a filter aid. In various embodiments, the bulking agent is selected from the group consisting of cellulose, corn stover, dried rosemary, soybean hulls, spent biomass (biomass of reduced lipid content relative to the biomass from which it was prepared), including spent microbial biomass, sugar cane bagasse, and switchgrass. In various embodiments, the bulking agent is spent microbial biomass that contains between 40% and 90% polysaccharide by weight, such as cellulose, hemicellulose, soluble and insoluble fiber, and combinations of these different polysaccharides and/or less than 10% oil by weight. In various embodiments, the polysaccharide in the spent microbial biomass used as a bulking agent contains 20-30 mole percent galactose, 55-65 mole percent glucose, and/or 5-15 mole percent mannose.

Thus, the addition of a press aid or bulking agent may be advantageous in some embodiments of the invention. For example, when there is high oil content and low fiber in the biomass, feeding the biomass through a press can result in an emulsion. This results in low oil yields, because the oil is trapped within the solids. One way in accordance with the methods of the invention to improve the yield in such instances is to add polysaccharide to the biomass in the form of a bulking agent, also known as a "press aid" or "pressing aid". Bulking agents are typically high fiber additives that work by adjusting the total fiber content of the microbial biomass to an optimal range and so are compatible for use in the products of the invention.

Oil rich microbial biomass such as that derived from microalgae may have very little crude fiber content. Typically, microbial biomass including microalgae biomass has a crude fiber content of less than 2%. The addition of high fiber additives (in the form of a press aid) can be used to adjust the total fiber content of the microbial biomass to an optimal range for oil extraction using an expeller press or for a particular product application. Optimal fiber content may range from 10-20%. In accordance with the methods of the present invention, one can adjust the fiber content of the microbial biomass for optimal oil extraction or for a particular product application. Suitable bulking agents/pressing aids include, but are not limited to, switchgrass, rice straw, sugar beet pulp, sugar cane bagasse, soybean hulls, dry rosemary, cellulose, corn stover, delipidated (either pressed or solvent extracted) cake from soybean, canola, cottonseed, sunflower, jatropha seeds, paper pulp, waste paper and the like. In some embodiments, the spent microbial biomass of reduced lipid content from a previous press is used as a bulking agent. Thus, bulking agents, when incorporated into a biomass, change the physiochemical properties of the biomass so as to facilitate more uniform application of pressure to cells in the biomass and/or to impart desired properties to the final composition.

In some cases, the bulking agent can be added to the microbial biomass after it has been dried, but not yet conditioned. In such cases, it may advantageous to mix the dry microbial biomass with the desired amount of the press aid and then condition the microbial biomass and the press aid together, i.e., before feeding to a screw press if spent biomass is to be used as the biomass to be incorporated into a densified product of the invention. In other cases, the press aid can be added to a hydrated microbial biomass before the microbial biomass has been subjected to any separation or dewatering processes, drying, or conditioning. In such cases, the press aid can be added directly to the fermentation broth containing the microbial biomass before any dewatering or other step.

Biomass for incorporation into the products of the invention can be obtained by various methods that employ bulking agents such as those described above. In one method, hydrated microbial biomass is prepared by adding a bulking agent to the biomass and drying the mixture obtained thereby to a desired moisture content, i.e., less than 6% by weight, thereby forming a dried bulking agent/biomass mixture. In another method, oil is extracted from microbial biomass and spent biomass is obtained by co-drying hydrated microbial biomass containing at least 20% oil (or more, i.e., at least 40% oil) by weight and a bulking agent to form a dried bulking agent/biomass mixture; optionally reducing the moisture content in the mixture, i.e., to less than 4% by weight, by drying and/or conditioning; and either using the biomass for direct incorporation into a product of the invention or pressing the reduced moisture content mixture to extract oil therefrom, thereby forming spent biomass of reduced lipid content that is then directly used in a process or incorporated into a product of the invention.

While oleaginous microbial biomass, prepared as described above, can be directly used as a feedstock in a pyrolysis process to make microbial oil in accordance with the invention or incorporated directly into another combustible product of the invention, spent microbial biomass can also be used and, in many embodiments of the invention, is used in the processes and products of the invention. Given the value of microbial oil, spent microbial biomass may be more commonly used in accordance with the invention, and methods of preparing such spent biomass are described below. Those of skill in the art will appreciate, however, in view of this disclosure, that lipid-rich biomass from oleaginous microbes, such as biomass obtained without lipid extraction, including but not limited to waste biomass from a failed extraction process, can also be used in the methods and products of the invention.

For example, conditioned feedstock, optionally comprising a bulking agent, is subjected to pressure in a pressing step to extract oil, producing oil separated from the spent biomass. The pressing step involves subjecting pressure sufficient to extract oil from the conditioned feedstock. Thus, in some embodiments, the conditioned feedstock that is pressed in the pressing step comprises oil predominantly or completely encapsulated in cells of the biomass. In other embodiments, the biomass comprises predominantly lysed cells and the oil is thus primarily not encapsulated in cells.

In various embodiments of the different aspects of the invention, the pressing step will involve subjecting the conditioned feedstock to at least 10,000 psi of pressure. In various embodiments, the pressing step involves the application of pressure for a first period of time and then application of a higher pressure for a second period of time. This process may be repeated one or more times ("oscillating pressure"). In various embodiments, moisture content of conditioned feedstock is controlled during the pressing step. In various embodiments, the moisture is controlled in a range of from 0.1% to 3% by weight.

In various embodiments, the pressing step is conducted with an expeller press. In various embodiments, the pressing step is conducted in a continuous flow mode. In various embodiments, the oiling rate is at least 500 g/min. to no more than 1000 g/min. In various continuous flow embodiments, the expeller press is a device comprising a continuously rotating worm shaft within a cage having a feeder at one end and a choke at the opposite end, having openings within the cage is utilized. The conditioned feedstock enters the cage through the feeder, and rotation of the worm shaft advances the feedstock along the cage and applies pressure to the feedstock disposed between the cage and the choke, the pressure releasing oil through the openings of cage and extruding spent biomass from the choke end of the cage.

The cage on some expeller press can be heated using steam or cooled using water depending on the optimal temperature needed for maximum yield. Optimal temperature should be enough heat to aid in pressing, but not too high heat as to burn the biomass while it feeds through the press. The optimal temperature for the cage of the expeller press can vary depending on the microbial biomass that is to be pressed. In some embodiments, the cage is preheated and held to a temperature of between 200-270° F. In other embodiments, the optimal cage temperature is between 210-230° F. In still other embodiments, the optimal cage temperature is between 240-260° F.

In various embodiments, pressure is controlled by adjusting rotational velocity of a worm shaft. In various embodiments, including those in which pressure is not controlled, an expeller (screw) press comprising a worm shaft and a barrel can be used.

Expeller presses (screw presses) are routinely used for mechanical extraction of oil from soybeans and oil seeds. Generally, the main sections of an expeller press include an intake, a rotating feeder screw, a cage or barrel, a worm shaft and an oil pan. The expeller press is a continuous cage press, in which pressure is developed by a continuously rotating worm shaft. An extremely high pressure, approximately 10,000-20,000 pounds per square inch, is built up in the cage or barrel through the action of the worm working against an adjustable choke, which constricts the discharge of the pressed cake (spent biomass) from the end of the barrel. In various embodiments, screw presses from the following manufacturers are suitable for use: Anderson International Corp. (Cleveland, Ohio), Alloco (Santa Fe, Argentina), De Smet Rosedowns (Humberside, UK), The Dupps Co. (Germantown, Ohio), Grupo Tecnal (Sao Paulo, Brazil), Insta Pro (Des Moines, Iowa), French Oil Mill (Piqua, Ohio), Harburg Freudenberger (previously Krupp Extraktionstechnik) (Hamburg, Germany), Maschinenfabrik Reinartz (Neuss, Germany), Shann Consulting (New South Wales, Australia) and SKET (Magdeburg, Germany).

Microbial biomass or conditioned feedstock is supplied to the expeller press via an intake. A rotating feeder screw advances the material supplied from the intake into the barrel where it is then compressed by rotation of the worm shaft. Oil extracted from the material is then collected in an oil pan and then pumped to a storage tank. The remaining spent biomass is then extruded out of the press as a cake and can be collected for additional processing. The cake may be pelletized or otherwise processed into a size and shape that is desired.

The worm shaft is associated with a collar setup and is divided into sections. The worm and collar setup within each section is customizable. The worm shaft is responsible for conveying biomass (feedstock) through the press. It may be characterized as having a certain diameter and a thread pitch. Changing shaft diameter and pitch can increase or decrease the pressure and shear stress applied to feedstock as it passes through the press. The collar's purpose is to increase the pressure on the feedstock within the press and also apply a shear stress to the biomass.

The worm shaft preferably is tapered so that its outer diameter increases along the longitudinal length away from the barrel entrance. This decreases the gap between the worm shaft and the inside of the barrel thus creating greater pressure and shear stress as the biomass travels through the barrel. Additionally, the interior of the barrel is made up of flat steel bars separated by spacers (also referred to as shims), which are set edgewise around the periphery of the barrel, and are held in place by a heavy cradle-type cage. Adjusting the shim between the bars controls the gap between the bars which helps the extracted oil to drain as well as also helping to regulate barrel pressure. The shims are often from 0.003" thick to 0.030" thick and preferably from 0.005" to 0.020" thick, although other thicknesses may also be employed. Additionally, the bars may be adjusted, thereby creating sections within the barrel.

As the feed material is pressed or moved down the barrel, significant heat is generated by friction. In some cases, the amount of heat is controlled using a water-jacketed cooling system that surrounds the barrel. Temperature sensors may be disposed at various locations around the barrel to monitor and aid in temperature control. Additionally, pressure sensors may also be attached to the barrel at various locations to help monitor and control the pressure.

Various operating characteristics of the expeller (screw) press can be expressed or analyzed as a compression ratio. Compression ratio is the ratio of the volume of material displaced per revolution of the worm shaft at the beginning of the barrel divided by the volume of material displaced per revolution of the worm shaft at the end of the barrel. For example, due to increasing compression ratios the pressure may be 10 to 18 times higher at the end of the barrel as compared with the beginning of the barrel. Internal barrel length may be at least ten times or even thirteen times the internal barrel diameter. Typical compression ratio for a screw or expeller press ranges from 1 to 18, depending on the feed material.

Residence time of the feed material in an expeller (screw) press may affect the amount of oil recovery. Increased residence time in the press gives the feedstock more exposure to the shear stress and pressure generated by the press, which may yield higher oil recovery. Residence time of the feedstock depends on the speed at which the press is run and the length vs. diameter of the screw press (or L/D). The greater the ratio of the length of the shaft to the diameter of the shaft, the longer the residence time of the feedstock (when rotational speed is held at a constant). In some embodiments, the residence time of the biomass that is being pressed with an expeller press is no more than 5 to 10 minutes.

The resulting pressed solids or cake (spent biomass of reduced oil content relative to the feedstock supplied to the screw press) is expelled from the expeller press through the discharge cone at the end of the barrel/shaft. The choke utilizes a hydraulic system to control the exit aperture on the expeller press. A fully optimized oil press operation can extract most of the available oil in the oil-bearing material. A variety of factors can affect the residual oil content in the pressed cake. These factors include, but are not limited to, the ability of the press to rupture oil-containing cells and cellular compartments and the composition of the oil-bearing material itself, which can have an affinity for the expelled oil. In some cases, the oil-bearing material may have a high affinity for the expelled oil and can absorb the expelled oil back into the material, thereby trapping it. In that event, the oil remaining in the spent biomass can be re-pressed or subjected to solvent extraction, as described herein, to recover the oil. Methods for using an expeller press to prepare spent biomass are described in PCT Publication No. 2010/120939, incorporated herein by reference.

These oil extraction methods result in the production of microbial biomass of reduced oil content (spent biomass also referred to as pressed cake or pressed biomass) relative to the conditioned feedstock subjected to pressure in the pressing step. In various embodiments of the present invention, the oil content in the spent biomass of reduced oil content is at least 45 percent less than the oil content of the microbial biomass before the pressing step. In various embodiments, the spent biomass of reduced oil content remaining after the pressing step is pelletized or extruded as a cake. The spent cake, which may be subjected to additional processes, including additional conditioning and pressing or solvent-based extraction methods to extract residual oil, is useful as biomass in a process or for incorporation into a product of the invention.

In some instances, the pressed cake contains a range of from less than 50% oil to less than 1% oil by weight, including, for example, less than 40% oil by weight, less than 20% oil by weight, less than 10%, less than 5% oil by weight, and less than 2% oil by weight. In some embodiments, the pressed cake contains at least 1% oil by weight, at least 2% oil by weight, at least 5% oil by weight, at least 10% oil by weight, at least 20% oil by weight, or at least 30% oil by weight. In all cases, the oil content in the pressed cake is less than the oil content in the unpressed material.

In some embodiments, the spent biomass or pressed cake is collected and subjected to one or more of the dewatering, drying, heating, and conditioning methods described above prior to incorporation into a composition suitable for use in the invention. In addition, the spent biomass may be crushed, pulverized, or milled prior to such use.

Other methods suitable for extracting lipid from microbial biomass and generating spent microbial biomass are described in PCT Publication No. 2010/120939, incorporated herein by reference. Those of skill in the art will appreciate that different microbes, culture conditions, and post-culture processing of microbial biomass will yield different types pyrolysis oil with respect to hydrocarbon content (including differences in the types of hydrocarbons present and/or their abundance relative to other hydrocarbons in the oil). In one important embodiment, the pyrolysis oil or other combustible product of the invention is derived from a microbe that has been genetically engineered to consume sucrose and/or alter its fatty acid profile, including but not limited to organisms described in U.S. patent application Ser. Nos. 12/131,773, 12/497,257, 12/628,140, 13/087,311, 13/118,369, 13/288,825, and 13/365,253, which are incorporated herein by reference for this description.

The pyrolysis oils of the invention can be prepared by the methods described in the following section.

IV. Pyrolysis of Microbial Biomass

The present invention provides methods and compositions relating to the pyrolysis of microbial biomass and the products produced by those methods. In some aspects, the microbial biomass comprises oleaginous microbes that have not been subjected to a process for lipid extraction or have been subjected to such a process, but the process failed or partially failed for some reason. In other aspects, the microbial biomass comprises the spent biomass from oleaginous microbes wherein some of the microbial oil has been first extracted from the oleaginous microbes. One of the significant advantages of the present invention is that it provides methods for generating pyrolysis oil from spent microbial biomass, which previously was useful as an animal feed or treated as waste. The spent biomass from oleaginous microbes can be produced, for example and without limitation, using expeller pressing methods described above. Such methods include a drying step so that the moisture content of the microbial biomass is lowered to less than 5%. During the expeller pressing process, not only is oil extracted from the oleaginous microbes (and therefore, can be used in other applications), but the defatted biomass is compressed (densified). The spent biomass may be further shaped into pellets or bricks for use as pellet fuels/solid fuel.

The low moisture content of the microbial biomass, especially spent biomass, makes it especially suitable for subsequent applications such as pyrolysis and gasification. As described above, in some embodiments, it may be desirable for the spent biomass to be crushed, pulverized, or milled prior to use in such subsequent applications.

Thus, microbial biomass is used in accordance with the methods of the invention as a feedstock for pyrolysis. Pyrolysis is a thermochemical process in which a solid feedstock (organic material) is converted into liquid pyrolysis oil and gaseous products, usually in the absence of oxygen, and involves rapidly vaporizing the biomass at elevated temperatures and then cooling or quenching the condensable vapor resulting therefrom. The resulting liquid carbon product, termed pyrolysis oil, is useful in fuel applications such as for generating diesel engine power (diesel generator set or diesel gen set). The gases produced by the process are useful for hydrogen generation and other applications.

Pyrolyis process parameters and apparatus for performing pyrolysis in accordance with the methods of the present invention are described in U.S. Pat. Nos. 7,968,006; 7,951,271; 7,947,155; 7,914,667; 4,105,502; and 4,002,438; and U.S. Patent App. Nos. 2011/0114467; and 2011/0139596, incorporated herein by reference. Processes and apparatus for processing pyrolysis effluents and for removing water from pyrolysis oil suitable for use in combination with the methods of the invention are described in U.S. Pat. No. 7,972,482 and U.S. Patent App. Nos. 2011/0139597, incorporated herein by reference.

In accordance with the methods of the invention, oleaginous microbial biomass (e.g., spent microbial biomass) prepared as described herein is rapidly heated at high temperatures in a low oxygen atmosphere to produce a gas containing a mixture of hydrocarbons, which gas is then cooled to form a pyrolysis oil. The cooling is optionally performed in a manner so as to fractionate the hydrocarbons in the gas. Generally the heating time is less than 10 seconds, typically less than 5 seconds, and often for only 2 or 3 seconds. The heating temperature is generally in the range of from 200 to 1400 degrees C., typically in the range of 200 to 1000 degrees C., often in the range of from 400 to 650 degrees C. The atmosphere in which the heating takes place is typically depleted in oxygen, i.e., less than 3% V/V oxygen, typically less than 1% V/V oxygen, i.e., in the range of 0.01% to 1%, V/V oxygen, and sometimes less than 0.01% oxygen.

All pyrolysis oils consist of a non-homogenous mixture of an aqueous phase and an oil phase. Typical non-microbial biomass (e.g., wood and other plant materials) are high in moisture content and the pyrolysis oils produced therefrom are high in moisture content. In addition, non-microbial biomasses are high in acid precursors. Consequently, pyrolysis oils produced from conventional biomass are highly acidic and unstable. The microbial biomass of the present invention is low in moisture content and low in acid precursors. Thus the use of microbial biomass provides pyrolysis oil that is both low in moisture content and acidity. A reduction in the acidity of the pyrolysis oil produced from microbial biomass increases the stability of the pyrolysis oil. The stability of the pyrolysis oil is one of the issues that has held back the commercial success of non-microbial pyrolysis oils.

Typical non-microbial biomass feeds for pyrolysis consist of lignin and cellulose derived materials. The defatted biomass of the present invention is uniquely low in lignin. Lignin is particularly hard to pyrolyse and leads to higher yields of char, and lower yields of oil, for example in feedstocks high in lignin content such as corn stover. The present invention provides lower char than from other plant-based feedstocks.

The low lignin content of the feed also produces other desirable properties of pyrolysis oil for further conversion to fuels. Lignin contains many of the aromatic precursors. Pyrolysis oils produced from feedstocks high in lignin are high in aromatic compounds. Today, regulatory requirements require the reduction of heavy polynuclear aromatics (HPNA) in diesel. Similarly, in gasoline, the permitted allowable content of benzene has been reduced. The use of microbial biomass significantly reduces the aromatics content of pyrolysis-derived fuels. The cellulosic structure of the microbial biomass contains higher concentrations of paraffinic and napthenic precursors than typical plant-derived biomass. Paraffins and naphthenes in the gasoline range are ideal fuel blending components, compared with aromatics which are limited for health and safety reasons by standard setting agencies such as the EPA.

In certain embodiments, e.g., where a threshold level of aromatics is desirable, a blended fuel can be prepared by blending the pyrolysis oil described above with a fuel to yield a blended fuel includes from about 1% to about 50% aromatic compounds. In various embodiments, the blended fuel can include from about 1% to about 50%, from about 5% to about 45%, from about 10% to about 40%, from about 15% to about 35%, or from about 20% to about 30% aromatic compounds. Fuel useful for blending with the pyrolysis oil include gasoline, diesel, biodiesel, jet fuel, and the like.

Products of the pyrolysis reaction are also useful as heating oil substitutes. The pyrolysis oil generated from the microbial biomass (which may be spent microbial biomass) can be a drop-in replacement for heating oil from fossil fuel sources. The pyrolysis oil from microbial biomass can be cleaner burning and have a lower sulfur content as compared to heating oil from fossil fuel (petroleum) sources.

Products of the pyrolysis reaction, namely pyrolysis oil, contain aromatics that can be suitable as a blend stock for gasoline in accordance with the methods of the invention by blending the aromatics with lower grade gasoline to create a higher grade gasoline. The aromatics present in the pyrolysis oil can also be suitable in accordance with the methods of the invention as a blend stock for aviation fuels, thereby creating a higher grade aviation fuel. The aromatics can also be extracted from the pyrolysis oil and then can be suitable in accordance with the methods of the invention as a feedstock for plastics production.

The microbial biomass used in the methods of the invention presents several advantages as feedstock for pyrolysis when compared to conventional pyrolysis feedstock. Use of the microbial biomass for pyrolysis in various embodiments of the methods of the invention yields a pyrolysis product that is more paraffinic than wood or conventional pyrolysis feed. Also because the microbial biomass can, at least in many embodiments, be low in lignin content, practice of the invention results in higher quality pyrolysis oil as compared to pyrolysis oil from wood or other conventional pyrolysis feed. The microbial biomass is also lower in metal content, which results in cleaner pyrolysis oil. Also, the microbial biomass has a low nitrogen content, resulting in a cleaner burning fuel product. There is also very little or no detectable level of silica in the microbial biomass, as compared to grasses, a conventional pyrolysis feedstock. The lack of silica or low silica content in the pyrolysis product will have less of an impact (wear and tear) on any downstream/conversion processes and machinery.

The microbial biomass, especially the spent microbial biomass, can be milled or processed into a variety of particle sizes in accordance with the methods of the invention. In some embodiments, a small, uniform particle size e.g. a size in the range of about 1 mm to about 100 mm is produced. In some embodiments, the average particle size of the biomass is from about 1 mm to about 75 mm, from about 1 mm to about 50 mm, from about 5 mm to about 30 mm, from about 10 mm to about 30 mm, from about 10 mm to about 20 mm, from about 5 mm to about 25 mm, or from about 5 mm to about 25 mm, from about 25 mm to about 75 mm. In various embodiments, the average particle size of the biomass falls within in a different range bounded by any of the values listed above (e.g., from about 5 mm to about 10 mm). A small, uniform particle size has many benefits over conventional pyrolysis feedstock including reduced capital costs due to shorter reaction times and a more efficient reaction environment. Also a small, uniform particle size can be better blended with sand, a typical heat conductor in some pyrolysis processes, making the pyrolysis processes more efficient., the fluidization characteristics of the sand and microbial biomass are more predictable with a more uniform particle size, and result in a more homogeneous reaction environment, leading to a more consistent pyrolysis oil composition.

In various embodiments of the pyrolysis methods of the invention, a fluid bed reactor is employed. Suitable pyrolysis temperatures typically range from 400 to 600 degrees C., i.e., 500 degrees C., and suitable vapor residence times are 5 seconds or less, i.e., 2-3 seconds. A suitable heating rate is 600 degrees C./s, and a suitable sweep gas (such as nitrogen) flow rate is 0.1-1 m$^3$/h, i.e., 0.2-0.6 m$^3$/h.

In one embodiment a feed system is used to provide a regulated flow of solid biomass feedstock to the conversion system. Preferably, the biomass feedstock is a dry feedstock, as discussed above. As the conversion system operates at slightly above atmospheric pressure (i.e., sufficient pressure to overcome the back pressure of the down stream equipment), the feed system provides material to the conversion system under slight pressure (e.g., 1.2 atmospheres) while at the same time accepting feedstock material from, e.g., a storage silo, which is at atmospheric pressure. To achieve a continuous supply of feedstock in this manner a lock-hopper system can be utilized.

The feed system can comprise a feedstock surge bin, a feed bin, and a transfer valve, e.g., knife gate valve, between the surge bin and feed bin. The valve provides isolation of the surge bin from the feed bin, and can comprise an elastomer seat to ensure a gas tight seal. The valve allows filling of the surge bin with feedstock under atmospheric conditions while maintaining a seal in the feed bin so that the feed bin can operate at above atmospheric pressure. The feedstock surge bin can be a cylindrical vessel constructed of carbon steel with a capacity that is sufficient to hold enough feedstock, e.g., for approximately at least 30 minutes of feedstock transfer, before refilling.

The surge bin can be equipped with a bottom-out feed system and internal bridge-breaking device to dislodge held-up biomass material. Examples of bridge breaking devices include a sweep-arm with or without finger projections, vibration devices, swing chains, and the like. The rate of feedstock discharge from the surge bin may be fixed and a full transfer cycle completed within approximately 10 minutes. Three level sensors (high level switch high, low level switch low, and low-low level switch) may be used to activate feedstock transfer. In addition, continuous monitoring of the feedstock material level in the surge bin may be achieved with a level transmitter. When the level of material in the surge bin drops to activate the low level switch, feedstock material will automatically be transferred from the feedstock storage system to the surge bin. The high level switch is used to indicate when the surge bin is full and the material transfer from the feedstock storage system is terminated. The low-low switch is a back-up switch to indicate that the bin is empty when the low level switch is not triggered. This may occur, e.g., when material holds up on the low level switch giving a false reading. The valve is closed when the surge bin is being filled.

When the level in the feed bin reaches the lower level switch, feedstock material is automatically transferred from the surge bin to the feed bin. Prior to opening the valve, the pressure of the surge bin is equalized with the feed bin. The feedstock material can be transferred from the surge bin to the feed bin by direct transfer when the surge bin is located directly above the feed bin and the valve is opened. Alternatively, if the bins are off-set, then an auger or screw feeder system can be used to transfer material from the surge bin to the feed bin. The auger or screw can be horizontal or inclined depending on the relative orientation of the two bins. The feed bin is preferably constructed of carbon steel and is equipped with a volumetric bottom-out feeder. The volumetric feeder provides a metered flow of material to a constant speed conversion inlet screw conveyor, which transfers the material to the conversion system. The operator can adjust the desired flow of material by adjusting the speed of the screw conveyor. To provide feedstock conditioning, an internal bridge-breaking system is incorporated.

The constant speed screw conveyor can be constructed of stainless steel and is provided with high temperature seals and bearings. The conveyor may operate at a constant speed and is capable of discharging material into the conversion system at a higher rate than is being provided by the volumetric feeder. This ensures a homogeneous, dispersed flow of material. For safety, the outlet of the screw can be fitted with an emergency isolation knife valve and water quench system.

In certain embodiments, suitable thermal conversion system includes a reactor that mixes the feedstock with an upward flowing stream of hot heat carriers, e.g., sand, in a mixing zone. The reactor is essentially oxygen free. The feedstock enters the reactor just below the mixing zone and is contacted by the upward flowing stream of hot heat carriers (sand) and their transport fluid (recycle gas). The result is thorough and rapid mixing and conductive heat transfer (including ablation) from the heat carriers to the feedstock. The hot heat carriers instantly flash the feedstock into a hot vapor, which is cooled, condensed, and recovered downstream as a liquid product.

Thermal conversion of the feedstock is initiated in the mixing zone under moderate temperatures, e.g., approximately 500 degrees C. (approximately 930 degree F.) and continues through to the separation system located downstream of the reactor. The resident time in the reactor is usually less than 5 seconds, and often less than 2 seconds. The solid heat carriers along with by-product char are removed from the product vapor stream in a separation system. The separation system can be fitted with high-abrasion resistant liner to minimize the likelihood of premature failure. The product vapor stream passing through the separation system is directed to the downstream liquid product recovery system.

The separation system can comprise two cyclonic separators. The first cyclonic separator separates the solid heat carriers and by-product char from the product stream. The solids that have been removed in the first separator are directed to a reheater unit. The second separator removes char that is not removed in the first separator.

In the reheater unit, the by-product char is converted by the addition of air to heat and combustion gases. Typically, there is more than sufficient heat generated by the combustion of by-product char and gas to satisfy the heat requirements of the thermal conversion process (external fuels, such as natural gas, are rarely used and typically for system start-up alone). The excess heat from the reheater can be productively used for other purposes, including biomass drying, steam generation, space heating, power generation, etc. The heat generated in the reheater elevates the temperature of the solid heat carriers, which can then be transferred to the feedstock material in the reactor to achieve the necessary reaction temperatures.

The hot vapor product stream from the solids separation system is directed via an insulated duct to a primary collection column or condensing chamber. The hot vapor stream is brought from a conversion temperature of approximately 350 degrees C. to 900 degrees C. to less than 100 degrees C. in less than 1 s. Often, the hot vapor stream is reduced to less than 50 degrees C. in less than 0.1 s (100 ms), or even in less than 20 ms. The primary collection column is equipped with a liquid distributor located in the upper portion of the column. Cooled liquid product or other appropriate quench media (e.g., water, diesel, other petroleum based liquid, polysorbate, etc) is circulated through the distributor and allowed to "rain" down on the incoming vapor stream.

Various types of distributor systems can be employed. Examples include, but are not limited to, vane, pipe, chimney, finger distributor, spray head, nozzle design, trays, packing, etc. At least 10 gpm/sq. ft (gallons per minute/sq. ft) of column cross-sectional diameter of quench liquid is circulated through the collection column. Typically, at least 50 to 100 gpm/sq. ft of column cross-sectional diameter of quench liquid is circulated through the collection column. The dense stream of liquid raining down the column not only serves to immediately cool and quench the incoming vapor but also provides nucleation sites for the collection of the liquid product.

Typically, the hot vapor enters the collection column just above the normal operating level of the collected liquid in the column. The vapor not collected in the primary collection column along with the non-condensable gas exit the column through a top exit port. This mode of operation is counter-current. In another mode of operation in which it is desired to minimize the length of the hot vapor piping the hot vapor enters through the upper portion of the column and the vapor not collected in the column along with the non-condensable gas exit through a port situated in the lower portion of the column (just above the normal liquid level). This mode of operation is co-current. The column may be equipped with a demister in the gas exit section of the column to reduce the carryover of liquid droplets into the second collection column.

Condensed liquid that has associated with the down flowing atomized quench stream accumulates in the lower portion of the column. In addition, heavy condensed droplets fall to the lower portion of the column due to gravitational sedimentation. Level transmitters in the column are used to monitor and maintain the desired liquid levels. In an embodiment, a portion of the liquid product is drawn out from the column and pumped by a condenser pump through a heat exchanger to cool the liquid product to, e.g., 30 to 50 degrees C. The cooling medium for the heat exchanger can be water. Other cooling means may be employed including a glycol system, an air cooler, or the like. The cooled liquid product is circulated back to the column distribution system to provide the quench media for the incoming vapor stream.

The liquid product in the collection column is pumped out to product storage tanks to maintain the desired liquid level. The collected liquid product provides a valuable liquid product, pyrolysis oil (bio-oil), that can be used, e.g., for fuel and/or other commercial uses.

In certain embodiments, the vapor is rapidly quenched because the vapor and liquid product are thermally labile (chemically react at higher temperatures). By using a high liquid recirculation/quench rate, the incoming vapor is rapidly quenched, which avoids or reduces undesirable chemical reactions such as polymerization that occur at higher temperatures. Further, a high recirculation rate of the liquid product used for the quench media prevents the quench media from reaching undesirably high temperatures. Those of skill in the art can determine suitable liquid recirculation/quench rates for a given system to reduce undesirable chemical reactions and/or quench media temperatures to acceptable levels.

The vapor not collected in the primary collection column or vessel can be directed to a secondary collection column (secondary condensing column). As was the case for the primary condensing column, the collected product liquid is used as a quench media via an overhead distribution system. Usually, at least 10 gpm/sq. ft of column cross-sectional diameter of liquid is circulated through the column. Often, at least 50 to 100 gpm/sq. ft of column cross-sectional diameter of quench liquid is circulated through the column. The column may be equipped with a demister in the gas exit section of the column to reduce the carryover of liquid droplets, mist or aerosols into the downstream demister or filtering systems. The cross-sectional diameter of this column may be the same as the primary collection column. However, it is typically smaller in diameter, because greater superficial gas velocities will facilitate the removal of the fine droplets or aerosols in the demister section of the column.

Mist, aerosols and non-condensable gas that exit the secondary collection column can be directed to a separate demister system. If the secondary collection column is equipped with an internal demister unit, then the downstream separate demister may not be required. The demister system preferably removes mist droplets that are greater than 3 microns. These droplets tend to be captured in the demister by inertial impaction. The particles, which are traveling in the gas stream, are unable to abruptly change direction along with the gas as the flow goes through the demisting system due to their weight. As a result, they impact the fibers of the demister and are subsequently captured. Mist particles that come in contact with the demister fibers adhere by weak Van Der Waals forces. The accumulating impacting mist droplets tend to join together to form larger single droplets that finally fall to the lower portion of the demister vessel due to gravitational sedimentation.

The demister system may comprise a series of mist eliminator units. The first unit can be a vane mist eliminator which can remove about 99% of the mist as low as 10 microns. Next can be a stainless steel wire mesh pad having a density of about 5 lbs/ft.sup.3 and a wire diameter of 0.011 inches (surface area of 45 ft.sup.2/ft.sup.3, and 99.0% voids). Other materials may be used besides steel including glass, alloy 20, Teflon, polypropylene, or the like. This can be followed by a 9 lb/ft.sup.3 stainless steel wire mesh pad, again 0.011 inch diameter (surface area of 85 ft.sup.2/ft.sup.3, and 98.0% voids). The final mist eliminator unit can be a co-knit style comprising a metal wire construction with fiberglass. The pad can be 9 lb/ft.sup.3 with a wire diameter of 0.00036 inches (surface area of 3725 ft.sup.2/ft.sup.3, and 99.0% voids).

Fine aerosols (i.e., less than approximately 3 microns), condensed particles of greater than 3 microns that evaded the demister system, and non-condensable gas from either the secondary condensing column or the demister system pass to a final filtering system. The filter system may comprise two fiber beds set up in parallel. Again, as was the case with the demister system, particles larger than about 3 microns can be captured by inertial impaction. Condensed particles between 1 and 3 microns tend to be captured through interception in which the particles follow the non-condensable gas stream line that comes within about one particle radius of the surface of a fiber. Particles of less than 1 micron are captured through diffusion or Brownian movement in which the particles have a tendency to attach themselves to the fibers of the filter due to their random motion. Again, captured particles tend to join together to form larger liquid droplets.

However, the pressure drop across the filter may exceed predetermined limits before a sufficient quantity of material has drained to the lower section of the filter vessel. In addition, re-entrainment of collected material can occur as the localized loading of liquid increases the effective open cross-sectional area of the filter decreases thereby increasing the flow of gas through the remaining open areas. This increase flow of gas leads to increased velocities that can lead to higher than desired pressure drops and possibly re-entrainment, and loss of captured liquid. Therefore, the filtering system can consist of more than one filter unit which can be set up in parallel or in series as required. Typically two filter units are employed in parallel in which one filter unit is on-line at any one time. A filter unit may remain on-line for a period of about 8 to 24 hours (typically 12 hours). When the filter unit is switched off-line it is allowed to drain. The pressure drop across the filter unit can also dictate the period of time that the unit is allowed to remain on-line. Pressure drops that exceed predetermined limits (typically 100 inches of water column) can lead to failures of the filter elements (i.e., tear holes can develop in the fabric) of the filter unit.

Because the collected mists and aerosol liquid can tend to be relatively viscous at ambient conditions a reheat exchanger can be employed between the secondary condenser column and the demister and fiber bed filters. Alternatively, if the demister is incorporated in the secondary condenser column, the reheat exchanger can be installed upstream of the fiber bed filters only. This reheat exchanger is used to slightly elevate the temperature of the vapor stream (up to about 60-65 degrees C.) and enable a sufficient viscosity reduction of the captured liquids in the downstream systems to allow adequate drainage.

The gas filtered through the filter system can be recycled back to the reactor by a reactor blower. The recycled gas provides the transport fluid for the upward flow of hot carriers in the mixing zone of the reactor.

Other suitable pyrolysis systems include those described in U.S. Patent Application Pub. Nos. 20110123407, 20100320070, and 20020132972, each of which is incorporated herein by reference.

In another embodiment, the microbial biomass (e.g., spent microbial biomass) is used in accordance with the methods of the invention as a feedstock for gasification. Gasification is a process that converts solid organic materials (carbon) into syngas (synthetic gas), which is a fuel useful in a variety of applications. The microbial biomass of the invention presents several advantages as feedstock for gasification as compared to conventional biomass such as wood or crop residue. The microbial biomass has a lower ash content compared to woody biomass; thus a smaller amount of ash will be produced using microbial biomass as compared to a conventional woody biomass. Ash and tar are by-products of gasification and must be cleaned from the gas before the syngas can be used for secondary fuel applications.

The microbial biomass, especially the spent microbial biomass, can be milled or processed into a variety of particle sizes. In some embodiments, a small, uniform particle size is desirable. In gasification, a smaller particle size will reduce the amount of tar and particulates that is produced. A smaller particle size will also reduce the amount of energy (and cost) needed to dry the feedstock for gasification. The small particle size may be suited for blending with other feedstock for gasification as a co-feed, such as with coal/coal dust as a co-feed for a coal gasification process.

Thus, the present invention provides a new source of carbon feedstock for energy densification processes such as pyrolysis and gasification. The oleaginous microbe-derived biomass presents several advantages over conventional feedstock as described above. Those of skill in the art will appreciate that the oleaginous microbe-derived biomass of the invention can be used to replace, in whole or in part, any conventional biomass source(s) currently used in pyrolysis or gasification.

V. Combustible Compositions

The present invention also provides solid, non-torrefied burnable fuel composition(s) comprising combustible biomass from an oleaginous microbe and methods for making them. In one embodiment, the composition is formed into an artificial fireplace log suitable for use in a fireplace. In one embodiment, the composition is formed into a pellet suitable for use in an oven, stove, or furnace. In one embodiment, the biomass is obtained by culturing said microbe under heterotrophic conditions. In one embodiment, the biomass is spent microbial biomass. In one embodiment, the microbe is a microalgae. In one embodiment, the biomass is from about 5% to about 75% by weight of said solid burnable fuel composition. In one embodiment, the composition further comprises non-microbial cellulosic material.

In one embodiment, the non-torrefied burnable fuel composition further comprises a combustible binder. In one embodiment, the combustible binder is wax. In one embodiment, the wax is paraffin. In various embodiments, the combustible binder is selected from those described in U.S. Pat. Nos. 4,326,854; 6,602,306; and 6,719,896; and U.S. Patent App. Pub. Nos. 20060230673 and 20080172930, each of which is incorporated herein by reference.

In one embodiment, the composition further comprises a crackling additive. Crackling additives make an audible popping noise when burned and include, for example and without limitation, small seeds and coke particles. Suitable crackling additives include, for example, those described in U.S. Pat. Nos. 5,868,804; 6,017,373; and 6,602,306, each of which is incorporated herein by reference.

In certain embodiments, solid, non-torrefied burnable fuel composition(s) comprising, consisting of, or consisting essentially of biomass from an oleaginous microbe that has been compacted to a density of at least about 500 kg/m$^3$, 500 kg/m$^3$, 7500 kg/m$^3$, 1000 kg/m$^3$, 1250 kg/m$^3$, 1500 kg/m$^3$, or higher are provided. In one embodiment, the biomass is spent microbial biomass. In one embodiment, the biomass is obtained from said microbe after culturing said microbe under heterotrophic conditions. In one embodiment, the microbe is a microalgae. In one embodiment, the biomass has been shaped to form an artificial fireplace log. In one embodiment, the biomass has been shaped to form a pellet suitable for use in a stove, oven, or furnace.

In certain embodiments, burnable torrefied composition(s) comprising biomass from an oleaginous microbe are provided. Torrefaction refers to a process in which biomass is heated (see the discussion of heating biomass above) and essentially is a mild form of pyrolysis. Temperatures for torrefaction typically range from 200° C.-300° C. In one embodiment, the microbe has been cultured under heterotrophic conditions. In one embodiment, the product further comprises cellulosic material, non-microbial lignocellulosic material or a combination thereof. In one embodiment, the biomass makes up from about 10% to about 100% by weight, 25% to about 100% by weigh, 50% to about 100% by weight, 75% to about 100% by weight, 80% to about 100% by weight, 90% to about 100% by weight, or about 100% by weight of said solid burnable fuel composition. In one embodiment, the biomass is spent microbial biomass. In one embodiment, the spent microbial biomass is spent microalgal biomass. In one embodiment, the spent microalgal biomass makes up by weight from about 20% to about 100% of said burnable torrefied composition.

In certain embodiments a process of converting biomass from an oleaginous microbe to a burnable torrefied composition is provided. In various embodiments the process comprises the steps of: (1) heating said biomass under substantially oxygen free conditions at a temperature of from about 200° C. to about 280° C.; (2) maintaining said heating step for a period of from about 0.25 hours to about 10 hours, about 0.5 hours to about 10 hours, about 1 hour to about 9 hours, about 2 hours to about 8 hours, about 3 hours to about 7 hours, or about 4 hours to about 6 hours; (3) cooling the heated product; and (5) recovering the burnable torrefied composition. This method is particularly suitable for biomass derived from oleaginous microbes, but other methods may be used to produce torrefied compositions of the invention. For example, U.S. Pat. Nos. 4,553,978; 4,787,917; 4,816,572; and 4,954,620, each of which is incorporated herein by reference, describe torrefaction methods suitable for use and adaptation to make torrefied compositions of the invention from oleaginous microbial biomass.

As described herein new and improved source(s) of combustible material suitable for use in artificial fireplace logs and fuel pellets are provided. Those of skill in the art will, upon contemplation of this disclosure, will appreciate that the oleaginous microbe-derived biomass of the invention can be used to replace, in whole or in part, any combustible material currently used in such products, including, without limitation, the products described in U.S. Pat. Nos. 4,104,034; 4,326,854; 4,553,978; 4,787,917; 4,816,572; 4,954,620; 5,868,804; 5,910,454; 6,017,373; 6,136,054; 6,602,306;

6,719,816; and 7,540,890, each of which is incorporated herein by reference for the products disclosed therein.

Certain aspects and embodiments of the invention are illustrated in the following examples.

VI. Examples

Example 1

Cultivation of Microalgae to Achieve High Oil Content

Microalgae strains were cultivated to achieve a high percentage of oil by dry cell weight. Cryopreserved cells were thawed at room temperature, and 500 µl of cells were added to 4.5 ml of medium (4.2 g/L $K_2HPO_4$, 3.1 g/L $NaH_2PO_4$, 0.24 g/L $MgSO_4 \cdot 7H_2O$, 0.25 g/L citric acid monohydrate, 0.025 g/L $CaCl_2 \cdot 2H_2O$, 2 g/L yeast extract) plus 2% glucose and grown for 7 days at 28° C. with agitation (200 rpm) in a 6-well plate. Dry cell weights were determined by centrifuging 1 ml of culture at 14,000 rpm for 5 minutes in a pre-weighed Eppendorf tube. The culture supernatant was discarded and the resulting cell pellet washed with 1 ml of deionized water. The culture was again centrifuged, the supernatant discarded, and the cell pellets placed at −80° C. until frozen. Samples were then lyophilized for 24 hours and dry cell weights were calculated. For determination of total lipid in cultures, 3 ml of culture was removed and subjected to analysis using an Ankom system (Ankom Inc., Macedon, N.Y.) according to the manufacturer's protocol. Samples were subjected to solvent extraction with an Ankom XT10 extractor according to the manufacturer's protocol. Total lipid was determined as the difference in mass between acid hydrolyzed dried samples and solvent extracted, dried samples. Percent oil dry cell weight measurements are shown below in Table 5.

TABLE 5

Cultivation of microalgae to achieve high oil content.

| Species | Strain | % Oil |
|---|---|---|
| Chlorella kessleri | UTEX 397 | 39.42 |
| Chlorella kessleri | UTEX 2229 | 54.07 |
| Chlorella kessleri | UTEX 398 | 41.67 |
| Parachlorella kessleri | SAG 11.80 | 37.78 |
| Parachlorella kessleri | SAG 14.82 | 50.70 |
| Parachlorella kessleri | SAG 21.11 H9 | 37.92 |
| Prototheca stagnora | UTEX 327 | 13.14 |
| Prototheca moriformis | UTEX 1441 | 18.02 |
| Prototheca moriformis | UTEX 1435 | 27.17 |
| Chlorella minutissima | UTEX 2341 | 31.39 |
| Chlorella protothecoides | UTEX 250 | 34.24 |
| Chlorella protothecoides | UTEX 25 | 40.00 |
| Chlorella protothecoides | CCAP 211/8D | 47.56 |
| Chlorella sp. | UTEX 2068 | 45.32 |
| Chlorella sp. | CCAP 211/92 | 46.51 |
| Chlorella sorokiniana | SAG 211.40B | 46.67 |
| Parachlorella beijerinkii | SAG 2046 | 30.98 |
| Chlorella luteoviridis | SAG 2203 | 37.88 |
| Chlorella vulgaris | CCAP 211/11K | 35.85 |
| Chlorella reisiglii | CCAP 11/8 | 31.17 |
| Chlorella ellipsoidea | CCAP 211/42 | 32.93 |
| Chlorella saccharophila | CCAP 211/31 | 34.84 |
| Chlorella saccharophila | CCAP 211/32 | 30.51 |

Culturing *Chlorella protothecoides* to Achieve High Oil Content

Three fermentation processes were performed with three different media formulations with the goal of generating algal biomass with high oil content. The first formulation (Media 1) was based on medium described in Wu et al. (1994 *Science in China*, vol. 37, No. 3, pp. 326-335) and consisted of per liter: $KH_2PO_4$, 0.7 g; $K_2HPO_4$, 0.3 g; $MgSO_4 \cdot 7H_2O$, 0.3 g; $FeSO_4 \cdot 7H_2O$, 3 mg; thiamine hydrochloride, 10 µg; glucose, 20 g; glycine, 0.1 g; $H_3BO_3$, 2.9 mg; $MnCl_2 \cdot 4H_2O$, 1.8 mg; $ZnSO_4 \cdot 7H_2O$, 220 µg; $CuSO_4 \cdot 5H_2O$, 80 µg; and $NaMoO_4 \cdot 2H_2O$, 22.9 mg. The second medium (Media 2) was derived from the flask media described in Example 1 and consisted of per liter: $K_2HPO_4$, 4.2 g; $NaH_2PO_4$, 3.1 g; $MgSO_4 \cdot 7H_2O$, 0.24 g; citric acid monohydrate, 0.25 g; calcium chloride dehydrate, 25 mg; glucose, 20 g; yeast extract, 2 g. The third medium (Media 3) was a hybrid and consisted of per liter: $K_2HPO_4$, 4.2 g; $NaH_2PO_4$, 3.1 g; $MgSO_4 \cdot 7H_2O$, 0.24 g; citric acid monohydrate, 0.25 g; calcium chloride dehydrate, 25 mg; glucose, 20 g; yeast extract, 2 g; $H_3BO_3$, 2.9 mg; $MnCl_2 \cdot 4H_2O$, 1.8 mg; $ZnSO_4 \cdot 7H_2O$, 220 µg; $CuSO_4 \cdot 5H_2O$, 80 µg; and $NaMoO_4 \cdot 2H_2O$, 22.9 mg. All three media formulations were prepared and autoclave sterilized in lab scale fermentor vessels for 30 minutes at 121° C. Sterile glucose was added to each vessel following cool down post autoclave sterilization.

Inoculum for each fermentor was *Chlorella protothecoides* (UTEX 250), prepared in two flask stages using the medium and temperature conditions of the fermentor inoculated. Each fermentor was inoculated with 10% (v/v) mid-log culture. The three lab scale fermentors were held at 28° C. for the duration of the experiment. The microalgal cell growth in Media 1 was also evaluated at a temperature of 23° C. For all fermentor evaluations, pH was maintained at 6.6-6.8, agitations at 500 rpm, and airflow at 1 vvm. Fermentation cultures were cultivated for 11 days. Biomass accumulation was measured by optical density at 750 nm and dry cell weight.

Lipid/oil concentration was determined using direct transesterification with standard gas chromatography methods. Briefly, samples of fermentation broth with biomass was blotted onto blotting paper and transferred to centrifuge tubes and dried in a vacuum oven at 65-70° C. for 1 hour. When the samples were dried, 2 mL of 5% $H_2SO_4$ in methanol was added to the tubes. The tubes were then heated on a heat block at 65-70° C. for 3.5 hours, while being vortexed and sonicated intermittently. 2 ml of heptane was then added and the tubes were shaken vigorously. 2 ml of 6% $K_2CO_3$ was added and the tubes were shaken vigorously to mix and then centrifuged at 800 rpm for 2 minutes. The supernatant was then transferred to GC vials containing $Na_2SO_4$ drying agent and ran using standard gas chromatography methods. Percent oil/lipid was based on a dry cell weight basis. The dry cell weights for cells grown using: Media 1 at 23° C. was 9.4 g/L; Media 1 at 28° C. was 1.0 g/L, Media 2 at 28° C. was 21.2 g/L; and Media 3 at 28° C. was 21.5 g/L. The lipid/oil concentration for cells grown using: Media 1 at 23° C. was 3 g/L; Media 1 at 28° C. was 0.4 g/L; Media 2 at 28° C. was 18 g/L; and Media 3 at 28° C. was 19 g/L. The percent oil based on dry cell weight for cells grown using: Media 1 at 23° C. was 32%; Media 1 at 28° C. was 40%; Media 2 at 28° C. was 85%; and Media 3 at 28° C. was 88%.

Example 2

Culturing Oleaginous Yeast To Achieve High Oil Content

Yeast strain *Rhodotorula glutinis* (DSMZ-DSM 70398) was obtained from the Deutsche Sammlung von Mikroorganismen and Zellkulturen GmbH (German Collection of Microorganism and Cell Culture, Inhoffenstraβe 7B, 38124 Braunschweig, Germany). Cryopreserved cells were thawed and added to 50 mL YPD media (described above) with 1×DAS vitamin solution (1000×: 9 g/L tricine; 0.67 g/L thiamine-HCl; 0.01 g/L d-biotin; 0.008 cyannocobalamin; 0.02 calcium pantothenate; and 0.04 g/L p-Aminobenzoic acid) and grown at 30° C. with 200 rpm agitation for 18-24 hours until an OD reading was over 50D (A600). The culture was then transferred to 7-L fermentors and switched to YP1 medium (8.5 g/L Difco Yeast Nitrogen Base without Amino Acids and Ammonium Sulfate, 3 g/L Ammonium Sulfate, 4 g/L yeast extract) with 1×DAS vitamin solution. The cultures were sampled twice per day and assayed for OD (A600), dry cell weight (DCW) and lipid concentration. When the cultures reached over 50 g/L DCW, the cultures were harvested. Based on dry cell weight, the yeast biomass contained approximately 50% oil.

Oleaginous yeast strains used in this example were obtained from either the Deutsche Sammlung von Mikroorganismen un Zellkulturen GmbH (DSMZ), located at Inhofenstrabe 7B, 38124 Braunschweig, Germany, or Centraalbureau voor Schimmelscultures (CBS) Fungal Biodiversity Centre located at P.O. Box 85167, 3508 Utrecht, the Netherlands. One hundred eighty five oleaginous yeast strains were screened for growth rate and lipid production.

All strains were rendered axenic via streaking to single colonies on YPD agar (YPD medium as described below with 2% agar added) plates. Single colonies from the YPD plates of each strain was picked and grown to late log phase in YPD medium (10 g bacto-yeast extract, 20 g bacto-peptone and 20 g glucose/1 L final volume in distilled water) on a rotary shaker at 200 rpm at 30° C.

For lipid productivity assessment, 2 mL of YPD medium was added to a 50 mL tared Bioreactor tube (MidSci, Inc.) and inoculated from a frozen stock of each strain. The tubes were then placed in a 30° C. incubator and grown for 24 hours, shaking at 200 rpm to generate a seed culture. After 24 hours, 8 mLs of Y1 medium (Yeast nitrogen base without amino acids, Difco) containing 0.1 M phthalate buffer, pH 5.0 was added and mixed well by pipetting gently. The resulting culture was divided equally into a second, tared bioreactor tube. The resulting duplicate cultures of 5 mL each were then placed in a 30° C. incubator with 200 rpm agitation for 5 days. The cells were then harvested for lipid productivity and fatty acid profile. 3 mL of the culture was used for determination of dry cell weight and total lipid content (lipid productivity) and 1 mL was used for fatty acid profile determination. In either case, the cultures were placed into tubes and centrifuged at 3500 rpm for 10 minutes in order to pellet the cells. After decanting the supernatant, 2 mL of deionized water was added to each tube and used to wash the resulting cell pellet. The tubes were spun again at 3500 rpm for 10 minutes to pellet the washed cells, the supernatant was then decanted and the cell pellets were placed in a −70° C. freezer for 30 minutes. The tubes were then transferred into a lyophilizer overnight to dry. The following day, the weight of the conical tube plus the dried biomass resulting from the 3 mL culture was recorded and the resulting cell pellet was subjected to total lipid extraction using an Ankom Acid Hydrolysis system (according to the manufacturer's instructions) to determine total lipid content.

Of the 185 strains screened, 30 strains were chosen based on the growth rate and lipid productivity. The lipid productivity (expressed as percent lipid of dry cell weight) of these 30 strains are summarized in the table below.

TABLE 6

Lipid productivity of oleaginous yeast strains.

| Species | Collection No. | % Lipid (DCW) |
| --- | --- | --- |
| Rhodotorula terpenoidalis | CBS 8445 | 27 |
| Rhodotorula glutinus | DSMZ 70398 | 53.18 |
| Lipomyces tetrasporous | CBS 1810 | 51 |
| Lipomyces tetrasporous | CBS 7656 | 17.63 |
| Lipomyces tetrasporous | CBS 8724 | 18 |
| Cryptococcus curvatus | CBS 5324 | 53 |
| Cryptococcus curvatus | CBS 2755 | 48 |
| Rhodosporidium sphaerocarpum | CBS 2371 | 43 |
| Rhodotorula glutinus | CBS 4476 | 30.97 |
| Lipomyces tetrasporous | CBS 1808 | 29 |
| Trichosporon domesticum | CBS 8111 | 35.16 |
| Trichosporon sp. | CBS 7617 | 40.09 |
| Lipomyces tetrasporous | CBS 5911 | 27.63 |
| Lipomyces tetrasporous | CBS 5607 | 12.81 |
| Cryptococcus curvatus | CBS 570 | 38.64 |
| Cryptococcus curvatus | CBS 2176 | 40.57 |
| Cryptococcus curvatus | CBS 5163 | 35.26 |
| Torulaspora delbruekii | CBS 2924 | 40.00 |
| Rhodotorula toruloides | CBS 8761 | 36.52 |
| Geotrichum histeridarum | CBS 9892 | 33.77 |
| Yarrowia lipolytica | CBS 6012 | 29.21 |
| Geotrichum vulgare | CBS 10073 | 28.04 |
| Trichosporon montevideense | CBS 8261 | 25.60 |
| Lipomyces starkeyi | CBS 7786 | 25.43 |
| Trichosporon behrend | CBS 5581 | 23.93 |
| Trichosporon loubieri var. loubieri | CBS 8265 | 22.39 |
| Rhodosporidium toruloides | CBS 14 | 21.03 |
| Trichosporon brassicae | CBS 6382 | 20.34 |
| Rhodotorula aurantiaca | CBS 317 | 17.51 |
| Sporobolomyces alborubescens | CBS 482 | 10.09 |

Example 3

Cultivation of *Rhodococcus opacus* to Achieve High Oil Content

A seed culture of *Rhodococcus opacus* PD630 (DSM 44193, Deutsche Sammlung von Mikroorganismen and Zellkuttwen GmbH) was generated using 2 ml of a cryopreserved stock inoculated into 50 ml of MSM media with 4% sucrose (see Schlegel, et al., (1961) *Arch Mikrobiol* 38, 209-22) in a 250 ml baffle flask. The seed culture was grown at 30° C. with 200 rpm agitation until it reached an optical density of 1.16 at 600 nm. 10 ml of the seed flask was used to inoculate cultures for lipid production under two different nitrogen conditions: 10 mM $NH_4Cl$ and 18.7 mM $NH_4Cl$ (each in duplicate). The growth cultures were grown at 30° C. with 200 rpm agitation for 6 days. Cells grown in the 10 mM $NH_4Cl$ condition reached a maximal 57.2% (average) lipid by DCW after 6 days of culture. Cells grown in the 18.7 mM $NH_4Cl$ condition reached a maximal 51.8% (average) lipid by DCW after 5 days in culture.

Example 4

Preparation of Spent Biomass from Microalgae

Methods of oil extraction from microalgae, and thereby producing spent biomass, using a oil-seed press is described in detail in PCT application number PCT/US10/031,108, hereby incorporated by this reference. In brief, *Prototheca moriformis* (UTEX 1435) containing approximately 66% oil (by dry cell weight) was drum dried to a moisture content of about 2.7%. The dried biomass was then heat-conditioned in a vertical stacked heat conditioner. The moisture content of the biomass after heat-conditioning was approximately 0.6-1.4%. The algal biomass was then fed into a 3.5" oil seed screw press (French Oil Mill Company, Piqua Ohio) with the cage preheated to 195-220° F. The biomass oiled well with some footing. The spent biomass was then collected and was suitable for use in the methods of the invention.

*Chlorella protothecoides* (UTEX 250) containing approximately 38% oil (by dry cell weight) was drum dried to a moisture content of about 3 to 5%. The dried biomass was then heat-conditioned in a vertical stacked heat conditioner at 250° F. The algal biomass was then fed into a 3.5" oil seed screw press (French Oil Mill Company, Piqua Ohio) with the cage preheated to about 200° F. The biomass oiled well with some footing. The spent biomass was then collected and was suitable for use in the methods of the invention.

Similar generation of spent biomass with dried microalgal biomass combined with 5 to 20% press aids such as switchgrass and soy hulls was performed. Microalgal biomass (*Chlorella protothecoides* UTEX 250) containing 38% oil by DCW was dried using a drum dryer with a resulting moisture content of about 3.5% (as measured by a moisture analyzer). Five to 20% (w/w) of dried switchgrass or soyhulls were combined with the drum dried microalgal biomass. The biomass was then heat conditioned in a vertical stacked heat conditioner in similar conditions as described above. The heat conditioned biomass was then fed into an L-250 (3.5" diameter) French pilot scale oilseed screw press (French Oil Mill Machinery Company, Piqua, Ohio) with core main barrel (or cage) had a diameter of 3.5 inches. The cage and shaft was preheated to between 180° F. and 260° F. by using indirect steam. The biomass oiled well with some footing. The spent biomass (which included the addition of dried switchgrass or soyhulls) was then collected and was suitable for use in the methods of the invention.

Example 5

Preparation of Spent Biomass from Oleaginous Yeast by Mechanical Extraction

Yeast strain *Rhodotorula glutinis* (DSMZ-DSM 70398) was obtained from the Deutsche Sammlung von Mikroorganismen and Zellkulturen GmbH (German Collection of Microorganism and Cell Culture, Inhoffenstraße 7B, 38124 Braunschweig, Germany. Cryopreserved cells were thawed and added to 50 mL YPD media (described above) with 1×DAS vitamin solution (1000×: 9 g/L tricine; 0.67 g/L thiamine-HCl; 0.01 g/L d-biotin; 0.008 cyannocobalamin; 0.02 calcium pantothenate; and 0.04 g/L p-Aminobenzoic acid) and grown at 30° C. with 200 rpm agitation for 18-24 hours until an OD reading was over 50D (A600). The culture was then transferred to 7-L fermentors and switched to YP1 medium (8.5 g/L Difco Yeast Nitrogen Base without Amino Acids and Ammonium Sulfate, 3 g/L Ammonium Sulfate, 4 g/L yeast extract) with 1×DAS vitamin solution. The cultures were sampled twice per day and assayed for OD (A600), dry cell weight (DCW) and lipid concentration. When the cultures reached over 50 g/L DCW, the cultures were harvested. Based on dry cell weight, the yeast biomass contained approximately 50% oil.

The harvested yeast broth was dried using three different methods for comparison: (1) tray dried in a forced air oven at 75° C. overnight; (2) dried on a drum dryer without concentration; and (3) the yeast broth was concentrated to 22% solids and the slurry was then dried on a drum dryer. Material from each of the three different drying conditions was heat conditioned and fed through a screw press for oil extraction. The press temperature was at 150° F. and the conditioned dried yeast biomass was held at about 190° F. until it was ready to be fed into the press.

The moisture content of the tray dried yeast was 1.45% and the dried yeast was then conditioned in an oven at 90° C. for 10 minutes. The moisture content after conditioning was 0.9%. The conditioned tray dried material was then fed into a bench-top Taby screw press (Taby Pressen Type 70 oil press with a 2.2 Hp motor and 70 mm screw diameter) for oil extraction. This material did not yield any significant amount of oil and heavy footing was observed with the press. In accordance with the methods of the invention, the biomass resulting from this failed extraction can be used as feedstock for pyrolysis.

The moisture content of the drum dried yeast broth without concentration was 5.4% and the drum dried yeast was then conditioned in an oven at 90° C. for 20 minutes. The moisture content after conditioning was 1.4%. The conditioned drum dried yeast was then fed into a bench-top Taby screw press for oil extraction. This material oiled well, with minimal footing.

The moisture content of the drum dried concentrated yeast broth was 2.1% and the drum dried concentrated yeast was then conditioned in an oven at 90° C. for 20 minutes. The moisture content after conditioning was 1.0%. The conditioned drum dried concentrated yeast was then fed into a bench-top Taby screw press for oil extraction. This material oiled well, with minimal footing, creating spent biomass suitable for use in the invention.

Example 6

Drying and Oil Extraction from Oleaginous Bacteria

Oleaginous bacteria strain *Rhodococcus opacus* PD630 (DSMZ-DSM 44193) was cultured according to the methods in Example 1 to produce oleaginous bacteria biomass with approximately 32% lipid by DCW.

The harvested *Rhodococcus opacus* broth was concentrated using centrifugation and then washed with deionized water and resuspended in 1.8 L of deionized water. 50 grams of purified cellulose (PB20-Pre-co-Floc, EP Minerals, Nevada) was added to the resuspended biomass and the total solids was adjusted with deionized water to 20%. The *Rhodococcus* biomass was then dried on a drum drier and the moisture content of the *Rhodococcus* after drum drying was approximately 3%.

The drum-dried material was then heat conditioned in an oven at 130° C. for 30 minutes with a resulting moisture content of approximately 1.2%. The heat conditioned biomass was then fed through a bench top Taby press (screw press) for oil extraction. The press temperature was at 209° F. and the conditioned dried bacterial biomass was held at about 240° F. until it was ready to be fed into the press.

Example 7

Analysis of Spent Biomass

Spent biomass from *Prototheca moriformis* (UTEX 1435) generated according to the methods described above was subjected to proximate analysis using standard AOAC methods. The results were: 4.21% moisture; 8.9% crude protein; 9.01% fat (by acid hydrolysis); 7.11% ash; and no detectable levels of non-protein nitrogen. The spent biomass was also subjected to amino acid profile analysis using standard methods. The normalized amino acid distribution was the following: methionine (3.19); cystine (2.64); lysine (1.81); phenylalanine (4.86); leucine (9.03); isoleucine (4.31); threonine (6.25); valine (5.97); histidine (1.67); arginine (5.00); glycine (5.83); aspartic acid (8.61); serine (7.08); glutamic acid (11.25); proline (6.11); hydroxyproline (3.61); alanine (8.75); tyrosine (3.33); and tryptophan (0.69).

Heat of combustion analysis was also performed on spent biomass from *Prototheca moriformis* (UTEX 1435) using standard methods. Btu/lb values were analyzed for the spent biomass under three conditions: as is, dried and air dried. The results are summarized below.

|  | As is | Dried | Air Dried |
|---|---|---|---|
| Btu/lb (HHV) | 7865 | 8253 | 7865 |
| Btu/lb (LLV) | 7241 | | |
| MMF Btu/lb | 8400 | 8845 | |
| MAF Btu/lb | | 8799 | |

Dried biomass from *Chlorella protothecoides* (UTEX 250) was subjected to a series of analytical analyses. Aqueous solution of 80% ethanol soluble extract determination of sugars by HPLC was included in the analytical analysis. Four different lots of dried biomass were analyzed and compared to sucrose, glucose and fructose standard. In all four lots, only sucrose was detected in the following percentages: 5.47%; 4.72%; 7.35%; and 4.86%.

Analysis of fiber content on dried biomass containing either 30-40% lipid by dry cell weight or 45-46% protein was performed using AOAC Methods 985.29 and 911.43. In the biomass containing 30-40% lipid by dry cell weight, 4.70-6.51% of insoluble fiber; 20.68%-32.02% soluble fiber; and 27.19-36.72% total dietary fiber was detected. In the biomass containing 45-46% protein, 22.73-23.44% insoluble fiber; 6.82-9.85% soluble fiber; and 30.26-32.57% total dietary fiber was detected. The dried biomass was then subjected to further monosaccharide analysis. The results from both acid soluble hydrolysates determination of sugars by gas chromatography of the biomass and determination of sugars by gas chromatography on the insoluble and soluble dietary samples from the biomass are summarized below. For the biomass samples, sugars were determined as alditol acetate derivatives and the monosaccharides were found in carbohydrate polymers present in the extracted material. In addition to the listed monosaccharides below in Table 7, a significant number of unidentified non-neutral sugars were detected.

TABLE 7

Determination of Sugars

| Sample | arabinose | xylose | mannose | galactose | glucose |
|---|---|---|---|---|---|
| Acid Soluble Hydrolysates Determination of Sugars by GC of the Algal Biomass | | | | | |
| lipid 1 | 8.8 | 13.5 | 38.1 | 20.8 | 18.6 |
| lipid 2 | 4.0 | 16.4 | 39.7 | 28.5 | 11.4 |
| protein 1 | 7.3 | 9.3 | 20.7 | 36.9 | 25.8 |
| protein 2 | 7.3 | 5.7 | 31.0 | 39.0 | 17.0 |
| Determination of Sugars by GC on Insoluble and Soluble Fiber Samples | | | | | |
| Insoluble | | | | | |
| lipid 1 | 5.1 | NA | NA | 76.7 | 18.2 |
| lipid 2 | 16.5 | 13.2 | 34.6 | 21.5 | 14.3 |
| protein 1 | 6.7 | 11.0 | 42.7 | 22.3 | 17.3 |
| protein 2 | 10.4 | 9.9 | 34.2 | 33.8 | 11.6 |
| Soluble | | | | | |
| lipid 1 | 4.5 | NA | 7.9 | 52.7 | 34.9 |
| lipid 2 | 3.2 | 3.7 | 36.1 | 18.5 | 38.5 |
| protein 1 | NA | NA | 48.5 | NA | 51.5 |
| protein 2 | 13.7 | NA | 17.6 | NA | 68.7 |

Defatted algal biomass from *Chlorella protothecoides* (UTEX 250) was subjected to 80% ethanol treatment and then analyzed for carbohydrate percentage. The results from this analysis are summarized below:

| Soluble Extract | | | |
|---|---|---|---|
| Sample | % Solids | Dried % | Carbohydrate % |
| Lipid 1 | 30.14 | 18.63 | 11.64 |
| Protein 1 | 36.88 | 22.40 | 13.53 |

Example 8

Pyrolysis of Biomass

Biomass prepared in accordance with any of the preceding examples is used to prepare pyrolysis oil as follows. Biomass and sand is mixed together in a reaction vessel. The ratio of sand and biomass is selected from about 1:1 to about 40:1 (sand:biomass). The reaction vessel is immersed briefly in a heating medium with high conductivity such as a sodium or sand bath. Upon immersion of the reaction vessel, the temperature of the reaction vessel containing the biomass is raised to pyrolysis temperatures of about 300° C. to 500° C. on the order of seconds, typically in less than one minute. The biomass is subjected to pyrolysis and vapor from the pyrolysis reaction is cooled using a water-condensation system, or a multiple staged condensation system to collect the pyrolysis products. The condensed liquid products is the pyrolysis oil that is produced.

Example 9

Methods for Transforming *Prototheca*

A. General Method for Biolistic transformation of *Prototheca*

S550d gold carriers from Seashell Technology were prepared according to the protocol from manufacturer. Linearized plasmid (20 μg) was mixed with 50 μl of binding buffer and 60 μl (30 mg) of S550d gold carriers and incubated in ice for 1 min. Precipitation buffer (100 μl) was added, and the mixture was incubated in ice for another 1 min. After vortexing, DNA-coated particles were pelleted by spinning at 10,000 rpm in an Eppendorf 5415C microfuge for 10 seconds. The gold pellet was washed once with 500 μl of cold 100% ethanol, pelleted by brief spinning in the microfuge, and resuspended with 50 μl of ice-cold ethanol. After a brief (1-2 sec) sonication, 10 μl of DNA-coated particles were immediately transferred to the carrier membrane.

*Prototheca* strains were grown in proteose medium (2 g/L yeast extract, 2.94 mM NaNO3, 0.17 mM CaCl2.2H2O, 0.3 mM MgSO4.7H2O, 0.4 mM K2HPO4, 1.28 mM KH2PO4, 0.43 mM NaCl) on a gyratory shaker until it reaches a cell density of $2 \times 10^6$ cells/ml. The cells were harvested, washed once with sterile distilled water, and resuspended in 50 μl of medium. $1 \times 10^7$ cells were spread in the center third of a non-selective proteose media plate. The cells were bombarded with the PDS-1000/He Biolistic Particle Delivery system (Bio-Rad). Rupture disks (1100 and 1350 psi) were used, and the plates are placed 9 and 12 cm below the screen/macrocarrier assembly. The cells were allowed to recover at 25° C. for 12-24 h. Upon recovery, the cells were scraped from the plates with a rubber spatula, mixed with 100 μl of medium and spread on plates containing the appropriate antibiotic selection. After 7-10 days of incubation at 25° C., colonies representing transformed cells were visible on the plates from 1100 and 1350 psi rupture discs and from 9 and 12 cm distances. Colonies were picked and spotted on selective agar plates for a second round of selection.

B. Transformation of *Prototheca* with G418 Resistance Gene

*Prototheca moriformis* and other *Prototheca* strains sensitive to G418 can be transformed using the methods described below. G418 is an aminoglycoside antibiotic that inhibits the function of 80 S ribosomes and thereby inhibits protein synthesis. The corresponding resistance gene fuctions through phosphorylation, resulting in inactivation of G418. *Prototheca* strains UTEX 1435, UTEX 1439 and UTEX 1437 were selected for transformation. All three *Prototheca* strains were genotyped using the methods described above. All three *Prototheca* strains had identical 23 s rRNA genomic sequences (SEQ ID NO:1). Any sequences not included herein can be found in WO 2010063032, which is hereby incorporated by reference in its entirety and specifically for its disclosure of sequences used in the genetic engineering of microbes.

All transformation cassettes were cloned as EcoRI-SacI fragments into pUC19. Standard molecular biology techniques were used in the construction of all vectors according to Sambrook and Russell, 2001. The *C. reinhardtii* beta-tubulin promoter/5'UTR was obtained from plasmid pHyg3 (Berthold et al., (2002) Protist: 153(4), pp 401-412) by PCR as an EcoRI-AscI fragment. The *Chlorella vulgaris* nitrate reductase 3'UTR was obtained from genomic DNA isolated from UTEX strain 1803 via PCR using the following primer pairs:

```
Forward:
                                        (SEQ ID NO: 2)
5'
TGACCTAGGTGATTAATTAACTCGAGGCAGCAGCAGCTCGGATAGTATCG
3'

Reverse:
                                        (SEQ ID NO: 3)
5' CTACGAGCTCAAGCTTTCCATTTGTGTTC CCATCCACTACTTCC
3'
```

The *Chlorella sorokiniana* glutamate dehydrogenase promoter/UTR was obtained via PCR of genomic DNA isolated from UTEX strain 1230 via PCR using the following primer pairs:

```
                                        (SEQ ID NO: 4)
Forward: 5' GATCAGAATTCCGCCTGCAACGCAAGG GCAGC 3'

(SEQ ID NO: 5)
Reverse: 5' GCATACTAGTGGCGGGACGGAGAGA GGGCG 3'
```

Codon optimization was based on the codons for *Prototheca moriformis*. See, e.g., Table 1 of PCT Publication No. WO 2010063032. The sequence of the non-codon optimized neomycin phosphotransferase (nptII) cassette was synthesized as an AscI-XhoI fragment and was based on upon the sequence of Genbank Accession No. YP 788126. The codon optimized nptII cassette was also based on this Genbank Accession number.

The three *Prototheca* strains were transformed using biolistic methods described above. Briefly, the *Prototheca* strains were grown heterophically in liquid medium containing 2% glucose until they reached the desired cell density ($1 \times 10^7$ cells/mL to $5 \times 10^7$ cells/mL). The cells were harvested, washed once with sterile distilled water and resuspended at $1 \times 10^8$ cells/mL. 0.5 mL of cells were then spread out on a non-selective solid media plate and allowed to dry in a sterile hood. The cells were bombarded with the PDS-1000/He Biolistic Particle Delivery System (BioRad). The cells were allowed to recover at 25° C. for 24 hours. Upon recovery, the cells were removed by washing plates with 1 mL of sterile media and transferring to fresh plates containing 100 μg/mL G418. Cells were allowed to dry in a sterile hood and colonies were allowed to form on the plate at room temperature for up to three weeks. Colonies of UTEX 1435, UTEX 1439 and UTEX 1437 were picked and spotted on selective agar plates for a second round of selection.

A subset of colonies that survived a second round of selection described above, were cultured in small volume and genomic DNA and RNA were extracted using standard molecular biology methods. Southern blots were done on genomic DNA extracted from untransformed (WT), the transformants and plasmid DNA. DNA from each sample was run on 0.8% agarose gels after the following treatments: undigested (U), digested with AvrII (A), digested with NcoI (N), digested with SacI (S). DNA from these gels was blotted on Nylon+membranes (Amersham). These membranes were probed with a fragment corresponding to the entire coding region of the nptII gene (NeoR probe). FIG. 4 of PCT Publication No. WO 2010063032 shows maps of the cassettes used in the transformations. FIG. 5 of PCT Publication No. WO 2010063032 shows the results of Southern blot analysis on three transformants (all generated in UTEX strain 1435) (1, 2, and 3) transformed with either the beta-tubulin::neo::nit (SEQ ID NO:6) (transformants 1 and 2) or glutamate dehydrogenase:neo:nit (SEQ ID NO:7) (transformant 3). The glutamate dehydrogenase:neo:nit transforming plasmid was run as a control and cut with both NcoI and SacI. AvrII does not cut in this plasmid. Genomic DNA isolated from untransformed UTEX strain 1435 shows no hybridization to the NeoR probe.

Additional transformants containing the codon-optimized glutamate dehydrogenase:neo:nit (SEQ ID NO:8) and codon-optimized β-tubulin::neo::nit (SEQ ID NO:9) constructs were picked and analyzed by Southern blot analysis. As expected, only digests with SacI show linearization of the transforming DNA. These transformation events are consistent with integration events that occur in the form of oligomers of the transforming plasmid. Only upon digestion with restriction enzymes that cut within the transforming plasmid DNA do these molecules collapse down the size of the transforming plasmid.

Southern blot analysis was also performed on transformants generated upon transformation of *Protheca* strains UTEX 1437 and UTEX 1439 with the glutamate dehydrogenase::neo::nit cassette. The blot was probed with the NeoR probe probe and the results are similar to the UTEX 1435 transformants. The results are indicative of integration events characterized by oligomerization and integration of the transforming plasmid. This type of integration event is known to occur quite commonly in *Dictyostelium discoideum* (see, for example, Kuspa, A. and Loomis, W. (1992) *PNAS*, 89:8803-8807 and Mario et al., (1995) *J. Plant Res.* 108:111-114).

To further confirm expression of the transforming plasmid, Northern blot analysis and RT-PCR analysis were performed on selected transformants. RNA extraction was performed using Trizol Reagent according to manufacturer's instructions. Northern blot analysis were run according to methods published in Sambrook and Russel, 2001. Total RNA (15 µg) isolated from five UTEX 1435 transformants and untransformed UTEX 1435 (control lanes) was separated on 1% agarose-formaldehyde gel and blotted on nylon membrane. The blot was hybridized to the neo-non-optimized probe specific for transgene sequences in transformants 1 and 3. The two other transformants RNAs express the codon-optimized version of the neo-transgene and, as expected, based on the sequence homology between the optimized and non-optimized neo genes, showed significantly lower hybridization signal.

RNA (1 µg) was extracted from untransformed *Prototheca* strain UTEX 1435 and two representative UTEX 1435 transformants and reverse transcribed using an oligio dT primer or a gene specific primer. Subsequently these cDNAs (in duplicate) were subjected to qPCR analysis on ABI Veriti Thermocycler using SYBR-Green qPCR chemistry using the following primers (nptII):

```
                                            (SEQ ID NO: 10)
         Forward: 5' GCCGCGACTGGCTGCTGCTGG 3'

(SEQ ID NO: 11)
         Reverse: 5' AGGTCCTCGCCGTCGGGCATG 3'
```

Possible genomic DNA contamination was ruled out by a no reverse transcriptase negative control sample. The results indicated that the NeoR genes used to transform these strains is actively transcribed in the transformants.

C. Transformation of *Prototheca* with Secreted Heterologous Sucrose Invertase

All of the following experiments were performed using liquid medium/agar plates based on the basal medium described in Ueno et al., (2002) *J Bioscience and Bioengineering* 94(2):160-65, with the addition of trace minerals described in U.S. Pat. Nos. 5,900,370, and 1×DAS Vitamin Cocktail (1000× solution): tricine: 9 g, thiamine HCL: 0.67 g, biotin: 0.01 g, cyannocobalamin (vitamin B12): 0.008 g, calcium pantothenate: 0.02 g and p-aminobenzoic acid: 0.04 g).

Two plasmid constructs were assembled using standard recombinant DNA techniques. The yeast sucrose invertase genes (one codon optimized and one non-codon optimized), suc2, were under the control of the *Chlorella reinhardtii* beta-tubulin promoter/5'UTR and had the *Chlorella vulgaris* nitrate reductase 3'UTR. The sequences (including the 5'UTR and 3'UTR sequences) for the non-codon optimized (Crβ-tub::NCO-suc2::CvNitRed) construct, SEQ ID NO:12, and codon optimized (Crβ-tub::CO-suc2::CvNitRed) construct, SEQ ID NO:13, are listed in the Sequence Listing. Codon optimization was based on Table 1 of PCT Publication No. WO 2010063032 for *Prototheca* sp. FIG. 6 of PCT Publication No. WO 2010063032 shows a schematic of the two constructs with the relevant restriction cloning sites and arrows indicating the direction of transcription. Selection was provided by Neo R (codon optimized using Table 1 of PCT Publication No. WO 2010063032).

Preparation of the DNA/gold microcarrier: DNA/gold microcarriers were prepared immediately before use and stored on ice until applied to macrocarriers. The plasmid DNA (in TE buffer) was added to 50 µl of binding buffer. Saturation of the gold beads was achieved at 15 µg plasmid DNA for 3 mg gold carrier. The binding buffer and DNA were mixed well via vortexing. The DNA and binding buffer should be pre-mix prior to gold addition to ensure uniformed plasmid binding to gold carrier particles. 60 µl of S550d (Seashell Technologies, San Diego, Calif.) gold carrier was added to the DNA/binding buffer mixture. For a gold stock at 50 mg/ml, addition of 60 µl results in an optimal ratio of 15 µg DNA/3 mg gold carrier. The gold carrier/DNA mixture was allowed to incubate on ice for 1 minute and then 100 µl of precipitation buffer was added. The mixture was allowed to incubate again on ice for 1 minute and then briefly vortexed and centrifuged at 10,000 rpm at room temperature for 10 seconds to pellet the gold carrier. The supernatant was carefully removed with a pipette and the pellet was washed with 500 µl of ice cold 100% ethanol. The gold particles were re-pelleted by centrifuging again at 10,000 rpm for 10 seconds. The ethanol was removed and 50 µl of ice cold ethanol was added to the gold mixture. Immediately prior to applying the gold to macrocarriers, the gold/ethanol was resuspended with a brief 1-2 second pulse at level 2 on a MISONIX sonicator using the micro tip. Immediately after resuspension, 10 µl of the dispersed gold particles was transferred to the macrocarrier and allowed to dry in a sterile hood.

The two *Prototheca moriformis* strains (UTEX 1435 and 1441) were grown heterotrophically in liquid medium containing 2% glucose from cryopreserved vials. Each strain was grown to a density of $10^7$ cells/ml. This seed culture was then diluted with fresh media to a density of $10^5$ cells/ml and allowed to grow for 12-15 hours to achieve a final cell density of approximately $10^6$ cells/ml. The microalgae were aliquoted into 50 ml conical tubes and centrifuged for 10 minutes at 3500 rpm. The cells were washed with fresh medium and centrifuged again for 10 minutes at 3500 rpm. The cells were then resuspended at a density of $1.25 \times 10^8$ cells/ml in fresh medium.

In a sterile hood, 0.4 ml of the above-prepared cells were removed and placed directly in the center of an agar plate (without selection agent). The plate was gently swirled with a level circular motion to evenly distribute the cells to a diameter of no more than 3 cm. The cells were allowed to dry onto the plates in the sterile hood for approximately 30-40 minutes and then were bombarded at a rupture disk pressure of 1350 psi and a plate to macrocarrier distance of 6 cm. The plates were then covered and wrapped with parafilm and allowed to incubate under low light for 24 hours.

After the 24 hour recovery, 1 ml of sterile medium (with no glucose) was added to the lawn of cells. The cells were resuspended using a sterile loop, applied in a circular motion to the lawn of cells and the resuspended cells were collected using a sterile pipette. The cells were then plated onto a fresh agar plate with 2% glucose and 100 µg/ml G418. The appearance of colonies occurred 7-12 days after plating. Individual colonies were picked and grown in selective medium with 2% glucose and 100 µg/ml G418. The wildtype (untransformed) and transgenic cells were then analyzed for successful introduction, integration and expression of the transgene.

Genomic DNA from transformed *Prototheca moriformis* UTEX 1435 and 1441 and their wildtype (untransformed) counterparts were isolated using standard methods. Briefly, the cells were centrifuged for 5 minutes at 14,000 rpm in a standard table top Eppendorf centrifuge (model 5418) and flash frozen prior to DNA extraction. Cell pellets were lysed by adding 200 uL of Lysis buffer (100 mM Tris HCl, pH 8.0, 1% Lauryl Sarcosine, 50 mM NaCl, 20 mM EDTA, 0.25 M sucrose, 0.5 mg/ml RNase A) for every 100-200 mg of cells (wet weight) and vortexing for 30-60 seconds. Cetyl trimethylammonium bromide (CTAB) and NaCl were brought to 1% and 1 M, respectively, and cell extracts were incubated at 60-65° C. for 10 minutes. Subsequently, extracts were clarified via centrifugation at 14,000 rpm for 10 minutes and the resulting supernatant was extracted with an equal volume of phenol/chloroform/isoamyl alcohol (25:24:1). Samples were then centrifuged for 5 minutes at 14,000 rpm and the aqueous phase removed. DNA was precipitated with 0.7 volumes of isopropanol. DNA was pelleted via centrifugation at 14,000 rpm for 10 minutes and washed twice with 80% ethanol, and once with ethanol. After drying, DNA was resuspended in 10 mM Tris HCl, pH 8.0 and DNA concentrations were determined by using PicoGreen fluorescence quantification assay (Molecular Probes).

RNA from transformed *Prototheca moriformis* UTEX 1435 and 1441 and their wildtype (untransformed) counterparts were isolated using standard methods. Briefly, the cells were centrifuged for 5 minutes at 14,000 rpm in a standard table top Eppendorf centrifuge (model 5418) and flash frozen before RNA extraction. Cell pellets were lysed by addition of 1 mL of Trizol reagent (Sigma) for every 100 mg of cells (wet weight) and by vortexing for 1-2 minutes. Samples were incubated at room temperature for 5 minutes and subsequently adjusted with 200 uL of chloroform per 1 mL of Trizol reagent. After extensive shaking, cells were incubated at room temperature for 15 minutes and then subjected to centrifugation at 14000 rpm for 15 minutes in a refrigerated table top microcentrifuge. RNA partitioning to the upper aqueous phase was removed and precipitated by addition of isopropanol (500 uL per 1 ml of Trizol reagent). RNA was collected by centrifugation for 10 minutes and the resulting pellet washed twice with 1 mL of 80% ethanol, dried, and resuspended in RNAse free water. RNA concentration was estimated by RiboGreen fluorescence quantification assay (Molecular Probes).

Expression of neomycin phophotransferase gene conferring G418 antibiotic resistance and yeast invertase was assayed in non-transformed *Prototheca moriformis* UTEX 1435 and 1441 and transformants T98 (UTEX 1435 transformant) and T97 (UTEX 1441 transformant) using reverse transcription quantitative PCR analysis (RT-qPCR). 20 ng total RNA (isolated as described above) was subjected to one step RT-qPCR analysis using iScript SYBR Green RT-PCR kit (BioRad Laboratories) and primer pairs targeting the neomycin resistance gene (forward primer 5'CCGCCGTGCTG-GACGTGGTG 3' and reverse primer 5' GGTG-GCGGGGTCCAGGGTGT 3'; SEQ ID NOs:14 and 15, respectively) and suc2 invertase transcripts (forward primer 5' CGGCCGGCGGCTCCTTCAAC 3' and reverse primer 5' GGCGCTCCCGTAGGTCGGGT 3'; SEQ ID NO:16 and 17, respectively). Endogenous beta-tubulin transcripts served as an internal positive control for PCR amplification and as a normalization reference to estimate relative transcript levels.

Both codon optimized and non-codon optimized constructs were transformed into UTEX 1435 and 1441 *Prototheca moriformis* cells as described above. Initially, transformants were obtained with both constructs and the presence of the transgene was verified by Southern blot analysis followed by RTPCR to confirm the presence of the DNA and mRNA from the transgene. For the Southern blot analysis, genomic DNA isolated as described above was electrophoresed on 0.7% agarose gels in 1×TAE buffer. Gels were processed as described in Sambrook et al. (Molecular Cloning; A Laboratory Manual, $2^{nd}$ Edition. Cold Spring Harbor Laboratory Press, 1989). Probes were prepared by random priming and hybridizations carried out as described in Sambrook et al. Transformants from both the codon optimized and the non-codon optimized constructs showed the presence of the invertase cassette, while the non-transformed control was negative. Invertase mRNA was also detected in transformants with both the codon optimized and non-codon optimized constructs.

To confirm that the transformants were expressing an active invertase protein, the transformants were plated on sucrose plates. The transformants containing the non-codon optimized cassette failed to grow on the sucrose containing plates, indicating that, while the gene and the mRNA encoding the SUC2 protein were present, the protein was either (1) not being translated, or (2) being translated, but not accumulating to levels sufficient to allow for growth on sucrose as the sole carbon source. The transformants with the codon optimized cassette grew on the sucrose containing plates. To assess the levels of invertase being expressed by these transformants, two clones (T98 and T97) were subjected to an invertase assay of whole cells scraped from solid medium and direct sampling and quantitation of sugars in the culture supernatants after 48 hours of growth in liquid medium containing 2% sucrose as the sole carbon source.

For the invertase assay, the cells (T98 and T97) were grown on plates containing 2% sucrose, scraped off and assayed for invertase activity. 10 µl of the scraped cells was mixed with 40 µl of 50 mM NaOAc pH 5.1. 12.5 µl of 0.5M sucrose was added to the cell mixture and incubated at 37° C. for 10-30 minutes. To stop the reaction, 75 µl of 0.2M $K_2HPO_4$ was added. To assay for glucose liberated, 500 µl of reconstituted reagent (glucose oxidase/peroxidase+o-Dianisidine) from Sigma (GAGO-20 assay kit) was added to each tube and incubated at 37° C. for 30 minutes. A glucose standard curve was also created at this time (range: 25 µg to 0.3 µg glucose). After incubation, 500 µl of 6N HCl was added to stop the reaction and to develop the color. The samples were read at 540 nm. The amount of glucose liberated was calculated from the glucose standard curve using the formula y=mx+c, where y is the 540 nm reading, and x is µg of glucose. Weight of glucose was converted to moles of glucose, and given the equimolar relationship between moles of sucrose hydrolyzed to moles of glucose generated, the data was expressed as nmoles of sucrose hydrolyzed per unit time. The assay showed that both T98 and T97 clones were able to hydrolyze sucrose, indicating that a functional sucrose invertase was being produced and secreted by the cells.

For the sugar analysis on liquid culture media after 48 hours of algal growth, T97 and T98 cells were grown in 2% sucrose containing medium for 48 hours and the culture media were processed for sugar analysis. Culture broths from each transformant (and negative non-transformed cell control) were centrifuged at 14,000 rpm for 5 minutes. The resulting supernatant was removed and subjected to HPLC/ELSD (evaporative light scattering detection). The amount of sugar in each sample was determined using external standards and liner regression analysis. The sucrose levels in the culture media of the transformants were very low (less than 1.2 g/L, and in most cases 0 g/L). In the negative controls, the sucrose levels remained high, at approximately 19 g/L after 48 hours of growth.

These results were consistant with the invertase activity results, and taken together, indicated that the codon optimized transformants, T97 and T98, secreted an active sucrose invertase that allowed the microalgae to utilize sucrose as the sole carbon source in contrast to (1) the non-codon optimized transformants and (2) the non-transformed wildtype microalgae, both of which could not utilize sucrose as the sole carbon source in the culture medium.

*Prototheca moriformis* strains, T98 and T97, expressing a functional, secreted sucrose invertase (SUC2) transgene were assayed for growth and lipid production using sucrose as the sole carbon source.

Wild type (untransformed), T98 and T97 strains were grown in growth media (as described above) containing either 4% glucose or 4% sucrose as the sole carbon source under heterotrophic conditions for approximately 6 days. Growth, as determined by A750 optical density readings were taken of all four samples every 24 hours and the dry cell weight of the cultures and lipid profiles were determined after the 6 days of growth. The optical density readings of the transgenic strains grown in both the glucose and sucrose conditions were comparable to the wildtype strains grown in the glucose conditions. These results indicate that the transgenic strains were able to grow on either glucose or sucrose as the sole carbon source at a rate equal to wildtype strains in glucose conditions. The non-transformed, wildtype strains did not grow in the sucrose-only condition.

The biomass for the wildtype strain grown on glucose and T98 strain grown on sucrose was analyzed for lipid profile. Lipid samples were prepared from dried biomass (lyophilized) using an Acid Hydrolysis System (Ankom Technology, NY) according to manufacturer's instructions. Lipid profile determinations were carried as described in Example 10. The lipid profile for the non-transformed *Prototheca moriformis* UTEX 1435 strain, grown on glucose as the sole carbon source and two colonial T98 strains (UTEX 1435 transformed with a sucrose invertase transgene), grown on sucrose as the sole carbon source, are disclosed in Table 8 (wildtype UTEX 1435 and T98 clone 8 and clone 11 below. C:19:0 lipid was used as an internal calibration control.

TABLE 8

Lipid profile of wildtype UTEX 1435 and UTEX 1435 clones with suc2 transgene.

| Name | wildtype (Area % - ISTD) | T98 clone 11 (Area % - ISTD) | T98 clone 8 (Area % - ISTD) |
| --- | --- | --- | --- |
| C 12:0 | 0.05 | 0.05 | 0.05 |
| C 14:0 | 1.66 | 1.51 | 1.48 |
| C 14:1 | 0.04 | nd | nd |
| C 15:0 | 0.05 | 0.05 | 0.04 |
| C 16:0 | 27.27 | 26.39 | 26.50 |
| C 16:1 | 0.86 | 0.80 | 0.84 |
| C 17:0 | 0.15 | 0.18 | 0.14 |
| C 17:1 | 0.05 | 0.07 | 0.05 |
| C 18:0 | 3.35 | 4.37 | 4.50 |
| C 18:1 | 53.05 | 54.48 | 54.50 |
| C 18:2 | 11.79 | 10.33 | 10.24 |
| C 19:0 (ISTD) | — | — | — |
| C 18:3 alpha | 0.90 | 0.84 | 0.81 |
| C 20:0 | 0.32 | 0.40 | 0.38 |
| C 20:1 | 0.10 | 0.13 | 0.12 |
| C 20:1 | 0.04 | 0.05 | 0.04 |
| C 22:0 | 0.12 | 0.16 | 0.12 |
| C 20:3 | 0.07 | 0.08 | 0.07 |
| C 24:0 | 0.12 | 0.11 | 0.10 | nd—denotes none detected

Oil extracted from wildtype *Prototheca moriformis* UTEX 1435 (via solvent extraction or using an expeller press (see methods in Example 44 above) was analyzed for carotenoids, chlorophyll, tocopherols, other sterols and tocotrienols. The results are summarized below in Table 9.

TABLE 9

Carotenoid, chlorophyll, tocopherol/sterols and tocotrienol analysis in oil extracted from *Prototheca moriformis* (UTEX 1435).

| | Pressed oil (mcg/ml) | Solvent extracted oil (mcg/ml) |
| --- | --- | --- |
| cis-Lutein | 0.041 | 0.042 |
| trans-Lutein | 0.140 | 0.112 |
| trans-Zeaxanthin | 0.045 | 0.039 |
| cis-Zeaxanthin | 0.007 | 0.013 |
| t-alpha-Crytoxanthin | 0.007 | 0.010 |
| t-beta-Crytoxanthin | 0.009 | 0.010 |
| t-alpha-Carotene | 0.003 | 0.001 |
| c-alpha-Carotene | none detected | none detected |
| t-beta-Carotene | 0.010 | 0.009 |
| 9-cis-beta-Carotene | 0.004 | 0.002 |
| Lycopene | none detected | none detected |
| Total Carotenoids | 0.267 | 0.238 |
| Chlorophyll | <0.01 mg/kg | <0.01 mg/kg |
| Tocopherols and Sterols | | |
| | Pressed oil (mg/100 g) | Solvent extracted oil (mg/100 g) |
| gamma Tocopherol | 0.49 | 0.49 |
| Campesterol | 6.09 | 6.05 |
| Stigmasterol | 47.6 | 47.8 |
| Beta-sitosterol | 11.6 | 11.5 |
| Other sterols | 445 | 446 |
| Tocotrienols | | |
| | Pressed oil (mg/g) | Solvent extracted oil (mg/g) |
| alpha Tocotrienol | 0.26 | 0.26 |
| beta Tocotrienol | <0.01 | <0.01 |
| gamma Tocotrienol | 0.10 | 0.10 |
| detal Tocotrienol | <0.01 | <0.01 |
| Total Tocotrienols | 0.36 | 0.36 |

The ability of using sucrose as the sole carbon source as the selection factor for clones containing the suc2 transgene construct instead of G418 (or another antibiotic) was assessed using the positive suc2 gene transformants. A subset of the positive transformants was grown on plates containing sucrose as the sole carbon source and without antibiotic selection for 24 doublings. The clones were then challenged with plates containing glucose as the sole carbon source and G418. There was a subset of clones that did not grow on the glucose+ G418 condition, indicating a loss of expression of the transgene. An additional experiment was performed using a plate containing sucrose as the sole carbon source and no G418 and streaking out a suc2 transgene expressing clone on one half of the plate and wild-type *Prototheca moriformis* on the other half of the plate. Growth was seen with both the wild-type and transgene-containing *Prototheca moriformis* cells. Wild-type *Prototheca moriformis* has not demonstrated the ability to grow on sucrose, therefore, this result shows that unlike antibiotic resistance, the use of sucrose/invertase selection is not cell-autonomous. It is very likely that the transformants were secreting enough sucrose invertase into the plate/media to support wildtype growth as the sucrose was hydrolyzed into fructose and glucose.

Example 10

Recombinant *Prototheca* with Exogenous TE Gene

As described above, *Protheca* strains can be transformed with exogenous genes. *Protheca moriformis* (UTEX 1435) was transformed, using methods described above, with either *Umbellularia californica* C12 thioesterase gene or *Cinnamomum camphora* C14 thiotesterase gene (both codon optimized according to Table 1 of PCT Publication No. WO 2010063032). Each of the transformation constructs contained a *Chlorella sorokiniana* glutamate dehydrogenase promoter/5'UTR region (SEQ ID NO:18) to drive expression of the thioesterase transgene. The thioesterase transgenes coding regions of *Umbellularia californica* C12 thioesterase (SEQ ID NO:19) or *Cinnamomum camphora* C14 thioesterase (SEQ ID NO:20), each with the native putative plastid targeting sequence. Immediately following the thioesterase coding sequence is the coding sequence for a c-terminal 3x-FLAG tag (SEQ ID NO:21), followed by the *Chlorella vulgaris* nitrate reductase 3'UTR (SEQ ID NO:22). A diagram of the thioesterase constructs that were used in the *Protheca moriformis* transformations is shown in FIG. 9 of PCT Publication No. WO 2010063032.

Preparation of the DNA, gold microcarrier and *Protheca moriformis* (UTEX 1435) cells were performed using the methods described above in Example 3. The microalgae were bombarded using the gold microcarrier—DNA mixture and plated on selection plates containing 2% glucose and 100 µg/ml G418. The colonies were allowed to develop for 7 to 12 days and colonies were picked from each transformation plate and screened for DNA construct incorporation using Southern blots assays and expression of the thioesterase constructs were screened using RT-PCR.

Positive clones were picked from both the C12 and C14 thioesterase transformation plates and screened for construct incorporation using Southern blot assays. Southern blot assays were carried out using standard methods (and described above in Example 3) using an optimized c probes, based on the sequence in SEQ ID NO:19 and SEQ ID NO:20. Transforming plasmid DNA was run as a positive control. Out of the clones that were positive for construct incorporation, a subset was selected for reverse transcription quantitative PCR (RT-qPCR) analysis for C12 thioesterase and C14 thioesterase expression.

RNA isolation was performed using methods described in Example 3 above and RT-qPCR of the positive clones were performed using 20 ng of total RNA from each clone using the below-described primer pair and iScript SYBR Green RT-PCR kit (Bio-Rad Laboratories) according to manufacturer's protocol. Wildtype (non-transformed) *Protheca moriformis* total RNA was included as a negative control. mRNA expression was expressed as relative fold expression (RFE) as compared to negative control. The primers that were used in the C12 thioesterase transformation RT-qPCR screening were:

*U. californica* C12 thioesterase PCR primers:

```
                                       (SEQ ID NO: 23)
        Forward: 5' CTGGGCGACGGCTTCGGCAC 3'

(SEQ ID NO: 24)
        Reverse: 5' AAGTCGCGGCGCATGCCGTT 3'
```

The primers that were used in the C14 thioesterase transformation RT-qPCR screening were:

*Cinnamomum camphora* C14 thioesterase PCR primers:

```
                                       (SEQ ID NO: 25)
        Forward: 5' TACCCCGCCTGGGGCGACAC 3'

(SEQ ID NO: 26)
        Reverse: 5' CTTGCTCAGGCGGCGGGTGC 3'
```

RT-qPCR results for C12 thioesterase expression in the positive clones showed an increased RFE of about 40 fold to over 2000 fold increased expression as compared to negative control. Similar results were seen with C14 thioesterase expression in the positive clones with an increase RFE of about 60-fold to over 1200 fold increased expression as compared to negative control.

A subset of the positive clones from each transformation (as screened by Southern blotting and RT-qPCR assays) were selected and grown under nitrogen-replete conditions and analyzed for total lipid production and profile. Lipid samples were prepared from dried biomass from each clone. 20-40 mg of dried biomass from each transgenic clone was resuspended in 2 mL of 3% $H_2SO_4$ in MeOH, and 200 ul of toluene containing an appropriate amount of a suitable internal standard (C19:0) was added. The mixture was sonicated briefly to disperse the biomass, then heated at 65-70° C. for two hours. 2 mL of heptane was added to extract the fatty acid methyl esters, followed by addition of 2 mL of 6% $K_2CO_3$ (aq) to neutralize the acid. The mixture was agitated vigorously, and a portion of the upper layer was transferred to a vial containing $Na_2SO_4$ (anhydrous) for gas chromatography analysis using standard FAME GC/FID (fatty acid methyl ester gas chromatography flame ionization detection) methods. Lipid profile (expressed as Area %) of the positive clones as compared to wildtype negative control are summarized in Tables 10 and 11 below. As shown in Table 10, the fold increase of C12 production in the C12 transformants ranged from about a 5-fold increase (clone C12-5) to over 11-fold increase (clone C12-1). Fold increase of C14 production in the C14 transformants ranged from about a 1.5 fold increase to about a 2.5 fold increase.

TABLE 10

Summary of total lipid profile of the *Protheca moriformis* C12 thioesterase transformants.

|  | Wildtype | C12-1 | C12-2 | C12-3 | C12-4 | C12-5 | C12-6 | C12-7 | C12-8 |
|---|---|---|---|---|---|---|---|---|---|
| C6:0 | 0.03 | nd | nd | nd | nd | nd | nd | nd | nd |
| C8:0 | 0.11 | 0.09 | nd | 0.11 | nd | nd | nd | nd | nd |
| C10:0 | nd | nd | nd | 0.01 | 0.01 | nd | nd | 0.01 | nd |
| C12:0 | 0.09 | 1.04 | 0.27 | 0.72 | 0.71 | 0.50 | 0.67 | 0.61 | 0.92 |
| C14:0 | 2.77 | 2.68 | 2.84 | 2.68 | 2.65 | 2.79 | 2.73 | 2.56 | 2.69 |
| C14:1 | 0.01 | nd | nd | 0.02 | nd | nd | nd | 0.01 | nd |
| C15:0 | 0.30 | 0.09 | 0.10 | 0.54 | 0.19 | 0.09 | 0.13 | 0.97 | 0.09 |
| C15:1 | 0.05 | nd | nd | 0.02 | nd | nd | nd | nd | nd |
| C16:0 | 24.13 | 23.12 | 24.06 | 22.91 | 22.85 | 23.61 | 23.14 | 21.90 | 23.18 |

TABLE 10-continued

Summary of total lipid profile of the *Prototheca moriformis* C12 thioesterase transformants.

|  | Wildtype | C12-1 | C12-2 | C12-3 | C12-4 | C12-5 | C12-6 | C12-7 | C12-8 |
|---|---|---|---|---|---|---|---|---|---|
| C16:1 | 0.57 | 0.62 | 0.10 | 0.52 | 0.69 | 0.63 | 0.69 | 0.49 | 0.63 |
| C17:0 | 0.47 | 0.24 | 0.27 | 1.02 | 0.36 | 0.17 | 0.26 | 2.21 | 0.19 |
| C17:1 | 0.08 | nd | 0.09 | 0.27 | 0.10 | 0.05 | 0.09 | 0.80 | 0.05 |
| C18:0 | nd | nd | 2.14 | 1.75 | 2 23 | 2.16 | 2.38 | 1.62 | 2.47 |
| C18:1 | 22.10 | 23.15 | 24.61 | 21.90 | 23.52 | 19.30 | 22.95 | 20.22 | 22.85 |
| C18:1 | nd | 0.33 | 0.24 | nd | nd | 0.09 | 0.09 | nd | 0.11 |
| C18:2 | 37.16 | 34.71 | 35.29 | 35.44 | 35.24 | 36.29 | 35.54 | 36.01 | 35.31 |
| C18:3 alpha | 11.68 | 11.29 | 9.26 | 11.62 | 10.76 | 13.61 | 10.64 | 11.97 | 10.81 |
| C20:0 | 0.15 | 0.16 | 0.19 | 0.16 | 0.16 | 0.14 | 0.18 | 0.14 | 0.18 |
| C20:1 | 0.22 | 0.17 | 0.19 | 0.20 | 0.21 | 0.19 | 0.21 | 0.20 | 0.21 |
| C20:2 | 0.05 | nd | 0.04 | 0.05 | 0.05 | 0.05 | 0.04 | 0.05 | 0.04 |
| C22:0 | nd | nd | nd | 0.01 | nd | nd | nd | 0.02 | nd |
| C22:1 | nd | nd | nd | nd | nd | 0.01 | nd | 0.01 | nd |
| C20:3 | 0.05 | nd | 0.07 | 0.06 | 0.06 | 0.10 | 0.07 | 0.05 | 0.06 |
| C20:4 | nd | nd | nd | nd | nd | 0.02 | nd | nd | nd |
| C24:0 | nd | nd | 0.24 | 0.01 | 0.20 | 0.19 | 0.19 | 0.14 | 0.20 |

TABLE 11

Summary of total lipid profile of the *Prototheca moriformis* C14 thioesterase transformants.

|  | Wildtype | C14-1 | C14-2 | C14-3 | C14-4 | C14-5 | C14-6 | C14-7 |
|---|---|---|---|---|---|---|---|---|
| C6:0 | 0.03 | nd | nd | nd | nd | nd | nd | nd |
| C8:0 | 0.11 | nd | nd | nd | nd | nd | nd | nd |
| C10:0 | nd | 0.01 | nd | 0.01 | nd | 0.01 | nd | nd |
| C12:0 | 0.09 | 0.20 | 0.16 | 0.25 | 0.21 | 0.19 | 0.40 | 0.17 |
| C14:0 | 2.77 | 4.31 | 4.76 | 4.94 | 4.66 | 4.30 | 6.75 | 4.02 |
| C14:1 | 0.01 | nd | 0.01 | nd | nd | 0.01 | nd | nd |
| C15:0 | 0.30 | 0.43 | 0.45 | 0.12 | 0.09 | 0.67 | 0.10 | 0.33 |
| C15:1 | 0.05 | nd | nd | nd | nd | nd | nd | nd |
| C16:0 | 24.13 | 22.85 | 23.20 | 23.83 | 23.84 | 23.48 | 24.04 | 23.34 |
| C16:1 | 0.57 | 0.65 | 0.61 | 0.60 | 0.60 | 0.47 | 0.56 | 0.67 |
| C17:0 | 0.47 | 0.77 | 0.76 | 0.21 | 0.19 | 1.11 | 0.18 | 0.54 |
| C17:1 | 0.08 | 0.23 | 0.15 | 0.06 | 0.05 | 0.24 | 0.05 | 0.12 |
| C18:0 | nd | 1.96 | 1.46 | 2.48 | 2.34 | 1.84 | 2.50 | 2.06 |
| C18:1 | 22.10 | 22.25 | 19.92 | 22.36 | 20.57 | 19.50 | 20.63 | 22.03 |
| C18:1 | nd | nd | nd | nd | nd | nd | 0.10 | nd |
| C18:2 | 37.16 | 34.97 | 36.11 | 34.35 | 35.70 | 35.49 | 34.03 | 35.60 |
| C18:3 alpha | 11.68 | 10.71 | 12.00 | 10.15 | 11.03 | 12.08 | 9.98 | 10.47 |
| C20:0 | 0.15 | 0.16 | 0.19 | 0.17 | 0.17 | 0.14 | 0.18 | 0.16 |
| C20:1 | 0.22 | 0.20 | 0.12 | .019 | 0.19 | 0.19 | 0.17 | 0.20 |
| C20:2 | 0.05 | 0.04 | 0.02 | 0.03 | 0.04 | 0.05 | 0.03 | 0.04 |
| C22:0 | nd | nd | nd | nd | 0.02 | 0.01 | nd | nd |
| C22:1 | nd | 0.01 | nd | nd | nd | nd | nd | 0.01 |
| C20:3 | 0.05 | 0.08 | 0.03 | 0.06 | 0.09 | 0.05 | 0.05 | 0.07 |
| C20:4 | nd | 0.01 | nd | nd | nd | nd | 0.02 | nd |
| C24:0 | nd | 0.17 | 0.14 | 0.19 | 0.20 | 0.16 | 0.22 | 0.17 |

The above-described experiments indicate the successful transformation of *Prototheca moriformis* (UTEX 1435) with transgene constructs of two different thioesterases (C12 and C14), which involved not only the successful expression of the transgene, but also the correct targeting of the expressed protein to the plastid and a functional effect (the expected change in lipid profile) as a result of the transformation. The same transformation experiment was performed using an expression construct containing a codon-optimized (according to Table 1) *Cuphea hookeriana* C8-10 thioesterase coding region with the native plastid targeting sequence (SEQ ID NO:27) yielded no change in lipid profile. While the introduction of the *Cuphea hookeriana* C8-10 transgene into *Prototheca moriformis* (UTEX 1435) was successful and confirmed by Southern blot analysis, no change in C8 or C10 fatty acid production was detected in the transformants compared to the wildtype strain.

Example 11

Non-Torrefied Burnable Fuel Composition in the Form of a Firelog with Crackling Agents Illustrative firelogs are prepared using 48 wt % of an oak sawdust characterized by a typical particle size of 500 microns and using a binder of 52 weight % of a wax blend consisting of 70% Bareco RP1003 footes oil and 30% Astor 5030 log wax. The firelog is extruded to have an overall substantially square cross section, with dimensions of 3.625"×3.625", a weight of 5 lbs., and a length of 10.625", with 4 rectangular-shaped notches placed in the middle of each face. To this firelog compositional base material is added one of the following crackling additives: (1) 3 weight % of #1 grade Canadian mustard seed, (2) 2 weight % of hollow ceramic spheres (Z-LIGHT W-1800), (3) 3 weight % sesame seeds, (4) 3 weight % flax, and (5) 3 weight % cumin. Comparative firelogs are prepared using the following seeds: (1) 3 weight % sunflower; and (2) 3 weight % white millet. These comparative logs demonstrate that not all seeds provide an audible characteristic when added to an artificial firelog composed of saw dust and wax binders.

Each firelog is burned in a Majestic MBU36 fireplace under substantially the same burning conditions in this UL listed fireplace. The test analyst makes observations for each firelog and the firelog is rated on a scale of sounds observed as an indication of the crackling quality of the additive. In addition, observations are made on the integrity during the burn, magnitude of the physical popping parameter and the length of time of the audible sensation for each of the firelogs.

It is understood that the examples and embodiments described herein are for illustrative purposes only and that various modifications or changes in light thereof will be suggested to persons skilled in the art and are to be included within the spirit and purview of this application and scope of the appended claims.

```
                            SEQUENCE LISTING

SEQ ID NO: 1 (SEQ ID NO: 15 WO 2010063032)
UTEX 1439, UTEX 1441, UTEX 1435, UTEX 1437 Prototheca moriformis
TGTTGAAGAATGAGCCGGCGACTTAAAATAAATGGCAGGCTAAGAGAATTAATAACTCGAAA
CCTAAGCGAAAGCAAGTCTTAATAGGGCGCTAATTTAACAAAACATTAAATAAAATCTAAAG
TCATTTATTTTAGACCCGAACCTGAGTGATCTAACCATGGTCAGGATGAAACTTGGGTGACAC
CAAGTGGAAGTCCGAACCGACCGATGTTGAAAAATCGGCGGATGAACTGTGGTTAGTGGTGA
AATACCAGTCGAACTCAGAGCTAGCTGGTTCTCCCCGAAATGCGTTGAGGCGCAGCAATATAT
CTCGTCTATCTAGGGGTAAAGCACTGTTTCGGTGCGGGCTATGAAAATGGTACCAAATCGTGG
CAAACTCTGAATACTAGAAATGACGATATATTAGTGAGACTATGGGGGATAAGCTCCATAGTC
GAGAGGGAAACAGCCCAGACCACCAGTTAAGGCCCCAAAATGATAATGAAGTGGTAAAGGA
GGTGAAAATGCAAATACAACCAGGAGGTTGGCTTAGAAGCAGCCATCCTTTAAAGAGTGCGT
AATAGCTCACTG SEQ ID NO: 2 (SEQ ID NO: 35 WO 2010063032)
TGACCTAGGTGATTAATTAACTCGAGGCAGCAGCAGCTCGGATAGTATCG SEQ ID NO: 3 (SEQ ID NO: 36 WO 2010063032)
CTACGAGCTCAAGCTTTCCATTTGTGTTCCCATCCCACTACTTCC

SEQ ID NO: 4 (SEQ ID NO: 37 WO 2010063032)
GATCAGAATTCCGCCTGCAACGCAAGGGCAGC

SEQ ID NO: 5 (SEQ ID NO: 38 WO 2010063032)
GCATACTAGTGGCGGGACGGAGAGAGGGCG

SEQ ID NO: 6 (SEQ ID NO: 39 WO 2010063032)
Beta-tubulin::neo::nit
gaattcctttcttgcgctatgacacttccagcaaaaggtagggcgggctgcgagacggcttccggcgctgcatgcaacaccgatgatgcttcgacccccc
gaagctccttcggggctgcatgggcgctccgatgccgctccagggcgagcgctgtttaaatagccaggccccgattgcaaagacattatagcgagctac
caaagccatattcaaacacctagatcactaccacttctacacaggccactcgagcttgtgatcgcactccgctaaggggcgcctcttcctcttcgtttcag
tcacaacccgcaaacggcgcgccatatcaatgattgaacaagatggattgcacgcaggttctccggccgcttgggtggagaggctattcggctatgactggg
cacaacagacaatcggctgactgatgccgccgtgttccggctgtcagcgcagggcgcccggttctttttgtcaagaccgacctgtccggtgccctgaatg
aactgcaggacgaggcagcgcggctatcgtggctggccacgacgggcgttccttgcgcagtgtgctcgacgttgtcactgaagcgggaagggactgg
ctgctattgggcgaagtgccgggcaggatctcctgtcatctccaccttgctcctgccgagaaagtatccatcatggctgatgcaatgcggcggctgcatacg
cttgatccggctacctgcccattcgaccaccaagcgaaacatcgcatcggcgagcacgtactcggatggaagccggtcttgtcgatcaggatgatctgga
cgaagagcatcagggggctcgcgccagccgaactgttcgccaggctcaaggcgcgcatgcccgacggcgaggatctcgtcgtgacccatggcgatgcct
gcttgccgaatatcatggtggaaaatggccgcttttctggattcatcgactgtggccggctgggtgtggcggaccgctatcaggacatagcgttggctaccc
gtgatattgctgaagagttggcgaatgggctgaccgcttcctcgtgtttacggtatcgccgctcccgattcgcagcgcatcgccttctatcgccttctt
gacgagttcttctaagatctgtcgatcgacaagtgactcgaggcagcagcagctcggatagtatcgacacactctggacgctggtcgtgtgatggactgttg
ccgccacacttgctgccttgacctgtgaatatccctgccgcttttatcaaacagcctcagtgtgtttgatcttgtgtgtacgcgctttgcgagttgctagc
tgcttgtgctatttgcgaataccaccccagcatccccttccctcgtttcatatcgcttgcatcccaaccgcaacttatctcagctgtcctgctatccctca
gcgctgctcctgctcctgctcactgcccctcgcacagccttggtttgggctccgcctgtattctcctggtactgcaacctgtaaaccagcactgcaatgctg
atgcacgggaagtagtgggatgggaacacaaatggaaagcttgagctc SEQ ID NO: 7 (SEQ ID NO: 40 WO 2010063032)
Glutamate dehydrogenase::neo::nit
gaattccgcctgcaacgcaagggcagccacagccgctcccaccgccgctgaaccgacacgtgcttgggcgcctgccgcctgcctgccgcatgcttgt
gctggtgaggctgggcagtgctgccatgctgattgaggcttggttcatcgggtggaagcttatgtgtgtgctgggcttgcatgccgggcaatgcgcatggtg
gcaagagggcggcagcacttgctggacgtgccgcggtgcctccaggtggttcaatcgcggcagccagagggatttcagatgatcgcgcgtacaggttga
gcagcagtgtcagcaaaggtagcagtttgccagaatgatcggttcagctgttaatcaatgccagcaagagaagggtcaagtgcaaacacgggcatgcca
cagcacgggcaccggggagtggaatggcaccaccaagtgtgtgcgagccagcatcgccgcctggctgtttcagctacaacggcaggagtcatccaacta
accatagctgatcaacactgcaatcatcggccgctgatgcaagcatcctgcaagacatcgctgcgatgctgcgctgctgcgcacgccgttg
agttggcagcagctcagccatgcactggatcaggctgggctgccactgcaatgtggtggataggatgcaagtggagcgaataccaaaccctctggctgctt
gctgggttgcatggcatcgcaccatcagcaggagcgcatgcgaagggactggccccatgcacgccatgccaaaccggagcgcaccgagtgtccacact
gtcaccaggcccgcaagctttgcagaaccatgctcatggacgcatgtagcgctgacgtcccttgacggcgctcctctcgggtgtgggaaacgcaatgcag
cacaggcagcagaggcggcggcagcagagcggcggcagcagcggcgggggccacccttcttgcggggtcgcgccccagccagcggtgatgcgctg
atcnnnccaaacgagttcacattcatttgcagcctggagaagcgaggctggggccttttgggctggtgcagcccgcaatggaatgcgggaccgccaggct
agcagcaaaggcgcctcccctactccgcatcgatgttccatagtgcattggactgcatttgggtggggcggcggctgtttctttcgtgttgcaaaacgcgc
cacgtcagcaacctgtcccgtgggtcccccgtgccgatgaaatcgtgtgcacgccgatcagctgattgcccggctcgcgaagtaggcgccctctttctgctc
gccctctctccgtcccgccactagtggcgcgccatatcaatgattgaacaagatggattgcacgcaggttctccggccgcttgggtggagaggctattcggc
tatgactgggcacaacagacaatcggctgctctgatgccgccgtgttccggctgtcagcgcagggcgcccggttctttttgtcaagaccgaccgacctgtc
cggtgccctgaatgaactgcaggacgaggcagcgcggctatcgtggctggccacgacgggcgttccttgcgcagctgtgctcgacgttgtcactgaagcggg
```

SEQUENCE LISTING aagggactggctgctattgggcgaagtgccggggcaggatctcctgtcatctcacccttgctcctgccgagaaagtatccatcatggctgatgcaatgcggcg
gctgcatacgcttgatccggctacctgcccattcgaccaccaagcgaaacatcgcatcgagcgagcacgtactcggatggaagccggtcttgtcgatcagg
atgatctggacgaagagcatcagggcgtcgcgccagccgaactgttcgccaggctcaaggcgcgcatgcccgacggcgaggatctcgtcgtgacccat
ggcgatgcctgcttgccgaatatcatggtggaaaatggccgcttttctggattcatcgactgtggccggctgggtgtgcggaccgctatcaggacatagcg
ttggctaccgtgatattgctgaagagcttggcggcgaatgggctgaccgcttcctcgtgctttacggtatcgccgctcccgattcgcagcgcatcgccttc
tatcgccttcttgacgagttcttctaagatctgtcgatcgacaagtgactcgaggcagcagcagctcggatagtatcgacacactctggacgctggtcgtgt
gatggactgttgccgccacacttgctgccttgacctgtgaatatccctgccgcttttatcaaacagcctcagtgtgtttgatcttgtgtgtacgcgcttttg
cgagttgctagctgcttgtgctatttgcgaataccaccccccagcatccccttccctcgtttcatatcgcttgcatcccaaccgcaacttatctacgctgcc
tgctatccctcagcgctgctcctgctcctgctcactgcccctcgcacagccttggtttgggctccgcctgtattctcctggtactgcaacctgtaaaccagc
actgcaatgctgatgcacgggaagtagtgggatgggaacacaaatggaaagcttgagctc

SEQ ID NO: 8 (SEQ ID NO: 41 WO 2010063032)
Glutamate dehydrogenase::neo-opt::nit
gaattccgcctgcaacgcaagggcagccacagccggctcccacccgccgctgaaccgacacgtgcttgggcgcctgccgcctgcctgccgcatgcttg
gctggtgaggctgggcagtgctgccatgctgattgaggcttggttcatcgggtggaagcttatgtgtgtgctgggcttgcatgccgggcaatgcgcatggtg
gcaagagggcggcagcacttgctggacgtgccgcggtgcctccaggtggttcaatcgcggcagcagagggatttcagatgatcgcgcgtacaggttga
gcagcagtgtcagcaaaggtagcagtttgccagaatgatcggttcagtctgttaatcaatgccagcaagagaagggtcaagtgcaaacacgggcatgcca
cagcacgggcaccggggagtggaatggcaccaccaagtgtgtgcgagccagcatcgccgcctggctgtttcagctacaacggcaggagtcatccaacta
accatagctgatcaacactgcaatcatcggcggctgatgcaagcatcctgcaagacacatgctgtgcgatgctgcgctgctgcctgctgcgcacgccgttg
agttggcagcagctcagccatgcactggatcaggctgggctgccactgcaatgtggtaggatgcaagtggagcgaataccaaaccctctggctgctt
gctgggttgcatggcatcgcaccatcagcaggcgcgcatgcgaaggggactggccccatgcacgccatgccaaaccggagcgcaccgagtgtccacact
gtcaccaggcccgcaagctttgcagaaccatgctcatggacgcatgagcgctgacgtccctgacggcgctcctctcgggtgtgggaaacgcaatgcag
cacaggcagcagaggcggcggcagcagagcggcggcagcagcggcgggggccacccttcttgcggggtcgcgccccagccagcggtgatgcgctg
atcnnnccaaacgagttcacattcatttgcagcctggagaagcgaggctggggcctttgggctggtgcagcccgcaatggaatgcgggaccgccaggct
agcagcaaaggcgcctcccctactccgcatcgatgttccatagtgcattggactgcatttggtgggtggggcggccggctgtttcttcgtgttgcaaaacgcgc
cacgtcagcaacctgtcccgtgggtccccgtgccgatgaaatcgtgtgcacgccgatcagctgattgcccggctcgcgaagtaggcgccctcttctgctc
gccctctcgtcccgccactagtggcgcgccatatca*atgatcgagcaggacggcctccacgccggctcccccgccgctgggtggagcgcctgttc*
*ggctacgactgggcccagcagaccatcggctgctccgacgcgccgtgttccgcctgtccgcccagggccgcccctgctgttcgtgaacaccgacctg*
*tccggcgccctgaacgagctgcaggacgaggccgcccgcctgtcctggctggccaccaccggcgtgccctgccgccgtgctggacgtggtgaccg*
*aggccggccgcgactgctgctgctgggcgaggtgccggccaggacctgctgtcctcccacctggccccgccgagaaggtgtccatcatggccgac*
*gccatgcgccgcctgcacaccctggaccccgccacctgccccttcgaccaccaggccaagcaccgcatcgagcgcgcccacccgcatggaggccg*
*gcctggtggaccaggacgacctggacgaggagcaccagggcctgccccgcgagctgttcgcccgcctgaaggcccgcatgcccgacggcgaggagg*
*acctggtggtgaccacgcgacgcctgcctgcccaacatcatggtggagaacgccgcttctccggcttcatcgactgcggccgctgggcgtggccgaccgctggccg*
*accgctaccaggacatcgccctggccaccccgacatcgccgaggagctgggcggcgagtgggccgaccgcttcctggtgctgtacggcatcgccgcc*
*cccgactcccagcgcatcgccttctaccgcctgctggacgagttcttctga*ctcgaggcagcagcagctcggatagtatcgacacactctggacgctggtc
gtgtgatggactgttgccgccacacttgctgccttgacctgtgaatatccctgccgcttttatcaaacagcctcagtgtgtttcatcttgtgtgtacgcgct
tttgcgagttgctagctgcttgtgctatttgcgaataccaccccccagcatccccttccctcgtttcatatcgcttgcatcccaaccgcaacttatctacgct
gtcctgctatccctcagcgctgctcctgctcctgctcactgcccctcgcacagccttggtttgggctccgcctgtattctcctggtactgcaacctgtaaac
cagcactgcaatgctgatgcacgggaagtagtgggatgggaacacaaatggaaagcttgagctc

SEQ ID NO: 9 (SEQ ID NO: 42 WO 2010063032)
Beta-tubulin::neo-opt::nit
gaattcctttcttgcgctatgacacttccagcaaaaggtagggcgggctgcgagacggcttcccggcgctgcatgcaacaccgatgatgcttcgaccccc
gaagctccttcggggctgcatgggcgctccgatgccgctccagggcgagcgctgtttaaatagccaggcccccgattgcaaagacattatagcgagctac
caaagccatattcaaacaccctagatcactaccacttctacacaggccactcgagcttgtgatcgcactccgctaagggggcgcctcttcctcttcgtttcag
tcacaacccgcaaacggcgcgccatatca*atgatcgagcaggacggcctccacgccggctcccccgccgctgggtggagcgcctgttcggctacgactg*
*ggcccagcagaccatcggctgctccgacgcgccgtgttccgcctgtccgcccagggccgcccgtgctgttcgtgaagaccgacctgtccggcgccct*
*gaacgagctgcaggacgaggccgcccgcctgtcctggctggccaccaccggcgtgccctgccgccgtgctggacgtggtgaccgaggccggccg*
*cgactgctgctgctgggcgaggtgccgccaggacctgctgtcctcccacctggccccgccgagaaggtgtccatcatggccgacgccatgcgcc*
*gcctgcacaccctggaccccgccacctgccccttcgaccaccaggccaagcaccgcatcgagcgcgcccacccgcatggaggccggcctggtgga*
*ccaggacgacctggacgaggagcaccagggcctgccccgcgagctgttcgcccgcctgaaggcccgcatgcccgacggcgaggacctggtggt*
*gacccacggcgacgcctgcctgcccaacatcatggtggagaacgccgcttctccggcttcatcgactgcggccgctgggcgtggccgaccgctacca*
*ggacatcgccctggccaccccgacatcgccgaggagctgggcggcgagtgggccgaccgcttcctggtgctgtacggcatcgccgccccccgactccc*
*agcgcatcgccttctaccgcctgctggacgagttcttctga*ctcgaggcagcagcagctcggatagtatcgacacactctggacgctggtcgtgtgatgga
ctgttgccgccacacttgctgccttgacctgtgaatatccctgccgcttttatcaaacagcctcagtgtgtttgatcttgtgtgtacgcgcttttgcgagtt
gctagctgcttgtgctatttgcgaataccaccccccagcatccccttccctcgtttcatatcgcttgcatcccaaccgcaacttatctacgctgtcctgctat
ccctcagcgctgctcctgctcctgctcactgcccctcgcacagccttggtttgggctccgcctgtattctcctggtactgcaacctgtaaaccagcactgca
atgctgatgcacgggaagtagtgggatgggaacacaaatggaaagcttgagctc

SEQ ID NO: 10 (SEQ ID NO: 43 WO 2010063032)
GCCGCGACTGGCTGCTGCTGG

SEQ ID NO: 11 (SEQ ID NO: 44 WO 2010063032)
AGGTCCTCGCCGTCGGGCATGC

SEQ ID NO: 12 (SEQ ID NO: 57 WO 2010063032)
Crβ-tub::NCO-suc2::CvNitRed
CTTTCTTGCGCTATGACACTTCCAGCAAAAGGTAGGGCGGGCTGCGAGACGGCTTCCCGGCGC
TGCATGCAACACCGATGATGCTTCGACCCCCGAAGCTCCTTCGGGGCTGCATGGGCGCTCCG
ATGCCGCTCCAGGGCGAGCGCTGTTTAAATAGCCAGGCCCCCGATTGCAAAGACATTATAGCG
AGCTACCAAAGCCATATTCAAACACCTAGATCACTACCACTTCTACACAGGCCACTCGAGCTT
GTGATCGCACTCCGCTAAGGGGGCGCCTCTTCCTCTTCGTTTCAGTCACAACCCGCAAACGGC
GCGCCATATCA<u>ATG</u>CTTCTTCAGGCCTTTCTTTTTCTTCTTGCTGGTTTTGCTGCCAAGATCAGC
GCCTCTATGACGAACGAAACCTCGGATAGACCACTTGTGCACTTTACACCAAACAAGGGCTGG
ATGAATGACCCCAATGGACTGTGGTACGACGAAAAAGATGCCAAGTGGCATCTGTACTTTCA
ATACAACCCGAACGATACTGTCTGGGGACGCCATTGTTTTGGGGCCACGCCACGTCCGACGA
CCTGACCAATTGGGAGGACCAACCAATAGCTATCGCTCCGAAGAGGAACGACTCCGGAGCAT

```
TCTCGGGTTCCATGGTGGTTGACTACAACAATACTTCCGGCTTTTTCAACGATACCATTGACCC
GAGACAACGCTGCGTGGCCATATGGACTTACAACACACCGGAGTCCGAGGAGCAGTACATCT
CGTATAGCCTGGACGGTGGATACACTTTTACAGAGTATCAGAAGAACCCTGTGCTTGCTGCAA
ATTCGACTCAGTTCCGAGATCCGAAGGTCTTTTGGTACGAGCCCTCGCAGAAGTGGATCATGA
CAGCGGCAAAGTCACAGGACTACAAGATCGAAATTTACTCGTCTGACGACCTTAAATCCTGGA
AGCTCGAATCCGCGTTCGCAAACGAGGGCTTTCTCGGCTACCAATACGAATGCCCAGGCCTGA
TAGAGGTCCCAACAGAGCAAGATCCCAGCAAGTCCTACTGGGTGATGTTTATTTCCATTAATC
CAGGAGCACCGGCAGGAGGTTCTTTTAATCAGTACTTCGTCGGAAGCTTTAACGGAACTCATT
TCGAGGCATTTGATAACCAATCAAGAGTAGTTGATTTTGGAAAGGACTACTATGCCCTGCAGA
CTTTCTTCAATACTGACCCGACCTATGGGAGCGCTCTTGGCATTGCGTGGGCTTCTAACTGGGA
GTATTCCGCATTCGTTCCTACAAACCCTTGGAGGTCCTCCATGTCGCTCGTGAGGAAATTCT
CTCAACACTGAGTACCAGGCCAACCCGGAAACCGAACTCATAAACCTGAAAGCCGAACCGAT
CCTGAACATTAGCAACGCTGGCCCTGGAGCCGGTTTGCAACCAACACCACGTTGACGAAAG
CCAACAGCTACAACGTCGATCTTTCGAATAGCACCGGTACACTTGAATTTGAACTGGTGTATG
CCGTCAATACCACCCAAACGATCTCGAAGTCGGTGTTCGCGGACCTCTCCCTCTGGTTTAAAG
GCCTGGAAGACCCCGAGGAGTACCTCAGAATGGGTTTCGAGGTTTCTGCGTCCTCCTTCTTCCT
TGATCGCGGAACAGCAAAGTAAAATTTGTTAAGGAGAACCCATATTTTACCAACAGGATGA
GCGTTAACAACCAACCATTCAAGAGCGAAAACGACCTGTCGTACTACAAAGTGTATGGTTTGC
TTGATCAAAATATCCTGGAACTCTACTTCAACGATGGTGATGTCGTGTCCACCAACACATACT
TCATGCAACCGGGAACGCACTGGGCTCCGTGAACATGACGACGGGGTGTGGATAACCTGTTCT
ACATCGACAAATTCCAGGTGAGGGAAGTCAAG<u>TGA</u>GATCTGTCGATCGACAAGCTCGAGGCA
GCAGCAGCTCGGATAGTATCGACACACTCTGGACGCTGGTCGTGTGATGGACTGTTGCCGCCA
CACTTGCTGCCTTGACCTGTGAATATCCCTGCCGCTTTTATCAAACAGCCTCAGTGTGTTTGAT
CTTGTGTGTACGCGCTTTTGCGAGTTGCTAGCTGCTTGTGCTATTTGCGAATACCACCCCCAGC
ATCCCCTTCCCTCGTTTCATATCGCTTGCATCCCAACCGCAACTTATCTACGCTGTCCTGCTATC
CCTCAGCGCTGCTCCTGCTCCTGCTCACTGCCCTCGCACAGCCTTGGTTTGGGCTCCGCCTGT
ATTCTCCTGGTACTGCAACCTGTAAACCAGCACTGCAATGCTGATGCACGGGAAGTAGTGGGA
TGGGAACACAAATGGAAAGCTT

SEQ ID NO: 13 (SEQ ID NO: 58 WO 2010063032)
Crβ-tub::CO-suc2::CvNitRed
CTTTCTTGCGCTATGACACTTCCAGCAAAAGGTAGGGCGGGCTGCGAGACGGCTTCCCGGCGC
TGCATGCAACACCGATGATGCTTCGACCCCCCGAAGCTCCTTCGGGGCTGCATGGGCGCTCCG
ATGCCGCTCCAGGGCGAGCGCTGTTTAAATAGCCAGGCCCCCGATTGCAAAGACATTATAGCG
AGCTACCAAAGCCATATTCAAACACCTAGATCACTACCACTTCTACACAGGCCACTCGAGCTT
GTGATCGCACTCCGCTAAGGGGCGCCTCTTCCTCTTCGTTTCAGTCACAACCCGCAAACGGC
GCGCC<u>ATG</u>CTGCTGCAGGCCTTCCTGTTCCTGCTGGCCGGCTTCGCCGCCAAGATCAGCGCCT
CCATGACGAACGAGACGTCCGACCGCCCCTGGTGCACTTCACCCCCAACAAGGGCTGGATG
AACGACCCCAACGGCCTGTGGTACGACGAGAAGGACGCCAAGTGGCACCTGTACTTCCAGTA
CAACCCGAACGACACCGTCTGGGGGACGCCCTTGTTCTGGGGCCACGCCACGTCCGACGACCT
GACCAACTGGGAGGACCAGCCCATCGCCATCGCCCCGAAGCGCAACGACTCCGGCGCCTTCT
CCGGCTCCATGGTGGTGGACTACAACAACACCTTCCGGCTTCTTCAACGACACCATCGACCCGC
GCCAGCGCTGCGTGGCCATCTGGACCTACAACACCCCGGAGTCCGAGGAGCAGTACATCTCCT
ACAGCCTGGACGGCGGCTACACCTTCACCGAGTACCAGAAGAACCCCGTGCTGGCCGCCAAC
TCCACCCAGTTCCGCGACCCGAAGGTCTTCTGGTACGAGCCCTCCCAGAAGTGGATCATGACC
GCGGCCAAGTCCCAGGACTACAAGATCGAGATCTACTCCTCCGACGACCTGAAGTCCTGGAA
GCTGGAGTCCGCGTTCGCCAACGAGGGCTTCCTCGGCTACCAGTACGAGTGCCCCGGCCTGAT
CGAGGTCCCCACCGAGCAGGACCCCAGCAAGTCCTACTGGGTGATGTTCATCTCCATCAACCC
CGGCGCCCCGGCCGGCGGCTCCTTCAACCAGTACTTCGTCGGCAGCTTCAACGGCACCCACTT
CGAGGCCTTCGACAACCAGTCCCGCGTGGTGGACTTCGGCAAGGACTACTACGCCCTGCAGAC
CTTCTTCAACACCGACCCGACCTACGGGAGCGCCCTGGGCATCGCGTGGGCCTCCAACTGGGA
GTACTCCGCCTTCGTGCCCACCAACCCCTGGCGCTCCTCCATGTCCCTCGTGCGCAAGTTCTCC
CTCAACACCGAGTACCAGGCCAACCCGGAGACGGAGCTGATCAACCTGAAGGCCGAGCCGAT
CCTGAACATCAGCAACGCCGGCCCTGGAGCCGGTTCGCCACCAACACCACGTTGACGAAGG
CCAACAGCTACAACGTCGACCTGTCCAACAGCACCGGCACCCTGGAGTTCGAGCTGGTGTACG
CCGTCAACACCACCCAGACGATCTCCAAGTCCGTGTTCGCGGACCTCTCCCTCTGGTTCAAGG
GCCTGGAGGACCCCGAGGAGTACCTCCGCATGGGCTTCGAGGTTCCGCGTCCTCCTTCTTCC
TGGACCGCGGGAACAGCAAGGTGAAGTTCGTGAAGGAGAACCCCTACTTCACCAACCGCATG
AGCGTGAACAACCAGCCCTTCAAGAGCGAGAACGACCTGTCCTACTACAAGGTGTACGGCTT
GCTGGACCAGAACATCCTGGAGCTGTACTTCAACGACGGCGACGTCGTGTCCACCAACACCTA
CTTCATGACCACCGGGAACGCCCTGGGCTCCGTGAACATGACGACGGGGGTGGACAACCTGT
TCTACATCGACAAGTTCCAGGTGCGCGAGGTCAAG<u>TGA</u>TTAATTAACTCGAGGCAGCAGCAG
CTCGGATAGTATCGACACACTCTGGACGCTGGTCGTGTGATGGACTGTTGCCGCCACACTTGC
TGCCTTGACCTGTGAATATCCCTGCCGCTTTTATCAAACAGCCTCAGTGTGTTTGATCTTGTGT
GTACGCGCTTTTGCGAGTTGCTAGCTGCTTGTGCTATTTGCGAATACCACCCCCAGCATCCCCT
TCCCTCGTTTCATATCGCTTGCATCCCAACCGCAACTTATCTACGCTGTCCTGCTATCCCTCAG
CGCTGCTCCTGCTCCTGCTCACTGCCCCTCGCACAGCCTTGGTTTGGGCTCCGCCTGTATTCTC
CTGGTACTGCAACCTGTAAACCAGCACTGCAATGCTGATGCACGGGAAGTAGTGGGATGGGA
ACACAAATGGA SEQ ID NO: 14 (SEQ ID NO: 65 WO 2010063032)
NeoR forward primer
CCGCCGTGCTGGACGTGGTG SEQ ID NO: 15 (SEQ ID NO: 66 WO 2010063032)
NeoR reverse primer
GGTGGCGGGGTCCAGGGTGT
```

SEQ ID NO: 16 (SEQ ID NO: 67 WO 2010063032)
Yeast invertase suc2 forward primer
CGGCCGGCGGCTCCTTCAAC SEQ ID NO: 17 (SEQ ID NO: 68 WO 2010063032)
Yeast invertase suc2 reverse primer
GGCGCTCCCGTAGGTCGGGT SEQ ID NO: 18 (SEQ ID NO: 69 WO 2010063032)
5'UTR/promoter Chlorella sorokiniana glutamate dehydrogenase
CGCCTGCAACGCAAGGGCAGCCACAGCCGCTCCCACCCGCCGCTGAACCGACACGTGCTTGG
GCGCCTGCCGCCTGCCTGCCGCATGCTTGTGCTGGTGAGGCTGGGCAGTGCTGCCATGCTGAT
TGAGGCTTGGTTCATCGGGTGGAAGCTTATGTGTGCTGGGCTTGCATGCCGGGCAATGCGC
ATGGTGGCAAGAGGGCGGCAGCACTTGCTGGAGCTGCCGCGGTGCCTCCAGGTGGTTCAATC
GCGGCAGCCAGAGGGATTTCAGATGATCGCGCGTACAGGTTGAGCAGCAGTGTCAGCAAGG
TAGCAGTTTGCCAGAATGATCGGTTCAGCTGTTAATCAATGCCAGCAAGAGAAGGGGTCAAG
TGCAAACACGGGCATGCCACAGCACGGGCACCGGGGAGTGGAATGGCACCACCAAGTGTGTG
CGAGCCAGCATCGCCGCCTGGCTGTTTCAGCTACAACGGCAGGAGTCATCCAACGTAACCATG
AGCTGATCAACACTGCAATCATCGGGCGGGCGTGATGCAAGCATGCCTGGCGAAGACACATG
GTGTGCGGATGCTGCCGGCTGCTGCCTGCTGCGCACGCCGTTGAGTTGGCAGCAGGCTCAGCC
ATGCACTGGATGGCAGCTGGGCTGCCACTGCAATGTGGTGGATAGGATGCAAGTGGAGCGAA
TACCAAACCCTCTGGCTGCTTGCTGGGTTGCATGGCATCGCACCATCAGCAGGAGCGCATGCG
AAGGGACTGGCCCCATGCACGCATGCCAAACCGGAGCGCACCGAGTGTCCACACTGTCACC
AGGCCCGCAAGTTTGCAGAACCATGCTCATGGACGCATGTAGCGCTGACGTCCCTTGACGGC
GCTCCTCTCGGGTGTGGGAAACGCAATGCAGCACAGGCAGCAGAGGCGGCGGCAGCAGAGCG
GCGGCAGCAGCGGCGGGGGCCACCCTTCTTGCGGGGTCGCGCCCCAGCCAGCGGTGATGCGC
TGATCCCAAACGAGTTCACATTCATTTGCATGCCTGGAGAAGCGAGGCTGGGGCCTTTGGGCT
GGTGCAGCCCGCAATGGAATGCGGGACCGCCAGGCTAGCAGCAAAGGCGCCTCCCCTACTCC
GCATCGATGTTCCATAGTGCATTGGACTGCATTTGGGTGGGGCGGCCGGCTGTTTCTTTCGTGT
TGCAAAACGCGCCAGCTCAGCAACCTGTCCCGTGGGTCCCCGTGCCGATGAAATCGTGTGCA
CGCCGATCAGCTGATTGCCCGGCTCGCGAAGTAGGCGCCCTCCTTTCTGCTCGCCCTCTCTCCG
TCCCGCCACTAGTGGCGCGCC SEQ ID NO: 19 (SEQ ID NO: 70 WO 2010063032)
Umbellularia californica C12 thioesterase coding region
ATGGCCACCACCAGCCTGGCCTCCGCCTTCTGCTCCATGAAGGCCGTGATGCTGGCCCGCGAC
GGCCGCGGCATGAAGCCCCGCAGCTCCGACCTGCAGCTGCGCGCCGGCAACGCCCCCACCTC
CCTGAAGATGATCAACGGCACCAAGTTCAGCTACACCGAGAGCCTGAAGCGCCTGCCCGACT
GGTCCATGCTGTTCGCCGTGATCACCACCATCTTCAGCGCCGCCGAGAAGCAGTGGACCAACC
TGGAGTGGAAGCCCAAGCCCAAGCTGCCCCAGCTGCTGGACGACCACTTCGGCCTGCACGGC
CTGGTGTTCCGCCGCACCTTCGCCATCCGCTCCTACGAGGTGGGCCCCGACCGCAGCACCTCC
ATCCTGGCCGTGATGAACCACATGCAGGAGGCCACCCTGAACCACGCCAAGAGCGTGGGCAT
CCTGGGCGACGGCTTCGGCACCACCCTGGAGATGTCCAAGCGCGACCTGATGTGGGTGGTGC
GCCGCACCCACGTGGCCGTGGAGCGCTACCCCACCTGGGGCGACACCGTGGAGGTGGAGTGC
TGGATCGGCGCCAGCGGCAACAACGGCATGCGCCGCGACTTCCTGGTGCGCGACTGCAAGAC
CGGCGAGATCCTGACCCGCTGCACCTCCCTGAGCGTGCTGATGAACACCCGCACCCGCCGCCT
GAGCACCATCCCCGACGAGGTGCGCGGCGAGATCGGCCCCGCCTTCATCGACAACGTGGCCG
TGAAGGACGACGAGATCAAGAAGCTGCAGAAGCTGAACGACTCCACCGCCGACTACATCCGA
GGCGGCCTGACCCCCCGCTGGAACGACCTGGACGTGAACCAGCACGTGAACAACCTGAAGTA
CGTGGCCTGGGTGTTCGAGACCTGCCCGACAGCATCTTCGAGTCCCACCACATCAGCTCCTT
CACCCTGGAGTACCGCCGCGAGTGCACCCGCGACTCCGTGCTGCGCAGCCTGACCACCGTGAG
CGGCGGCAGCTCCGAGGCCGGCCTGGTGTGCGACCACCTGCTGCAGCTGGAGGGCGGCAGCG
AGGTGCTGCGCGCCCGCACCGAGTGGCGCCCCAAGCTGACCGACTCCTTCCGCGGCATCAGCG
TGATCCCCGCCGAGCCCCGCGTG SEQ ID NO: 20 (SEQ ID NO: 71 WO 2010063032)
Cinnamomum camphora C14 thioesterase coding region
ATGGCCACCACCTCCCTGGCCTCCGCCTTCTGCAGCATGAAGGCCGTGATGCTGGCCCGCGAC
GGCCGCGGCATGAAGCCCCGCTCCAGCGACCTGCAGCTGCGCGCCGGCAACGCCCAGACCTC
CCTGAAGATGATCAACGGCACCAAGTTCTCCTACACCGAGAGCCTGAAGAAGCTGCCCGACT
GGTCCATGCTGTTCGCCGTGATCACCACCATCTTCTCCGCCGCCGAGAAGCAGTGGACCAACC
TGGAGTGGAAGCCCAAGCCCAACCCCCCCAGCTGCTGGACGACCACTTCGGCCCCCACGGC
CTGGTGTTCCGCCGCACCTTCGCCATCCGCAGCTACGAGGTGGGCCCCGACCGCTCCACCAGC
ATCGTGGCCGTGATGAACCACCTGCAGGAGGCCGCCCTGAACCACGCCAAGTCCGTGGGCAT
CCTGGGCGACGGCTTCGGCACCACCCTGGAGATGTCCAAGCGCGACCTGATCTGGGTGGTGA
AGCGCACCCACGTGGCCGTGGAGCGCTACCCCGCCTGGGGCGACACCGTGGAGGTGGAGTGC
TGGGTGGGCGCCTCCGGCAACAACGGCCGCCGCCACGACTTCCTGGTGCGCGACTGCAAGAC
CGGCGAGATCCTGACCCGCTGCACCTCCCTGAGCGTGATGATGAACACCCGCACCCGCCGCCT
GAGCAAGATCCCCGAGGAGGTGCGCGGCGAGATCGGCCCCGCCTTCATCGACAACGTGGCCG
TGAAGGACGAGGAGATCAAGAAGCCCCAGAAGCTGAACGACTCCACCGCCGACTACATCCGA
GGCGGCCTGACCCCCCGCTGGAACGACCTGGACATCAACCAGCACGTGAACAACATCAAGTA
CGTGGACTGGATCCTGGAGACCGTGCCCGACAGCATCTTCGAGAGCCACCACATCTCCTCCTT
CACCATCGAGTACCGCCGCGAGTGCACCATGGACAGCGTGCTGCAGTCCCTGACCACCGTGA
GCGGCGGCTCCTCCGAGGCCGGCCTGGTGTGCGAGCACCTGCTGCAGCTGGAGGGCGGCAGC
GAGGTGCTGCGCGCCAAGACCGAGTGGCGCCCCAAGCTGACCGACTCCTTCCGCGGCATCAG
CGTGATCCCCGCCGAGTCCAGCGTG

SEQUENCE LISTING

SEQ ID NO: 21 (SEQ ID NO: 72 WO 2010063032)
FLAG-tag sequence
ATGGACTACAAGGACCACGACGGCGACTACAAGGACCACGACATCGACTACAAGGACGACG
ACGACAAGTGA SEQ ID NO: 22 (SEQ ID NO: 73 WO 2010063032)
3' UTR *Chlorella vulgaris* nitrate reductase
CTCGAGGCAGCAGCAGCTCGGATAGTATCGACACACTCTGGACGCTGGTCGTGTGATGGACTG
TTGCCGCCACACTTGCTGCCTTGACCTGTGAATATCCCTGCCGCTTTTATCAAACAGCCTCAGT
GTGTTTGATCTTGTGTGTACGCGCTTTTGCGAGTTGCTAGCTGCTTGTGCTATTTGCGAATACC
ACCCCCAGCATCCCCTTCCCTCGTTTCATATCGCTTGCATCCCAACCGCAACTTATCTACGCTG
TCCTGCTATCCCTCAGCGCTGCTCCTGCTCCTGCTCACTGCCCCTCGCACAGCCTTGGTTTGGG
CTCCGCCTGTATTCTCCTGGTACTGCAACCTGTAAACCAGCACTGCAATGCTGATGCACGGGA
AGTAGTGGGATGGGAACACAAATGGA SEQ ID NO: 23 (SEQ ID NO: 74 WO 2010063032)
C12 thioesterase forward primer
5' CTGGGCGACGGCTTCGGCAC 3'

SEQ ID NO: 24 (SEQ ID NO: 75 WO 2010063032)
C12 thioesterase reverse primer
5' AAGTCGCGGCGCATGCCGTT 3'

SEQ ID NO: 25 (SEQ ID NO: 76 WO 2010063032)
C14 thioesterase forward primer
5' TACCCCGCCTGGGGCGACAC 3'

SEQ ID NO: 26 (SEQ ID NO: 77 WO 2010063032)
C14 thioesterase reverse primer
5' CTTGCTCAGGCGGCGGGTGC 3'

SEQ ID NO: 27 (SEQ ID NO: 78 WO 2010063032)
Codon optimized *Cuphea hookeriana* C8-10 thioesterase coding region with native plastid targeting sequence with 3x FLAG tag
ATGGTGGCCGCCGCCGCCTCCAGCGCCTTCTTCCCCGTGCCCGCCCCCGGCGCCTCCCCCAAG
CCCGGCAAGTTCGGCAACTGGCCCTCCAGCCTGAGCCCCTCCTTCAAGCCCAAGTCCATCCCC
AACGGCGGCTTCCAGGTGAAGGCCAACGACAGCGCCCACCCCAAGGCCAACGGCTCCGCCGT
GAGCCTGAAGAGCGGCAGCCTGAACACCCAGGAGGACACCTCCTCCAGCCCCCCCCCCCCGCA
CCTTCCTGCACCAGCTGCCCGACTGGAGCCGCCTGCTGACCGCCATCACCACCGTGTTCGTGA
AGTCCAAGCGCCCCGACATGCACGACCGCAAGTCCAAGCGCCCCGACATGCTGGTGGACAGC
TTCGGCCTGGAGTCCACCGTGCAGGACGGCCTGGTGTTCCGCCAGTCCTTCTCCATCCGCTCCT
ACGAGATCGGCACCGACCGCACCGCCAGCATCGAGACCCTGATGAACCACCTGCAGGAGACC
TCCCTGAACCACTGCAAGAGCACCGGCATCCTGCTGGACGGCTTCGGCCGCACCCTGGAGATG
TGCAAGCGCGACCTGATCTGGGTGGTGATCAAGATGCAGATCAAGGTGAACCGCTACCCCGC
CTGGGGCGACACCGTGGAGATCAACACCCGCTTCAGCCGCCTGGGCAAGATCGGCATGGGCC
GCGACTGGCTGATCTCCGACTGCAACACCGGCGAGATCCTGGTGCGCGCCACCAGCGCCTACG
CCATGATGAACCAGAAGACCCGCCGCCTGTCCAAGCTGCCCTACGAGGTGCACCAGGAGATC
GTGCCCCTGTTCGTGGACAGCCCCGTGATCGAGGACTCCGACCTGAAGGTGCACAAGTTCAAG
GTGAAGACCGGCGACAGCATCCAGAAGGGCCTGACCCCCGGCTGGAACGACCTGGACGTGAA
CCAGCACGTGTCCAACGTGAAGTACATCGGCTGGATCCTGGAGAGCATGCCCACCGAGGTGC
TGGAGACCCAGGAGCTGTGCTCCCTGGCCCTGGAGTACCGCCGCGAGTGCGGCCGCGACTCC
GTGCTGGAGAGCGTGACCGCCATGGACCCCAGCAAGGTGGGCGTGCGCTCCCAGTACCAGCA
CCTGCTGCGCCTGGAGGACGGCACCGCCATCGTGAACGGCGCCACCGAGTGGCGCCCCAAGA
ACGCCGGCGCCAACGGCGCCATCTCCACCGGCAAGACCAGCAACGGCAACTCCGTGTCCATG
GACTACAAGGACCACGACGGCGACTACAAGGACCACGACATCGACTACAAGGACGACGACG
ACAAGTGA

What is claimed is:

1. A method of converting biomass from an oleaginous microbe to a torrefied composition comprising the steps of: (1) heating said biomass under substantially oxygen free conditions at a temperature of from about 200° C. to about 300° C.; (2) maintaining said heating step for a period of from about 0.25 hours to about 10 hours; (3) cooling the heated product; and (5) recovering the torrefied composition, wherein said biomass comprises spent microbial biomass, less than about 20% protein by dry cell weight, and about 1-20% lipid by dry cell weight.

2. The method of claim 1, wherein said biomass makes up by weight from about 5% to about 100% of said composition.

3. The method of claim 1, wherein said method further comprises including a non-microbial cellulosic or lignocellulosic material in said composition.

4. The method of claim 1, wherein said biomass comprises less than about 10% protein by dry cell weight and about 1-10% lipid by dry cell weight.

5. The method of claim 4, wherein said biomass comprises less than about 10% protein by dry cell weight and about 1-5% lipid by dry cell weight.

6. The method of claim 1, wherein said biomass was obtained from an oleaginous microbe cultured under heterotrophic conditions.

7. The method of claim 6, wherein the biomass is selected from microalgal biomass and oleaginous yeast biomass.

8. The method of claim 1, wherein said biomass is milled or processed to generate particles of a between about 1 mm and about 50 mm.

9. The method of claim 1, wherein said biomass is derived from a microalgae selected from the group consisting of *Achnanthes orientalis*, *Agmenellum*, *Amphiprora hyaline*, *Amphora coffeiformis*, *Amphora coffeiformis linea*, *Amphora coffeiformis punctata*, *Amphora coffeiformis taylori*, *Amphora coffeiformis tenuis*, *Amphora delicatissima*, *Amphora delicatissima capitata*, *Amphora* sp., *Anabaena*, *Ankistrodesmus*, *Ankistrodesmus falcatus*, *Boekelovia hooglandii*, *Borodinella* sp., *Botryococcus braunii*, *Botryococcus sudeticus*, *Carteria*, *Chaetoceros gracilis*, *Chaetoceros muelleri*, *Chaetoceros muelleri subsalsum*, *Chaetoceros* sp., *Chlorella anitrata*, *Chlorella Antarctica*, *Chlorella aureoviridis*, *Chlorella candida*, *Chlorella capsulate*, *Chlorella desiccate*, *Chlorella ellipsoidea*, *Chlorella emersonii*, *Chlorella fusca*, *Chlorella fusca* var. *vacuolata*, *Chlorella glucotropha*, *Chlorella infusionum*, *Chlorella infusionum* var. *actophila*, *Chlorella infusionum* var. *auxenophila*, *Chlorella kessleri*, *Chlorella lobophora* (strain SAG 37.88), *Chlorella luteoviridis*, *Chlorella luteoviridis* var. *aureoviridis*, *Chlorella luteoviridis* var. *lutescens*, *Chlorella miniata*, *Chlorella minutissima*, *Chlorella mutabilis*, *Chlorella nocturna*, *Chlorella parva*, *Chlorella photophila*, *Chlorella pringsheimii*, *Chlorella protothecoides* (including any of UTEX strains 1806, 411, 264, 256, 255, 250, 249, 31, 29, 25, and CCAP strains 211/17 and 211/8d), *Chlorella protothecoides* var. *acidicola*, *Chlorella regularis*, *Chlorella regularis* var. *minima*, *Chlorella regularis* var. *umbricata*, *Chlorella reisiglii*, *Chlorella saccharophila*, *Chlorella saccharophila* var. *ellipsoidea*, *Chlorella salina*, *Chlorella simplex*, *Chlorella sorokiniana*, *Chlorella* sp., *Chlorella sphaerica*, *Chlorella stigmatophora*, *Chlorella vanniellii*, *Chlorella vulgaris*, *Chlorella vulgaris*, *Chlorella vulgaris f. tertia*, *Chlorella vulgaris* var. *autotrophica*, *Chlorella vulgaris* var. *viridis*, *Chlorella vulgaris* var. *vulgaris*, *Chlorella vulgaris* var. *vulgaris f.* tertia, *Chlorella vulgaris* var. *vulgaris f. viridis, Chlorella xanthella, Chlorella zofingiensis, Chlorella trebouxioides, Chlorella vulgaris, Chlorococcum infusionum, Chlorococcum* sp., *Chlorogonium, Chroomonas* sp., *Chrysosphaera* sp., *Cricosphaera* sp., *Cryptomonas* sp., *Cyclotella cryptica, Cyclotella meneghiniana, Cyclotella* sp., *Dunaliella* sp., *Dunaliella bardawil, Dunaliella bioculata, Dunaliella granulate, Dunaliella maritime, Dunaliella minuta, Dunaliella parva, Dunaliella peircei, Dunaliella primolecta, Dunaliella salina, Dunaliella terricola, Dunaliella tertiolecta, Dunaliella viridis, Dunaliella tertiolecta, Eremosphaera viridis, Eremosphaera* sp., *Ellipsoidon* sp., *Euglena, Franceia* sp., *Fragilaria crotonensis, Fragilaria* sp., *Gleocapsa* sp., *Gloeothamnion* sp., *Hymenomonas* sp., *Isochrysis aff galbana, Isochrysis galbana, Lepocinclis, Micractinium, Micractinium* (UTEX LB 2614), *Monoraphidium minutum, Monoraphidium* sp., *Nannochloris* sp., *Nannochloropsis salina, Nannochloropsis* sp., *Navicula acceptata, Navicula biskanterae, Navicula pseudotenelloides, Navicula pelliculosa, Navicula saprophila, Navicula* sp., *Nephrochloris* sp., *Nephroselmis* sp., *Nitschia communis, Nitzschia alexandrine, Nitzschia communis, Nitzschia dissipata, Nitzschia frustulum, Nitzschia hantzschiana, Nitzschia inconspicua, Nitzschia intermedia, Nitzschia microcephala, Nitzschia pusilla, Nitzschia pusilla elliptica, Nitzschia pusilla monoensis, Nitzschia quadrangular, Nitzschia* sp., *Ochromonas* sp., *Oocystis parva, Oocystis pusilla, Oocystis* sp., *Oscillatoria limnetica, Oscillatoria* sp., *Oscillatoria subbrevis, Pascheria acidophila, Pavlova* sp., *Phagus, Phormidium, Platymonas* sp., *Pleurochrysis carterae, Pleurochrysis dentate, Pleurochrysis* sp., *Prototheca wickerhamii, Prototheca stagnora, Prototheca portoricensis, Prototheca moriformis, Prototheca zopfii, Pyramimonas* sp., *Pyrobotrys, Sarcinoid chrysophyte, Scenedesmus armatus, Spirogyra, Spirulina platensis, Stichococcus* sp., *Synechococcus* sp., *Tetraedron, Tetraselmis* sp., *Tetraselmis suecica, Thalassiosira weissflogii*, and *Viridiella fridericiana*.

10. The method of claim 1, wherein said biomass is derived from a microalgae of a genus selected from the group consisting of *Chlorella, Parachlorella*, and *Prototheca*.

11. The method of claim 1, wherein said biomass is derived from an oleaginous microbe genetically engineered to express one of more exogenous genes.

12. The method of claim 1, wherein said biomass is derived from an oleaginous microbe genetically engineered to express one of more exogenous genes, said microbe producing lipid, wherein the proportions of fatty acids of the lipid are altered relative to that in the lipid produced by an oleaginous microbe lacking said one or more exogenous genes.

13. The method of claim 1, wherein said method further comprises including soybean hulls in said composition.

* * * * *